US012314342B2

(12) United States Patent
Yue et al.

(10) Patent No.: US 12,314,342 B2
(45) Date of Patent: May 27, 2025

(54) OBJECT RECOGNITION METHOD AND APPARATUS

(71) Applicant: Huawei Technologies Co., Ltd., Shenzhen (CN)

(72) Inventors: Jun Yue, Shenzhen (CN); Jianzhuang Liu, Shenzhen (CN); Songcen Xu, Shenzhen (CN); Youliang Yan, Shenzhen (CN); Li Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 632 days.

(21) Appl. No.: 17/484,545

(22) Filed: Sep. 24, 2021

(65) Prior Publication Data

US 2022/0012533 A1 Jan. 13, 2022

Related U.S. Application Data

(63) Continuation of application No. PCT/CN2020/081436, filed on Mar. 26, 2020.

(30) Foreign Application Priority Data

Mar. 26, 2019 (CN) .......................... 201910236937.1

(51) Int. Cl.
 *G06F 18/214* (2023.01)
 *G06F 18/2413* (2023.01)
 (Continued)

(52) U.S. Cl.
 CPC ........ *G06F 18/214* (2023.01); *G06F 18/2413* (2023.01); *G06F 18/28* (2023.01);
 (Continued)

(58) Field of Classification Search
 None
 See application file for complete search history.

(56) References Cited

U.S. PATENT DOCUMENTS 10,262,229 B1 * 4/2019 Rao ...................... G06V 10/454
2013/0034295 A1 2/2013 Tsuchinaga et al.
(Continued)

FOREIGN PATENT DOCUMENTS

CN 103049512 A 4/2013
CN 103207870 A 7/2013
(Continued)

OTHER PUBLICATIONS

Redmon, J. et al., "YOLO9000: Better, Faster, Stronger", 2017 IEEE Conference on Computer Vision and Pattern Recognition (CVPR), Jul. 21-26, 2017, pp. 7263-7271.
(Continued)

*Primary Examiner* — Randolph I Chu
(74) *Attorney, Agent, or Firm* — Slater Matsil, LLP

(57) ABSTRACT

This application discloses an object recognition method and apparatus in the field of artificial intelligence. This application relates to the field of artificial intelligence, and specifically, to the field of computer vision. The method includes: obtaining one or more body regions of a to-be-recognized image; determining a saliency score of each of the one or more body regions; and when a saliency score of a body region A is greater than or equal to a categorization threshold, determining a feature vector of an object in the body region A based on a feature of the object in the body region A, and determining a category of the object in the body region A based on the feature vector of the object in the body region A and a category feature vector in a feature library, where the body region A is any one of the one or more body regions.

20 Claims, 20 Drawing Sheets

(51) Int. Cl.
  *G06F 18/28* (2023.01)
  *G06N 3/04* (2023.01)
  *G06N 3/08* (2023.01)
  *G06V 10/28* (2022.01)
  *G06V 10/44* (2022.01)
  *G06V 10/46* (2022.01)

(52) U.S. Cl.
  CPC ............... *G06N 3/04* (2013.01); *G06N 3/08* (2013.01); *G06V 10/28* (2022.01); *G06V 10/457* (2022.01); *G06V 10/462* (2022.01)

(56) References Cited

U.S. PATENT DOCUMENTS

| | | | | |
|---|---|---|---|---|
| 2017/0193324 | A1* | 7/2017 | Chen | G06V 10/26 |
| 2017/0344884 | A1* | 11/2017 | Lin | G06N 3/048 |
| 2017/0351941 | A1* | 12/2017 | Mishra | G06V 10/82 |
| 2018/0285682 | A1* | 10/2018 | Najibi | G06T 7/194 |
| 2018/0307935 | A1* | 10/2018 | Rao | G06V 10/764 |
| 2019/0279074 | A1* | 9/2019 | Lin | G06F 16/583 |
| 2020/0298847 | A1* | 9/2020 | Tawari | B60W 30/0953 |

FOREIGN PATENT DOCUMENTS

| | | |
|---|---|---|
| CN | 103810503 A | 5/2014 |
| CN | 104820718 A | 8/2015 |
| CN | 105069457 A | 11/2015 |
| CN | 105989594 A | 10/2016 |
| CN | 106886795 A | 6/2017 |
| CN | 107016409 A | 8/2017 |
| CN | 107239203 A | 10/2017 |
| CN | 107368614 A | 11/2017 |
| CN | 107729910 A | 2/2018 |
| CN | 107908685 A | 4/2018 |
| CN | 108073948 A | 5/2018 |
| CN | 108921107 A | 11/2018 |
| CN | 108985135 A | 12/2018 |
| CN | 110070107 A | 7/2019 |
| CN | 111539347 A | 8/2020 |
| JP | 2003030655 A | 1/2003 |
| WO | 2013109934 A1 | 7/2013 |
| WO | 2016177259 A1 | 11/2016 |
| WO | 2018219016 A1 | 12/2018 |

OTHER PUBLICATIONS

Feng, D. et al., "Remote Sensing Image Classification Based on Minimum Distance Method", Journal of North China Institute of Aerospace Engineering, Issue 3, 2012, 3 pages.

Xiao, Q., "Margin Sample Mining Loss: A Deep Learning Based Method for Person Re-identification", arXiv:1710.00478v3, Oct. 2, 2017, 8 pages.

Wang, J. et al., "Collaborative Learning for Weakly Supervised Object Detection", Proceedings of the Twenty-Seventh International Joint Conference on Artificial Intelligence (IJCAI-18), Stockholm, Jul. 13-19, 2018, 7 pages.

Wang, F. et al., "Research Progress of Similarity Learning Methods in Computer Vision", Intelligent Computer and Applications, vol. 1, Jan. 2019, 5 pages.

* cited by examiner

OBJECT RECOGNITION METHOD AND APPARATUS

CROSS-REFERENCE TO RELATED APPLICATIONS

This application is a continuation of International Application No. PCT/CN2020/081436, filed on Mar. 26, 2020, which claims priority to Chinese Patent Application No. 201910236937.1, filed on Mar. 26, 2019. The disclosures of the aforementioned applications are hereby incorporated by reference in their entireties.

TECHNICAL FIELD

This application relates to the field of artificial intelligence, and in particular, to an object recognition method and apparatus.

BACKGROUND

Computer vision is an integral part of various intelligent/autonomic systems in various application fields, for example, manufacturing industry, inspection, document analysis, medical diagnosis, and military affairs. The computer vision is knowledge about how to use a camera/video camera and a computer to obtain required data and information of a photographed subject. To be vivid, eyes (the camera/video camera) and a brain (an algorithm) are mounted on the computer to replace human eyes to recognize, track, and measure a target, so that the computer can perceive an environment. The perceiving may be considered as extracting information from a perceptual signal. Therefore, the computer vision may be considered as a science of studying how to enable an artificial system to perform "perceiving" in an image or multi-dimensional data. In conclusion, the computer vision is to replace a visual organ with various imaging systems to obtain input information, and then replace a brain with a computer to process and interpret the input information. An ultimate study objective of the computer vision is to enable the computer to observe and understand the world through vision in a way that human beings do, and to have a capability of autonomously adapting to the environment.

Object recognition is one of classical issues in the computer vision. A task of the object recognition is to mark a location of an object in an image by using a recognition window and show a category of the object. From a conventional framework with artificial design features and shallow classifiers to a deep learning-based end-to-end recognition framework, the object recognition gradually becomes more mature.

Currently, there are many object recognition methods based on a large quantity of strongly supervised training samples in the industry. However, in a currently popular supervision-based training manner, only a determined category that is pre-trained can be recognized, and a recognition window performs determining based on a probability that an object in the window belongs to a predefined category. For newly obtained data and a newly added category, an object recognition model usually needs to be retrained. This is very time-consuming and laborious.

SUMMARY

Embodiments of this application provide an object recognition method and apparatus, to help improve object recognition efficiency.

According to a first aspect, an object recognition method is provided, including: obtaining a to-be-recognized image and one or more body regions of the to-be-recognized image, where the body regions include a to-be-recognized object; determining a saliency score of each of the one or more body regions, where the saliency score of the body region is used to represent a saliency degree of an object in the body region; and when a saliency score of a body region A is greater than or equal to a categorization threshold, determining a feature vector of an object in the body region A based on a feature of the object in the body region A, and determining a category of the object in the body region A based on the feature vector of the object in the body region A and a category feature vector in a feature library, where the body region A is any one of the one or more body regions, and the category feature vector is used to represent a common feature of objects of a same category or a feature of one category of objects.

In the solutions of this application, after the feature vector of the object in the body region A is obtained, the category of the object in the body region A is determined by calculating a distance between the feature vector of the object in the body region A and a center feature vector in the feature library, instead of calculating a distance between the feature vector of the object in the body region A and a feature vector of each object in the feature library. This improves object recognition efficiency. In addition, in an object recognition process, body region detection is decoupled from object recognition. This provides a possibility of subsequently updating a category and a center feature vector in the feature library. Therefore, an object recognition range is expanded and object recognition accuracy is improved.

In a feasible embodiment, the obtaining one or more body regions of the to-be-recognized image includes: inputting the to-be-recognized image into a saliency probability map generation model, to obtain a saliency probability map of the to-be-recognized image, where a size of the saliency probability map is the same as that of the to-be-recognized image; performing binarization processing on the saliency probability map, to obtain a binary saliency probability map; and processing the binary saliency probability map according to a connected region recognition method, to obtain the one or more body regions.

In a feasible embodiment, the determining a saliency score of each of the one or more body regions includes: obtaining a set $N_A$ of saliency probability values in the body region A and a set $N_{A'}$ of saliency probability values in a non-body region A', where the non-body region A' is a region other than the body region A in the saliency probability map; obtaining an average saliency probability value of the body region A' and an average saliency probability value of the non-body region A' based on the set $N_A$ of the saliency probability values in the body region A and the set $N_{A'}$ of the saliency probability values in the non-body region A'; and obtaining the saliency score of the body region A through calculation based on the average saliency probability value of the body region A and the average saliency probability value of the non-body region A', where the saliency score of the body region A is a ratio of the average saliency probability value of the body region A to the average saliency probability value of the non-body region A', and saliency scores of the one or more body regions include the saliency score of the body region A.

In a feasible embodiment, the category feature vector in the feature library is a center feature vector, the center feature vector is used to represent a common feature of objects of a same category, and the determining a feature vector of an object in the body region A based on a feature of the object in the body region A, and determining a category of the object in the body region A based on the feature vector of the object in the body region A and a category feature vector in a feature library includes: extracting the feature of the object in the body region A based on a convolutional neural network CNN feature extraction model, to obtain the feature vector of the object in the body region A; calculating a distance between the feature vector of the object in the body region A and a center feature vector corresponding to each category in the feature library; and determining a category corresponding to a target center feature vector as the category of the object in the body region A, where the target center feature vector is a center feature vector that is in the feature library and that is closest to the feature vector of the object in the body region A. Compared with that in a manner of determining the category of the object in the body region A by calculating a distance between the feature vector of the object in the body region A and a feature vector of each object in the feature library, in the manner of determining the category of the object in the body region A by calculating the distance between the feature vector of the object in the body region A and the center feature vector in the feature library, object recognition efficiency can be effectively improved. In addition, storage overheads are reduced because the feature library stores the center feature vector and the corresponding category.

In a feasible embodiment, before the feature vector of the object in the body region A is obtained based on the CNN feature extraction model, the object recognition method further includes: training the CNN feature extraction model based on a plurality of samples, where the training the CNN feature extraction model based on a plurality of samples includes: obtaining, based on the CNN feature extraction model, a quadruple (a, $C_P$, $C_N$, n) corresponding to a sample s in the plurality of samples, where a is a feature vector of the sample s, $C_P$ is a center feature vector corresponding to a category of the sample s, $C_N$ is a center feature vector that is of a different category of samples and that is closest to a, and n is a feature vector that is of a sample of a different category and that is closest to $C_P$; and training the CNN feature extraction model based on quadruples of the plurality of samples and a loss function, until a value of the loss function is less than preset precision, where the loss function is used to represent precision of the CNN feature extraction model, and the loss function is:

$max(D(a, C_P)-D(a, C_N)+\alpha, 0)+max(D(a, C_P)-D(n, C_P)+\beta, 0)$, where $D(a, C_P)$ is a distance between a and $C_P$, $D(a, C_N)$ is a distance between a and $C_N$, $D(n, C_P)$ is a distance between n and $C_P$, and both $\alpha$ and $\beta$ are constants. The CNN feature extraction model is trained through a quadruple network, so that the feature vector that is of the object and that is extracted based on the CNN feature extraction model is closer to the center feature vector corresponding to the category of the object, and is farther from a center feature vector corresponding to a category that is not the category of the object.

In a feasible embodiment, the object recognition method further includes: establishing the feature library, where the establishing the feature library includes: obtaining M categories of samples and a category of each category of samples, where each category of samples in the M categories of samples includes a plurality of samples, and M is an integer greater than 0; obtaining a feature vector of each sample in the $K^{th}$ category of samples in the M categories of samples based on the CNN feature extraction model, where K=1, 2, 3, ..., or M; and determining a center feature vector of the $K^{th}$ category of samples based on the feature vector of each sample in the $K^{th}$ category of samples, where the $s^{th}$ element in the center feature vector of the $K^{th}$ category of samples is an average value of the $s^{th}$ elements in feature vectors of all of the $K^{th}$ category of samples, and the feature library includes the center feature vector of the $K^{th}$ category of samples and the category of the $K^{th}$ category of samples.

In a feasible embodiment, the object recognition method further includes: receiving N categories of samples and a category of each category of samples from a third party, where each category of samples in the N categories of samples includes a plurality of samples, and N is an integer greater than 0; obtaining T' feature vectors if the feature library includes a category of the $T^{th}$ category of samples in the N categories of samples, where the T' feature vectors are feature vectors of samples used for calculating a center feature vector corresponding to the category of the $T^{th}$ category of samples; obtaining a feature vector of each sample in the $T^{th}$ category of samples based on the CNN feature extraction model, where T is greater than 0 and less than or equal to N; determining a center feature vector of the $T^{th}$ category of samples based on the feature vector of each sample in the $T^{th}$ category of samples and the T' feature vectors, where the $s'^{th}$ element in the center feature vector of the $T^{th}$ category of samples is an average value of the $s'^{th}$ elements in feature vectors of all of the $T^{th}$ category of samples and the $s'^{th}$ elements in the T' feature vectors; and updating, to the center feature vector of the $T^{th}$ category of samples, the center feature vector that is in the feature library and that corresponds to the category of the $T^{th}$ category of samples.

The center feature vector and the category in the feature library are updated based on the samples and the categories sent by the third party. This helps improve object recognition accuracy and expand an application range.

In a feasible embodiment, the object recognition method further includes: obtaining the feature vector of each sample in the $T^{th}$ category of samples based on the CNN feature extraction model if the feature library does not include the category of each category of samples in the $T^{th}$ category of samples; determining a center feature vector of the $T^{th}$ category of samples based on the feature vector of each sample in the $T^{th}$ category of samples, where the $s'^{th}$ element in the center feature vector of the $T^{th}$ category of samples is an average value of the $s'^{th}$ elements in feature vectors of all of the $T^{th}$ category of samples; and adding the center feature vector of the $T^{th}$ category of samples and the category of the $T^{th}$ category of samples to the feature library.

In a feasible embodiment, after the determining a category of the object in the body region A based on the feature vector of the object in the body region A and a category feature vector in a feature library, the object recognition method further includes: displaying a frame of the body region A, the object in the body region A, and the category of the object in a superimposed manner.

In a feasible embodiment, the object recognition method further includes: skipping displaying a frame of the body region A if the saliency score of the body region A is less than a display threshold; or displaying the object in the body region A and a frame of the body region A in a superimposed manner if the saliency score of the body region A is greater than or equal to the display threshold and less than the categorization threshold.

The frame of the body region A, the object in the body region A, and the category of the object are displayed in the superimposed manner. During object recognition, a user may be guided to target a terminal at a to-be-recognized object or reselect a clear image for object recognition, so as to implement interactive display.

According to a second aspect, another object recognition method is provided, including: receiving a feature library update request sent by a first terminal, where the feature library update request carries N categories of samples and a category of each category of samples; updating a feature library based on the N categories of samples and the category of each category of samples; receiving an object recognition request sent by a second terminal, where the object recognition request includes a to-be-recognized image block, and the first terminal is the same as or different from the second terminal; determining a category of an object in the to-be-recognized image block based on a feature of the object in the to-be-recognized image block; and sending a recognition response message to the second terminal, where the recognition response message carries the category of the object in the to-be-recognized image block, and the category of the object in the to-be-recognized image block is one of the categories of the N categories of samples. The feature library is updated based on the feature library update request of the first terminal, so that accuracy of an object recognition result can be improved, and an object recognition range can be expanded.

In a feasible embodiment, the feature library includes a plurality of center feature vectors and categories corresponding to the center feature vectors, the center feature vectors each are used to represent a common feature of objects of a same category, and the updating a feature library based on the N categories of samples and the categories of the N categories of samples includes: obtaining T' feature vectors if the feature library includes a category of the $T^{th}$ category of samples in the N categories of samples, where the T' feature vectors are feature vectors of samples used for calculating a center feature vector corresponding to the category of the $T^{th}$ category of samples; obtaining a feature vector of each sample in the $T^{th}$ category of samples based on a convolutional neural network CNN feature extraction model, where T is an integer greater than 0 and less than or equal to N; determining a center feature vector of the $T^{th}$ category of samples based on the feature vector of each sample in the $T^{th}$ category of samples and the T' feature vectors, where the $s'^{th}$ element in the center feature vector of the $T^{th}$ category of samples is an average value of the $s'^{th}$ elements in feature vectors of all of the $T^{th}$ category of samples and the $s'^{th}$ elements in the T' feature vectors; and updating, to the center feature vector of the $T^{th}$ category of samples, the center feature vector that is in the feature library and that corresponds to the category of the $T^{th}$ category of samples.

In a feasible embodiment, the updating a feature library based on the N categories of samples and the categories of the N categories of samples further includes: obtaining the feature vector of each sample in the $T^{th}$ category of samples based on the CNN feature extraction model if the feature library does not include the category of each category of samples in the N categories of samples; determining a center feature vector of the $T^{th}$ category of samples based on the feature vector of each sample in the $T^{th}$ category of samples, where the $s'^{th}$ element in the center feature vector of the $T^{th}$ category of samples is an average value of the $s'^{th}$ elements in feature vectors of all of the $T^{th}$ category of samples; and adding the center feature vector of the $T^{th}$ category of samples and the category of the $T^{th}$ category of samples to the feature library.

In a feasible embodiment, before the updating a feature library based on the N categories of samples and the categories of the N categories of samples, the object recognition method further includes: establishing the feature library, where the establishing the feature library includes: obtaining M categories of samples and a category of each category of samples, where each category of samples in the M categories of samples includes a plurality of samples, and M is an integer greater than 0; obtaining a feature vector of each sample in the $K^{th}$ category of samples in the M categories of samples based on the CNN feature extraction model, where K=1, 2, 3, . . . , or M; and determining a center feature vector of the $K^{th}$ category of samples based on the feature vector of each sample in the $K^{th}$ category of samples, where the $s^{th}$ element in the center feature vector of the $K^{th}$ category of samples is an average value of the $s^{th}$ elements in feature vectors of all of the $K^{th}$ category of samples, and the feature library includes the center feature vector of the $K^{th}$ category of samples and the category of the $K^{th}$ category of samples.

In a feasible embodiment, the determining a category of an object in the to-be-recognized image block based on a feature of the object in the to-be-recognized image block includes: extracting the feature of the object in the to-be-recognized image block based on the CNN feature extraction model, to obtain a feature vector of the object in the to-be-recognized image block, where the feature vector is used to represent the feature of the object in the to-be-recognized image block; calculating a distance between the feature vector of the object in the to-be-recognized image block and a center feature vector corresponding to each category in the feature library; and determining a category corresponding to a target center feature vector as the category of the object in the to-be-recognized image block, where the target center feature vector is a center feature vector that is in the feature library and that is closest to the feature vector of the object in the to-be-recognized image block. The distance between the feature vector of the object in the to-be-recognized image block and the center feature vector in the feature library is calculated, so that object recognition efficiency can be improved.

In a feasible embodiment, before the receiving a feature library update request sent by a first terminal, the object recognition method further includes: training the CNN feature extraction model based on a plurality of samples, where the training the CNN feature extraction model based on a plurality of samples includes: obtaining, based on the CNN feature extraction model, a quadruple (a, $C_P$, $C_N$, n) corresponding to a sample s in the plurality of samples, where a is a feature vector of the sample s, $C_P$ is a center feature vector corresponding to a category of the sample s, $C_N$ is a center feature vector that is of a different category of samples and that is closest to a, and n is a feature vector that is of a sample of a different category and that is closest to $C_P$; and training the CNN feature extraction model based on quadruples of the plurality of samples and a loss function, until a value of the loss function is less than preset precision, where the loss function is used to represent precision of the CNN feature extraction model, and the loss function is:

$$\max(D(a,C_P)-D(a,C_N)+\alpha,0)+\max(D(a,C_P)-D(n,C_P)+\beta,0).$$

Herein, $D(a, C_P)$ is a distance between a and $C_P$, $D(a, C_N)$ is a distance between a and $C_N$, $D(n, C_P)$ is a distance between n and $C_P$, and both $\alpha$ and $\beta$ are constants. The CNN feature extraction model is trained through a quadruple network, so that the feature vector that is of the object and that is extracted based on the CNN feature extraction model is closer to the center feature vector corresponding to the category of the object, and is farther from a center feature vector corresponding to a category that is not the category of the object.

According to a third aspect, another object method is provided, including: obtaining a to-be-recognized image and one or more body regions of the to-be-recognized image; determining a saliency score of each of the one or more body regions, where the saliency score of the body region is used to represent a saliency degree of an object in the body region; sending an object recognition request to a server when a saliency score of a body region A is greater than or equal to a categorization threshold, where the recognition and update request carries a to-be-recognized image block, the to-be-recognized image block is a region covered by the body region A in the to-be-recognized image, and the body region A is any one of the one or more body regions; and receiving a recognition response message sent by the server, where the recognition response message carries a category of an object in the to-be-recognized image block.

In a feasible embodiment, the obtaining one or more body regions of the to-be-recognized image includes: inputting the to-be-recognized image into a saliency probability map generation model, to obtain a saliency probability map of the to-be-recognized image, where a size of the saliency probability map is the same as that of the to-be-recognized image; performing binarization processing on the saliency probability map, to obtain a binary saliency probability map; and processing the binary saliency probability map according to a connected region recognition method, to obtain the one or more body regions.

In a feasible embodiment, the determining a saliency score of each of the one or more body regions includes: obtaining a set $N_A$ of saliency probability values in the body region A and a set $N_{A'}$ of saliency probability values in a non-body region A', where the non-body region A' is a region other than the body region A in the saliency probability map; obtaining an average saliency probability value of the body region A and an average saliency probability value of the non-body region A' based on the set $N_A$ of the saliency probability values in the body region A and the set $N_{A'}$ of the saliency probability values in the non-body region A'; and obtaining the saliency score of the body region A through calculation based on the average saliency probability value of the body region A and the average saliency probability value of the non-body region A', where the saliency score of the body region A is a ratio of the average saliency probability value of the body region A to the average saliency probability value of the non-body region A', and saliency scores of the one or more body regions include the saliency score of the body region A.

In a feasible embodiment, after the receiving a recognition response message sent by the server, the object recognition method further includes: displaying a frame of the body region A, the object in the to-be-recognized image block, and the category of the object in a superimposed manner.

In a feasible embodiment, after the displaying a frame of the body region A, the object in the to-be-recognized image block, and the category of the object in a superimposed manner, the object recognition method further includes: sending a first feature library update message to the server, where the first feature library update message carries the to-be-recognized image block and a target category, the target category is a category determined by a user for the object in the to-be-recognized image block, and the target category is different from the category of the object in the to-be-recognized image block.

In a feasible embodiment, the object recognition method further includes: skipping displaying the frame of the body region A if the saliency score of the body region A is less than a display threshold; or displaying an object in the body region A and the frame of the body region A in a superimposed manner if the saliency score of the body region A is greater than or equal to the display threshold and less than the categorization threshold.

In a feasible embodiment, the object recognition method further includes: sending a second feature library update message to the server, where the second feature library update message includes N categories of samples and the categories of the N categories of samples, and the second feature library update message is used to indicate the server to update a feature library based on the N categories of samples and the categories of the N categories of samples.

According to a fourth aspect, another object recognition method is provided, including: sending a feature library update request to a server, where the feature library update request includes N categories of sample images and the categories of the N categories of sample images; sending an object recognition request to the server, where the object recognition request is used to indicate the server to recognize an object in a to-be-recognized image, the to-be-recognized image includes X to-be-recognized image blocks, and X is an integer greater than 0; receiving a response message sent by the server for responding to the object recognition request, where the response message carries a category of an object in each of the X to-be-recognized image blocks, and a category of an object in at least one of the X to-be-recognized image blocks is included in the categories of the N categories of sample images; and displaying the X to-be-recognized image blocks, categories of the X to-be-recognized image blocks, and frames of body regions corresponding to the X to-be-recognized images, where the body regions are regions corresponding to the to-be-recognized image blocks in the to-be-recognized image.

Optionally, the feature library update request is sent to the server after a category addition command of a user is received.

Optionally, the object recognition request is sent to the server after a command of the user for recognizing the object in the to-be-recognized image is received.

In a feasible embodiment, before the sending an object recognition request to the server, the object recognition method further includes: obtaining the to-be-recognized image; inputting the to-be-recognized image into a saliency probability map generation model, to obtain a saliency probability map of the to-be-recognized image, where a size of the saliency probability map is the same as that of the to-be-recognized image; inputting the saliency probability map of the to-be-recognized image into a body region generation model, to obtain Y body regions, where Y is an integer greater than or equal to X; and performing calculation for each of the Y body regions based on a saliency scoring model, to obtain a saliency score of each body region, where the saliency score of the body region is used to represent a saliency degree of an object in the body region, the X to-be-recognized image blocks are regions covered by X body regions in the to-be-recognized image, and the X body regions are body regions whose saliency scores are greater than or equal to a display threshold in the Y body regions.

In a feasible embodiment, the inputting the saliency probability map of the to-be-recognized image into a body region generation model, to obtain Y body regions includes:

performing binarization processing on the saliency probability map, to obtain a binary saliency probability map; and processing the binary saliency probability map according to a connected region recognition method, to obtain the Y body regions.

In a feasible embodiment, the performing calculation for the Y body regions based on a saliency scoring model, to obtain saliency scores of the Y body regions includes: obtaining a set $N_A$ of saliency probability values in a body region A and a set $N_{A'}$ of saliency probability values in a non-body region A', where the non-body region A' is a region other than the body region A in the saliency probability map; obtaining an average saliency probability value of the body region A and an average saliency probability value of the non-body region A' based on the set $N_A$ of the saliency probability values in the body region A and the set $N_{A'}$ of the saliency probability values in the non-body region A'; and obtaining a saliency score of the body region A through calculation based on the average saliency probability value of the body region A and the average saliency probability value of the non-body region A', where the saliency score of the body region A is a ratio of the average saliency probability value of the body region A to the average saliency probability value of the non-body region A', and the saliency scores of the Y body regions include the saliency score of the body region A.

According to a fifth aspect, an object recognition apparatus is provided. The apparatus includes modules configured to perform the method in the first aspect.

According to a sixth aspect, a server is provided. The server includes modules configured to perform the method in the second aspect.

According to a seventh aspect, a terminal device is provided. The terminal device includes modules configured to perform the method in the third aspect or the fourth aspect.

According to an eighth aspect, an object recognition apparatus is provided. The apparatus includes: a memory, configured to store a program; and a processor, configured to execute the program stored in the memory. When the program stored in the memory is executed, the processor is configured to perform the method in the first aspect.

According to a ninth aspect, a computer-readable medium is provided. The computer-readable medium stores program code to be executed by a device, and the program code is used to perform the method in the first aspect, the second aspect, the third aspect, or the fourth aspect.

According to a tenth aspect, a computer program product including an instruction is provided. When the computer program product is run on a computer, the computer is enabled to perform the method in the first aspect, the second aspect, the third aspect, or the fourth aspect.

According to an eleventh aspect, a chip is provided. The chip includes a processor and a data interface. The processor reads, through the data interface, an instruction stored in a memory, to perform the method in the first aspect, the second aspect, the third aspect, or the fourth aspect.

Optionally, in an implementation, the chip may further include the memory. The memory stores the instruction, and the processor is configured to execute the instruction stored in the memory. When the instruction is executed, the processor is configured to perform the method in the first aspect, the second aspect, the third aspect, or the fourth aspect.

According to a twelfth aspect, an electronic device is provided. The electronic device includes the apparatus in any one of the fifth aspect to the eighth aspect.

These aspects or other aspects in this application may be clearer and intelligible in descriptions in the following embodiments.

BRIEF DESCRIPTION OF THE DRAWINGS

To describe the technical solutions in the embodiments of the present application more clearly, the following briefly describes the accompanying drawings for describing the embodiments or the prior art. It is clear that, the accompanying drawings in the following description show merely some embodiments of the present application, and a person of ordinary skill in the art may derive other drawings from these accompanying drawings without creative efforts.

DETAILED DESCRIPTION OF ILLUSTRATIVE EMBODIMENTS

The following describes the embodiments of this application with reference to accompanying drawings.

An object recognition method provided in the embodiments of this application is applicable to scenarios of image categorization, commodity categorization, facial recognition, and album management. Specifically, the object recognition method in the embodiments of this application is applicable to an image categorization scenario and a human-computer interaction scenario. The following briefly describes image categorization and commodity categorization.

Image Categorization Scenario:

After obtaining a to-be-categorized image, an object recognition apparatus obtains a category of an object in the to-be-categorized image according to the object recognition method in this application, and then may categorize the to-be-categorized image based on the category of the object in the to-be-categorized image. A photographer takes many photos every day, such as photos of animals, photos of people, and photos of plants. According to the method in this application, the photos can be quickly categorized based on content in the photos, and may be categorized into photos including animals, photos including people, and photos including plants.

When there are a relatively large quantity of images, efficiency of manual categorization is relatively low, and a person is prone to be tired when processing a same thing for a long time. In this case, a categorization result has a great error. However, according to the method in this application, the images can be quickly categorized without an error.

Commodity Categorization:

After obtaining a commodity image, an object recognition apparatus obtains a category of a commodity in the commodity image according to the object recognition method in this application, and then categorizes the commodity based on the category of the commodity. For a variety of commodities in a large shopping mall or a supermarket, the commodities can be quickly categorized according to the object recognition method in this application, so that time overheads and labor costs are reduced.

Figure 1:
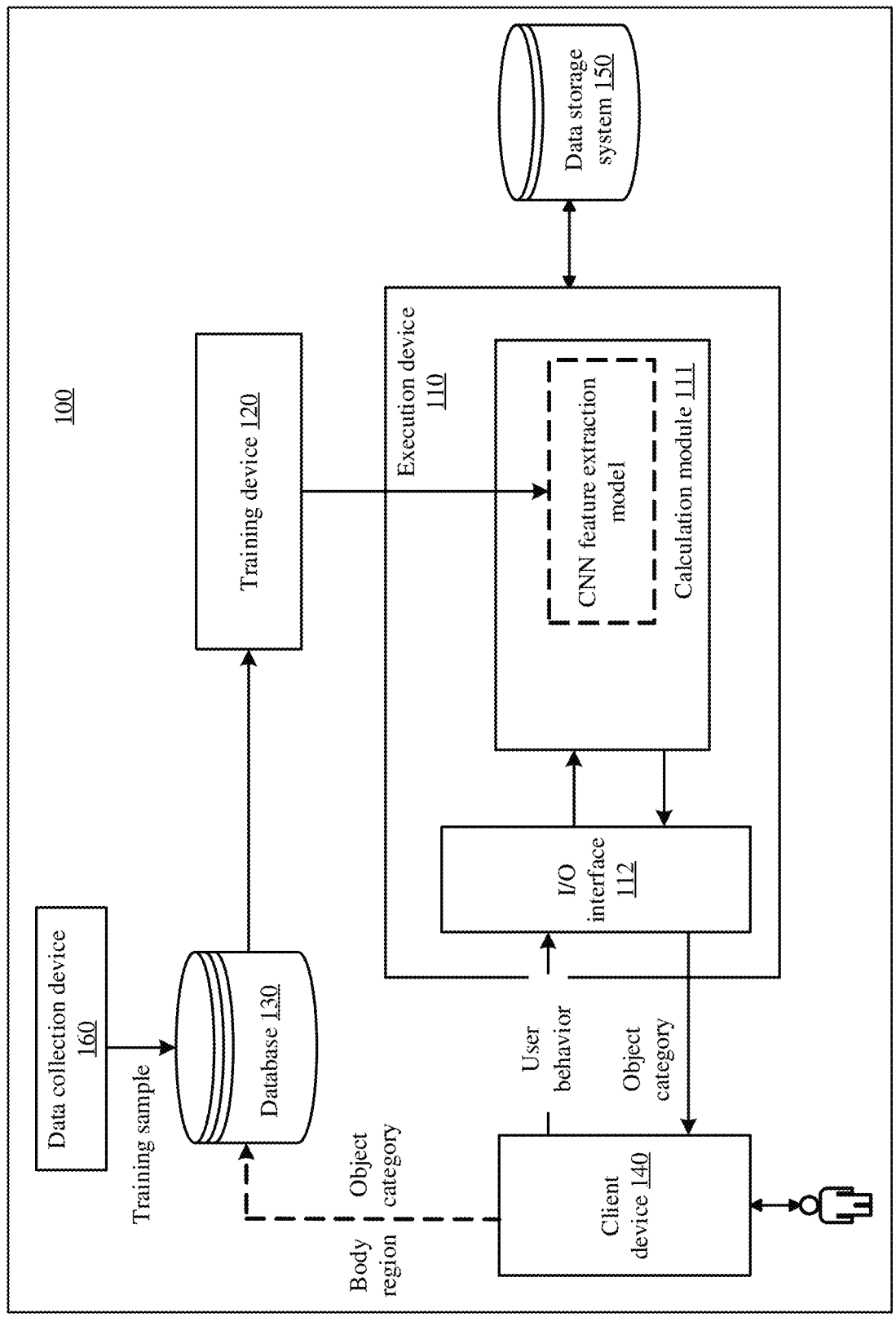
FIG. 1 is a schematic structural diagram of a system architecture according to an embodiment of this application.

The method and the apparatus provided in the embodiments of this application may be further used to expand a training database. As shown in FIG. 1, an I/O interface 112 of an execution device 110 may send, to a database 130 as a training data pair, an image (for example, an image block or an image that includes an object) processed by the execution device 110 and an object category entered by a user, so that training data maintained in the database 130 is richer. In this way, richer training data is provided for training work of a training device 120.

The following describes, from a model training side and a model application side, the method provided in this application.

A CNN feature extraction model training method provided in the embodiments of this application relates to computer vision processing, and may be specifically applied to data processing methods such as data training, machine learning, and deep learning, to perform symbolized and formalized intelligent information modeling, extraction, preprocessing, training, and the like on training data (for example, an image or an image block of an object and a category of the object in this application), so as to finally obtain a trained CNN feature extraction model. In addition, a center feature vector-based quadruple provided in the embodiments of this application may be used in the trained CNN feature extraction model, and input data (for example, the image of the object in this application) may be input into the trained CNN feature extraction model, to obtain output data (for example, a feature vector of the object in this application).

The center feature vector-based quadruple includes a feature vector of a sample, a center feature vector corresponding to a category of the sample, a center feature vector that is of a different category of samples and that is closest to the feature vector of the sample, and a feature vector that is of a sample of a different category and that is closest to the center feature vector corresponding to the category of the sample.

It should be noted that the CNN feature extraction model training method and an object feature extraction method that are provided in the embodiments of this application are applications generated based on a same concept, and may also be understood as two parts of a system, or two phases of an entire process, for example, a model training phase and a model application phase.

Because the embodiments of this application relate to application of a large quantity of neural networks, for ease of understanding, the following first describes related terms and related concepts such as "neural network" in the embodiments of this application.

(1) Object recognition: In object recognition, related methods such as image processing, machine learning, and computer graphics are used to determine a category of an image object.

(2) Neural Network

The neural network may include neurons. The neuron may be an operation unit that uses $x_s$ and an intercept 1 as an input, and an output of the operation unit may be as follows:

$$h_{W,b}(x)=f(W^Tx)=f(\Sigma_{s=1}^{n}W_sx_s+b) \quad (1\text{-}1)$$

Herein, $s=1, 2, \ldots,$ or $n$, n is a natural number greater than 1, $W_s$ is a weight of $x_s$, and b is bias of the neuron. f is an activation function (activation functions) of the neuron, and is used to introduce a non-linear feature into the neural network, to convert an input signal in the neuron into an output signal. The output signal of the activation function may be used as an input of a next convolution layer. The activation function may be a sigmoid function. The neural network is a network formed by joining many single neurons together. To be specific, an output of a neuron may be an input of another neuron. An input of each neuron may be connected to a local receptive field of a previous layer to extract a feature of the local receptive field. The local receptive field may be a region including several neurons.

(3) Deep Neural Network

The deep neural network (DNN), also referred to as a multi-layer neural network, may be understood as a neural network having many hidden layers. The "many" herein does not have a special measurement standard. Based on locations of different layers in the DNN, a neural network in the DNN may be divided into three types: an input layer, a hidden layer, and an output layer. Usually, the first layer is the input layer, the last layer is the output layer, and layers in the middle are all hidden layers. Layers are fully connected. To be specific, any neuron at the $i^{th}$ layer is certainly connected to any neuron at the $(i+1)^{th}$ layer. Although the DNN seems to be complex, the DNN is actually not complex in terms of work at each layer, and is simply expressed as the following linear relationship expression: $\vec{y}=\alpha(W\vec{x}+\vec{b})$, where $\vec{x}$ is an input vector, $\vec{y}$ is an output vector, $\vec{b}$ is a bias vector, W is a weight matrix (also referred to as a coefficient), and $\alpha(\ )$ is an activation function. At each layer, the output vector $\vec{y}$ is obtained by performing such a simple operation on the input vector $\vec{x}$. Because there are many layers in the DNN, there are also many coefficients W and bias vectors $\vec{b}$. Definitions of these parameters in the DNN are as follows: The coefficient W is used as an example. It is assumed that in a DNN having three layers, a linear coefficient from the fourth neuron at the second layer to the second neuron at the third layer is defined as $W_{24}^{3}$. The superscript 3 represents a layer at which the coefficient W is located, and the subscript corresponds to an output third-layer index 2 and an input second-layer index 4. In conclusion, a coefficient from the $k^{th}$ neuron at the $(L-1)^{th}$ layer to the $j^{th}$ neuron at the $L^{th}$ layer is defined as $W_{jk}^{L}$. It should be noted that there is no parameter W at the input layer. In the deep neural network, more hidden layers make the network more capable of describing a complex case in the real world. Theoretically, a model having a larger quantity of parameters indicates higher complexity and a larger "capacity", and indicates that the model can complete a more complex learning task. Training the deep neural network is a process of learning a weight matrix, and a final objective of the training is to obtain a weight matrix of all layers of the trained deep neural network (a weight matrix including vectors W at many layers).

(4) Convolutional Neural Network

The convolutional neural network (CNN) is a deep neural network having a convolutional structure. The convolutional neural network includes a feature extractor consisting of a convolutional layer and a sub sampling layer. The feature extractor may be considered as a filter. A convolution process may be considered as performing convolution by using a trainable filter and an input image or a convolution feature map. The convolutional layer is a neuron layer that performs convolution processing on an input signal in the convolutional neural network. At the convolutional layer in the convolutional neural network, one neuron may be connected to only some adjacent-layer neurons. One convolutional layer usually includes several feature maps, and each feature map may include some rectangularly-arranged neurons. Neurons on a same feature map share a weight. The shared weight herein is a convolution kernel. Weight sharing may be understood as that an image information extraction manner is irrelevant to a location. The principle implied herein is that statistical information of a part of an image is the same as that of another part. To be specific, image information that is learned in a part can also be used in another part. Therefore, same learned image information can be used for all locations in the image. At a same convolutional layer, a plurality of convolution kernels may be used to extract different image information. Usually, a larger quantity of convolution kernels indicates richer image information reflected by a convolution operation.

The convolution kernel may be initialized in a form of a matrix with a random size. In a process of training the convolutional neural network, the convolution kernel may obtain an appropriate weight through learning. In addition, a direct benefit brought by the weight sharing is that connections between layers of the convolutional neural network are reduced and an overfitting risk is lowered.

(5) A recurrent neural network (RNN) is used to process sequence data. In a conventional neural network model, a layer sequence is from an input layer to a hidden layer and then to an output layer, the layers are fully connected, and nodes at each layer are not connected. Such a common neural network resolves many problems, but is still incapable of resolving many other problems. For example, if a word in a sentence is to be predicted, a previous word usually needs to be used, because neighboring words in the sentence are not independent. A reason why the RNN is referred to as the recurrent neural network is that a current output of a sequence is also related to a previous output. A specific representation form is that the network memorizes previous information and applies the previous information to calculation of a current output. To be specific, nodes at the hidden layer are connected instead of not connected, and an input of the hidden layer not only includes an output of the input layer, but also includes an output of the hidden layer at a previous moment. Theoretically, the RNN can process sequence data of any length. Training for the RNN is the same as training for a conventional CNN or DNN. An error back propagation algorithm is used, but there is a difference: If the RNN is expanded, a parameter such as W of the RNN is shared, and this is different from that in the conventional neural network described above by using an example. In addition, during use of a gradient descent algorithm, an output in each step depends not only on a network in the current step, but also on a network status in several previous steps. The learning algorithm is referred to as a back propagation through time (BPTT) algorithm.

Now that there is the convolutional neural network, why the recurrent neural network is required? The reason is simple. In the convolutional neural network, it is assumed that elements are independent of each other, and an input and an output are also independent, such as "cat" and "dog". However, in the real world, many elements are interconnected. For example, stocks change with time. For another example, a person says: I like travel, and my favorite place is Yunnan. I will go if there is a chance. For blank filling herein, people should know that the answer is "to Yunnan". A reason is that people can deduce the answer based on content of the context. However, how can machines do this? The RNN emerges. The RNN aims to make a machine capable of memorizing like a human. Therefore, an output of the RNN needs to depend on current input information and historical memory information.

(6) Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between a predicted value and a target value" needs to be predefined. This is the loss function or an objective function. The loss function and the objective function are important equations used to measure the difference between the predicted value and the target value. The loss function is used as an example. A higher output value (loss) of the loss function indicates a larger difference, and therefore, training of the deep neural network is a process of reducing the loss as much as possible.

(7) Back Propagation Algorithm

The convolutional neural network may correct a value of a parameter in an initial super-resolution model in a training process according to an error back propagation (back propagation, BP) algorithm, so that an error loss of reconstructing the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

The following describes a system architecture provided in the embodiments of this application.

Referring to FIG. 1, an embodiment of this application provides a system architecture 100. As shown in the system architecture 100, a data collection device 160 is configured to collect training data. In this embodiment of this application, the training data includes an image or an image block of an object and a category of the object. The data collection device 160 stores the training data in a database 130. A training device 120 performs training based on the training data maintained in the database 130 to obtain a CNN feature extraction model 101 (explanation: The model 101 herein is the foregoing described model obtained through training in the training phase, and may be a network or the like used for feature extraction). The following uses Embodiment 1 to describe in more detail how the training device 120 obtains the CNN feature extraction model 101 based on the training data. The CNN feature extraction model 101 can be used to extract a feature vector of an object in an object recognition method provided in the embodiments of this application. To be specific, a to-be-recognized image or image block is input into the CNN feature extraction model 101 after related preprocessing, to obtain a feature vector of an object in the to-be-recognized image or image block. The CNN feature extraction model 101 in this embodiment of this application may be specifically a CNN convolutional neural network. It should be noted that, in actual application, the training data maintained in the database 130 is not necessarily collected by the data collection device 160, but may be received from another device. In addition, it should be noted that the training device 120 does not necessarily perform training completely based on the training data maintained in the database 130 to obtain the CNN feature extraction model 101, but may obtain training data from a cloud or another place to perform model training. The foregoing description shall not be construed as a limitation on this embodiment of this application.

The CNN feature extraction model 101 obtained by the training device 120 through training may be applied to different systems or devices, for example, applied to an execution device 110 shown in FIG. 1. The execution device 110 may be a terminal, such as a mobile phone terminal, a tablet computer, a notebook computer, an AR terminal/a VR terminal, or a vehicle-mounted terminal, or may be a server, a cloud, or the like. In FIG. 1, the execution device 110 is provided with an I/O interface 112, configured to exchange data with an external device. A user may input data to the I/O interface 112 through a client device 140. The input data in this embodiment of this application may include a to-be-recognized image or image block entered by the user.

In a process in which the execution device 110 preprocesses the input data, or in a process in which a calculation module in of the execution device 110 performs related processing such as calculation or the like (for example, performs the object recognition method in this application), the execution device 110 may invoke data, code, and the like in a data storage system 150 for corresponding processing, and may further store, in the data storage system 150, data, an instruction, and the like that are obtained through the corresponding processing.

Finally, the I/O interface 112 returns a processing result, for example, a category of an object in the obtained image or image block, to the client device 140, to provide the processing result for the user.

It should be noted that the training device 120 may generate corresponding target models/rules 101 for different targets or different tasks based on different training data. The corresponding target models/rules 101 may be used to implement the foregoing targets or complete the foregoing tasks, to provide a desired result for the user.

In a case shown in FIG. 1, the user may manually provide the input data. The manual provision may be performed in a user interface provided by the I/O interface 112. In another case, the client device 140 may automatically send the input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may also be used as a data collection end to collect the input data that is input into the I/O interface 112 and an output result that is output from the I/O interface 112 in the figure, use the input data and the output result as new sample data, and store the new sample data in the database 130. Certainly, the client device 140 may alternatively not perform collection, but the I/O interface 112 directly stores, in the database 130 as new sample data, the input data that is input into the I/O interface 112 and an output result that is output from the I/O interface 112 in the figure.

It should be noted that FIG. 1 is merely a schematic diagram of the system architecture provided in this embodiment of the present application. A location relationship between the devices, the components, the modules, and the like shown in the figure does not constitute any limitation. For example, in FIG. 1, the data storage system 150 is an external memory relative to the execution device 110, but in another case, the data storage system 150 may alternatively be disposed in the execution device 110.

As shown in FIG. 1, the CNN feature extraction model 101 is obtained through training by using the training device 120. The CNN feature extraction model 101 may be a CNN convolutional neural network in this embodiment of this application.

As described in the foregoing basic concepts, the convolutional neural network is a deep neural network with a convolutional structure, and is a deep learning architecture. In the deep learning architecture, multi-layer learning is performed at different abstract levels according to a machine learning algorithm. As a deep learning architecture, the CNN is a feed-forward artificial neural network. Neurons in the feed-forward artificial neural network may respond to an input image.

Figure 2:
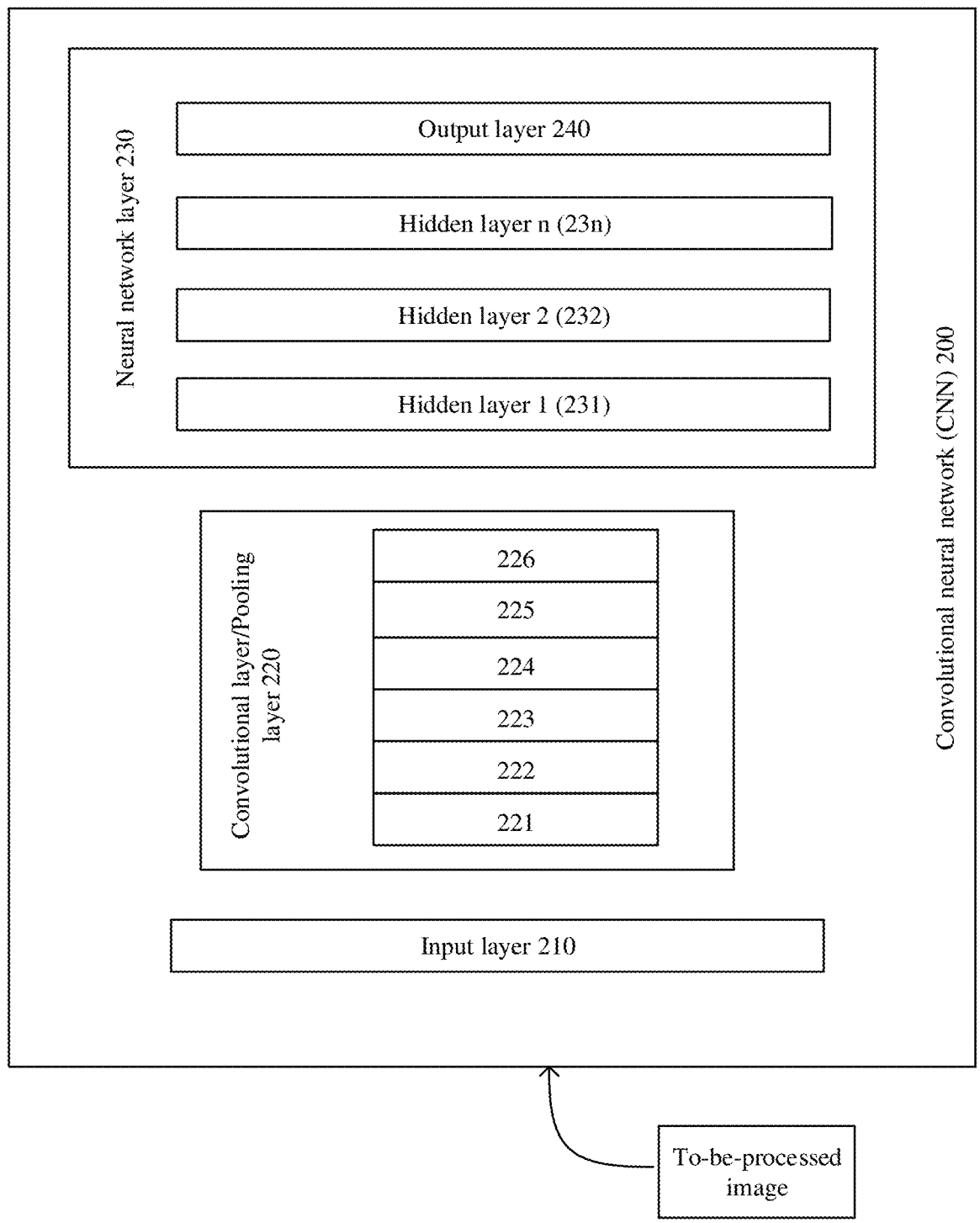
FIG. 2 is a schematic diagram of a CNN feature extraction model according to an embodiment of this application.

As shown in FIG. 2, a convolutional neural network (CNN) 200 may include an input layer 210, convolution layers/pooling layers 220 (where the pooling layers are optional), and a neural network layer 230.

Convolutional Layer/Pooling Layer 220:

Convolutional Layer:

As shown in FIG. 2, the convolutional layers/pooling layers 220 may include layers 221 to 226 shown as an example. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the layer 223 is a pooling layer, the layers 224 and 225 are convolutional layers, and the layer 226 is a pooling layer. To be specific, an output of a convolutional layer may be used as an input of a subsequent pooling layer, or may be used as an input of another convolutional layer to continue to perform a convolution operation.

The following uses the convolutional layer 221 as an example to describe an internal working principle of one convolutional layer.

The convolution layer 221 may include a plurality of convolution operators. The convolution operator is also referred to as a core. A function of the convolution operator in image processing is equivalent to a filter extracting specific information from an input image matrix. The convolution operator may be essentially a weight matrix, and the weight matrix is usually predefined. In a process of performing a convolution operation on an image, the weight matrix is usually processed by pixels one by one (or pixels two by two (this depends on a value of a stride)) along a horizontal direction on the input image, to extract a specific feature from the image. A size of the weight matrix needs to be related to a size of the image. It should be noted that a depth dimension of the weight matrix is the same as that of the input image. In a convolution operation process, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows×columns), namely, a plurality of same-type matrices, are applied. Outputs of the weight matrices are stacked to form a depth dimension of a convolutional image. The dimension herein may be understood as being determined based on the foregoing "a plurality of". Different weight matrices may be used to extract different features from an image. For example, one weight matrix is used to extract edge information of the image, another weight matrix is used to extract a specific color of the image, and still another weight matrix is used to blur unneeded noise in the image. The plurality of weight matrices have the same size (rows× columns). Sizes of feature maps extracted by using the plurality of weight matrices with the same size are also the same, and then the plurality of extracted feature maps with the same size are combined to form an output of a convolution operation.

Weight values in these weight matrices need to be obtained through massive training in actual application. Each weight matrix formed by using the weight values obtained through training may be used to extract information from an input image, to enable the convolutional neural network 200 to perform correct prediction.

When the convolutional neural network 200 has a plurality of convolution layers, an initial convolution layer (for example, the layer 221) usually extracts a relatively large quantity of general features. The general features may also be referred to as low-level features. As a depth of the convolutional neural network 200 increases, a feature extracted from a latter convolution layer (for example, the layer 226) is more complex, for example, a feature such as high level semantics. A feature with higher-level semantics is more applicable to a to-be-resolved problem.

Pooling Layer:

A quantity of training parameters often needs to be reduced. Therefore, the pooling layer often needs to be periodically introduced after the convolutional layer. For the layers 221 to 226 shown in 230 in FIG. 2, one convolutional layer may be followed by one pooling layer, or a plurality of convolutional layers may be followed by one or more pooling layers. During image processing, the pooling layer is only used to reduce a space size of an image. The pooling layer may include an average pooling operator and/or a maximum pooling operator, to perform sampling on an input image to obtain a smaller-size image. The average pooling operator may be used to calculate an average value of pixel values in an image in a specific range. The average value is used as an average pooling result. The maximum pooling operator may be used to select a pixel with a maximum value in a specific range as a maximum pooling result. In addition, similar to that a size of a weight matrix at the convolutional layer needs to be related to a size of an image, an operator at the pooling layer also needs to be related to a size of an image. A size of a processed image output from the pooling layer may be less than a size of an image input into the pooling layer. Each pixel in the image output from the pooling layer represents an average value or a maximum value of a corresponding sub-region of the image input into the pooling layer.

Neural Network Layer 230:

After processing performed by the convolutional layer/pooling layer 220, the convolutional neural network 200 is not ready to output required output information. As described above, at the convolutional layer/pooling layer 220, only a feature is extracted, and parameters resulting from an input image are reduced. However, to generate final output information (required type information or other related information), the convolutional neural network 200 needs to use the neural network layer 230 to generate an output of one required type or a group of required types. Therefore, the neural network layer 230 may include a plurality of hidden layers (231, 232, . . . , and 23n shown in FIG. 2) and an output layer 240. Parameters included in the plurality of hidden layers may be obtained through pre-training based on related training data of a specific task type. For example, the task type may include image recognition, image categorization, and super-resolution image reconstruction.

At the neural network layer 230, the plurality of hidden layers are followed by the output layer 240, namely, the last layer of the entire convolutional neural network 200. The output layer 240 has a loss function similar to categorization cross entropy, and the loss function is specifically used to calculate a prediction error. Once forward propagation (propagation in a direction from 220 to 240, as shown in FIG. 2) of the entire convolutional neural network 200 is completed, back propagation (propagation in a direction from 240 to 220, as shown in FIG. 2) is started to update a weight value and a deviation of each layer mentioned above, to reduce a loss of the convolutional neural network 200 and an error between a result output by the convolutional neural network 200 through the output layer and an ideal result.

It should be noted that the convolutional neural network 200 shown in FIG. 2 is merely an example convolutional neural network. In specific application, the convolutional neural network may alternatively exist in a form of another network model.

The following describes a hardware structure of a chip provided in an embodiment of this application.

Figure 3:
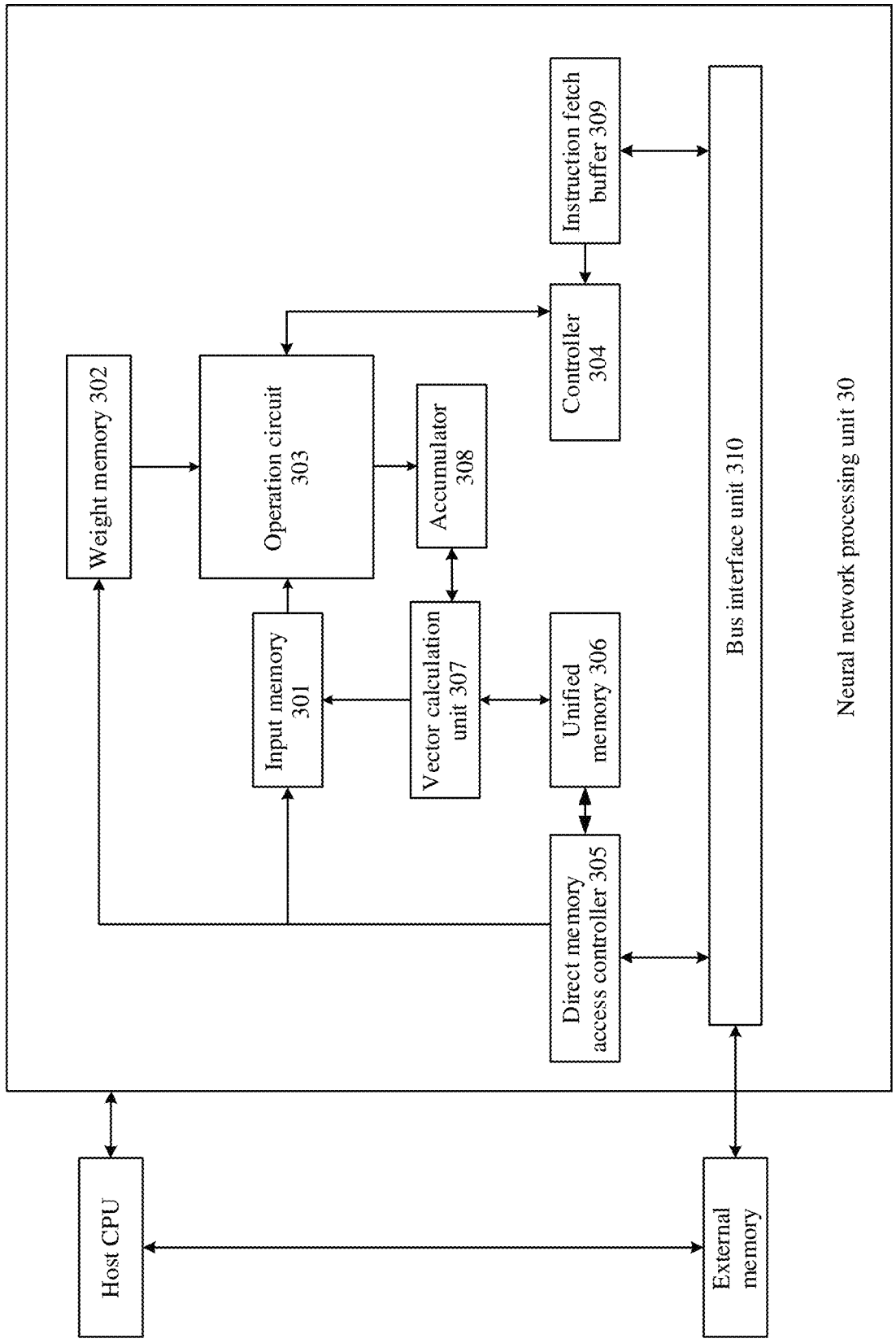
FIG. 3 is a schematic diagram of a hardware structure of a chip according to an embodiment of this application.

FIG. 3 shows a hardware structure of a chip according to an embodiment of the present application. The chip includes a neural network processing unit 30. The chip may be disposed in the execution device 110 shown in FIG. 1, to complete calculation work of the calculation module 11. The chip may be alternatively disposed in the training device 120 shown in FIG. 1, to complete training work of the training device 120 and output the target model/rule 101. All algorithms at the layers in the convolutional neural network shown in FIG. 2 may be implemented in the chip shown in FIG. 3.

For the neural network processing unit NPU 30, the NPU serves as a coprocessor, and is mounted onto a host CPU (Host CPU). The host CPU assigns a task. A core part of the NPU is an operation circuit 303, and a controller 304 controls the operation circuit 303 to extract data in a memory (a weight memory or an input memory) and perform an operation.

In some implementations, the operation circuit 303 includes a plurality of process engines (PE). In some implementations, the operation circuit 303 is a two-dimensional systolic array. The operation circuit 303 may alternatively be a one-dimensional systolic array or another electronic circuit that can perform mathematical operations such as multiplication and addition. In some implementations, the operation circuit 303 is a general-purpose matrix processor.

For example, it is assumed that there is an input matrix A, a weight matrix B, and an output matrix C. The operation circuit fetches data corresponding to the matrix B from a weight memory 302 and buffers the data on each PE of the operation circuit. The operation circuit fetches data of the matrix A from an input memory 301, to perform a matrix operation on the matrix B, and stores an obtained partial result or an obtained final result of the matrix into an accumulator 308.

A vector calculation unit 307 may perform further processing such as vector multiplication, vector addition, an exponent operation, a logarithm operation, or value comparison on an output of the operation circuit. For example, the vector calculation unit 307 may be configured to perform network calculation, such as pooling, batch normalization, or local response normalization, at a non-convolutional/non-FC layer in a neural network.

In some implementations, the vector calculation unit 307 can store a processed output vector in a unified cache 306. For example, the vector calculation unit 307 may apply a non-linear function to the output of the operation circuit 303, for example, a vector of an accumulated value, to generate an active value. In some implementations, the vector calculation unit 307 generates a normalized value, a combined value, or both a normalized value and a combined value. In some implementations, the processed output vector can be used as an activation input of the operation circuit 303, for example, can be used at a subsequent layer in the neural network.

Entry: Based on an actual situation, an operation of a description algorithm may be performed by the operation circuit 303 or the vector calculation unit 307.

The unified memory 306 is configured to store input data and output data.

For weight data, a direct memory access controller (DMAC) 305 transfers input data in an external memory to the input memory 301 and/or the unified memory 306, stores weight data in the external memory into the weight memory 302, and stores data in the unified memory 306 into the external memory.

A bus interface unit (BIU) 310 is configured to implement interaction among the host CPU, the DMAC, and an instruction fetch buffer 309 through a bus.

The instruction fetch buffer 309 connected to the controller 304 is configured to store an instruction to be used by the controller 304.

The controller 304 is configured to invoke the instruction buffered in the instruction fetch buffer 309, to control a working process of the operation accelerator.

Entry: Data herein may be described as description data according to an actual application, for example, a detected vehicle speed, a distance to an obstacle, and the like.

Usually, the unified memory 306, the input memory 301, the weight memory 302, and the instruction fetch buffer 309 each are an on-chip memory. The external memory is a memory outside the NPU. The external memory may be a double data rate synchronous dynamic random access memory (DDR SDRAM for short), a high bandwidth memory (HBM), or another readable and writable memory.

Entry: It may be described based on an actual situation that program algorithms in FIG. 1 and FIG. 2 are jointly completed by the host CPU and the NPU.

Operations at the layers in the convolutional neural network shown in FIG. 2 may be performed by the operation circuit 303 or the vector calculation unit 307.

Figure 4:
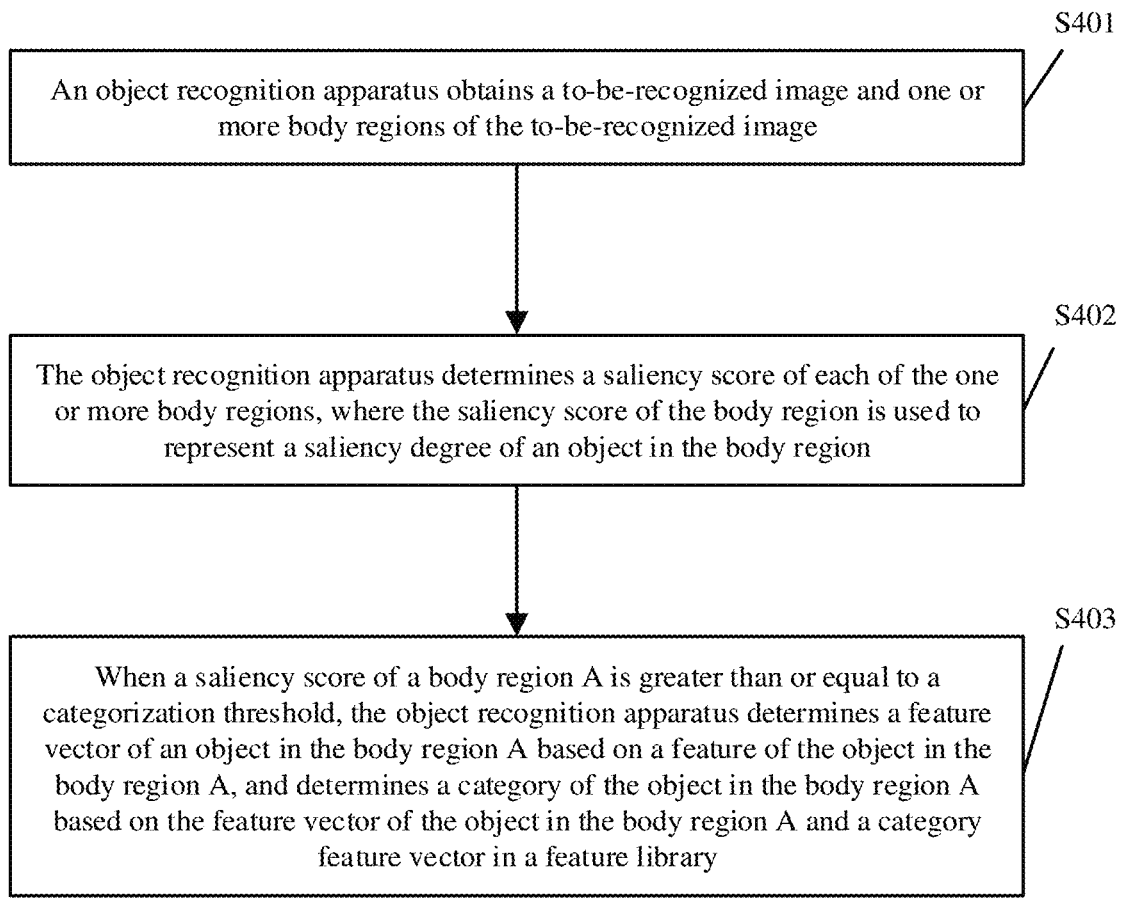
FIG. 4 is a schematic flowchart of an object recognition method according to an embodiment of this application.

FIG. 4 is a schematic flowchart of an object recognition method according to an embodiment of this application. As shown in FIG. 4, the method includes the following steps.

S401: An object recognition apparatus obtains a to-be-recognized image and one or more body regions of the to-be-recognized image.

The body regions include a to-be-recognized object.

Optionally, the object recognition apparatus obtains the to-be-recognized image through a camera of the object recognition apparatus, or the object recognition apparatus obtains the to-be-recognized image from a local storage device of the object recognition apparatus.

In a possible embodiment, that the object recognition apparatus obtains the one or more body regions of the to-be-recognized image includes: inputting the to-be-recognized image into a saliency probability map generation model, to obtain a saliency probability map of the to-be-recognized image, where a size of the saliency probability map is the same as that of the to-be-recognized image; performing binarization processing on the saliency probability map, to obtain a binary saliency probability map; and processing the binary saliency probability map according to a connected region recognition method, to obtain the one or more body regions.

The saliency probability map of the to-be-recognized image is a grayscale map. A pixel value of each pixel in the saliency probability map represents a saliency probability at a corresponding location (that is, a saliency probability of the pixel at the corresponding location) in the to-be-recognized image, and a larger pixel value of a pixel in the saliency probability map indicates a higher saliency probability at a corresponding location in the to-be-recognized image. A value range of the pixel value of the pixel in the saliency probability map is [0, 1]. The size of the to-be-recognized image is consistent with the size of the saliency probability map of the to-be-recognized image.

The saliency probability map generation model is a binary segmentation model, and there are two segmentation categories: a salient object and a background. A plurality of architectures, such as a feature pyramid network (FPN), a pyramid scene parsing network (PSP-Net), and a refinement network (RefineNet), may be used for the saliency probability map generation model.

The object recognition apparatus performs binarization processing on the saliency probability map of the to-be-recognized image, to obtain the binary saliency probability map. Specifically, the pixel value of each pixel in the saliency probability map of the to-be-recognized image is compared with a preset threshold. When a pixel value of a pixel P is less than the preset threshold, the pixel value of the pixel P is set to 0. When a pixel value of a pixel P is greater than or equal to the preset threshold, the pixel value of the pixel P is set to 1. The pixel P is any pixel in the saliency probability map of the to-be-recognized image. According to this method, the binary saliency probability map is obtained.

The object recognition apparatus processes the binary saliency probability map according to the connected region recognition method, to obtain the one or more body regions. Specifically, considering miss detection and discontinuity of the saliency probability map in terms of an object, a closed operation algorithm is used to patch a discontinuous region in the binary saliency probability map. Then, a two-pass algorithm is used to recognize connected regions in the binary saliency probability map, and different connected regions in the binary saliency probability map are marked. Subsequently, the connected regions are screened, and a connected region evaluation rule is designed to select a body connected region. A minimum rectangular frame is generated for the selected connected region, and a region covered by the minimum rectangular frame is a body region. For the to-be-recognized image, the one or more body regions may be obtained in this manner.

S402: The object recognition apparatus determines a saliency score of each of the one or more body regions, where the saliency score of the body region is used to represent a saliency degree of an object in the body region.

In a possible embodiment, that the object recognition apparatus determines the saliency score of each of the one or more body regions includes: obtaining a set $N_A$ of saliency probability values in a body region A and a set $N_{A'}$ of saliency probability values in a non-body region A', where the non-body region A' is a region other than the body region A in the saliency probability map; obtaining an average saliency probability value of the body region A' and an average saliency probability value of the non-body region A' based on the set $N_A$ of the saliency probability values in the body region A and the set $N_{A'}$ of the saliency probability values in the non-body region A'; and obtaining a saliency score of the body region A through calculation based on the average saliency probability value of the body region A and the average saliency probability value of the non-body region A'.

The saliency score of the body region A is a ratio of the average saliency probability value of the body region A to the average saliency probability value of the non-body region A', and a saliency score of the one or more body regions includes the saliency score of the body region A.

Specifically, based on the body region A, the object recognition apparatus divides the saliency probability map of the to-be-recognized image into the body region A and the non-body region A'. The non-body region A' is the region other than the body region A in the saliency probability map of the to-be-recognized image. The object recognition apparatus obtains the set $N_A$ of the saliency probability values in the body region A and the set $N_{A'}$ of the saliency probability values in the non-body region A'. The set $N_A$ of the saliency probability values in the body region A is a set of pixel values of all pixels in the body region A in the saliency probability map of the to-be-recognized image. Likewise, the set $N_{A'}$ of the saliency probability values in the non-body region A' is a set of pixel values of all pixels in the non-body region A' in the saliency probability map of the to-be-recognized image.

Figure 5:
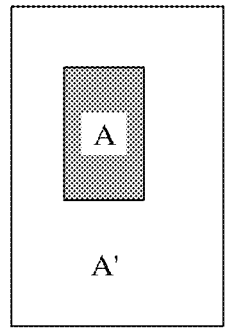
FIG. 5 is a schematic diagram of a body region according to an embodiment of this application.

The object recognition apparatus obtains the average saliency probability value of the body region A' and the average saliency probability value of the non-body region A based on the set $N_A$ of the saliency probability values in the body region A and the set $N_{A'}$ of the saliency probability values in the non-body region A', and then obtains the saliency score of the body region A through calculation based on the average saliency probability value of the body region A and the average saliency probability value of the non-body region A. The saliency score of the one or more body regions includes the saliency score of the body region A. As shown in FIG. 5, a gray part is the body region A, and a white part is the body region A'.

The average saliency probability value of the body region A' is a ratio of a sum of the pixel values of all the pixels in the body region A' to a quantity of all pixels in the body region A'. Likewise, the average saliency probability value of the body region A is a ratio of a sum of the pixel values of all the pixels in the body region A to a quantity of all pixels in the body region A. The saliency score of the body region A is the ratio of the average saliency probability value of the body region A to the average saliency probability value of the non-body region A:

$$S = \frac{\rho_1}{\rho_2} = \frac{\Sigma_{i \in N_A} P_i/|N_A|}{\Sigma_{j \in N_{A'}} P_j/|N_{A'}|}.$$

Herein, S is the saliency score of the body region A. $\rho_1$ is the average saliency probability value of the body region A, namely, $\Sigma_{i \in N_A} P_i/|N_A|$. $\rho_2$ is the average saliency probability value of the body region A', namely, $\Sigma_{j \in N_{A'}} P_j/|N_{A'}|$. $N_A$ is the quantity of pixels in the body region A. $N_{A'}$ is the quantity of pixels in the body region A'. $\Sigma_{i \in N_A} P_i$ is the sum of the pixel values of all the pixels in the body region A. $P_i$ is a pixel value of the $i^{th}$ pixel in the body region A. $\Sigma_{j \in N_{A'}} P_j$ is the sum of the pixel values of all the pixels in the body region A'. $P_j$ is a pixel value of the $j^{th}$ pixel in the body region A'.

According to an image body-based recognition solution, a main part of an image can be generated and a recognition window of the part can be obtained without pre-obtaining a category-related training sample. In addition, the recognition window is used to divide a body region into a body pixel set and a non-body pixel set, and a saliency score of the body region is calculated. In this way, a to-be-recognized category is decoupled from generation of the recognition window, to provide support for subsequently expanding a feature library and adding an object category.

S403: When the saliency score of the body region A is greater than or equal to a categorization threshold, the object recognition apparatus determines a feature vector of an object in the body region A based on a feature of the object in the body region A, and determines a category of the object in the body region A based on the feature vector of the object in the body region A and a category feature vector in a feature library.

The body region A is any one of the one or more body regions, and the category feature vector is used to represent a common feature of objects of a same category or a feature of one category of objects.

Each element in a category feature vector corresponding to an object represents a common feature of such category of objects. For example, a category feature vector of a dog is (A, B, C), where A is used to represent a feature of an ear of the dog, B is used to represent a feature of an eye of the dog, and C is used to represent a feature of a nose of the dog.

In a possible embodiment, the category feature vector in the feature library is a center feature vector, and the center feature vector is used to represent a common feature of objects of a same category.

That the object recognition apparatus determines the feature vector of the object in the body region A based on the feature of the object in the body region A, and determines the category of the object in the body region A based on the feature vector of the object in the body region A and the category feature vector in the feature library includes:

The object recognition apparatus obtains the feature vector of the object in the body region A based on a CNN feature extraction model; calculates a distance between the feature vector of the object in the body region A and a center feature vector corresponding to each category in the feature library; and determines a category corresponding to a target center feature vector as the category of the object in the body region A, where the target center feature vector is a center feature vector that is in the feature library and that is closest to the feature vector of the object in the body region A.

It should be noted that the feature library may be considered as a table of a correspondence between an object category and a center feature vector. The correspondence table includes center feature vectors corresponding to a plurality of categories.

In an object recognition solution in the prior art, a distance between a feature vector of a to-be-recognized object and a feature vector, of a known sample, included in a feature library is calculated, and then a category of the to-be-recognized object is determined based on the distance. However, in the solution in this application, a distance between a feature vector of a to-be-recognized object and a center feature vector corresponding to a known category in a feature library is calculated, and then a category of the to-be-recognized object is determined based on the distance. The feature library in this application includes only the object category and the center feature vector. Compared with those in the prior art, storage space is saved, and object recognition efficiency is improved.

In a possible embodiment, before the feature vector of the object in the body region A is obtained based on the CNN feature extraction model, the method further includes: The object recognition apparatus trains the CNN feature extraction model based on a plurality of samples, where the training the CNN feature extraction model based on a plurality of samples includes: obtaining, based on the CNN feature extraction model, a quadruple (a, $C_P$, $C_N$, n) corresponding to a sample s in the plurality of samples, where a is a feature vector of the sample s, $C_P$ is a center feature vector corresponding to a category of the sample s, $C_N$ is a center feature vector that is of a different category of samples and that is closest to a, n is a feature vector that is of a sample of a different category and that is closest to $C_P$, and the sample s is any one of the plurality of samples; and training the CNN feature extraction model based on a quadruple of each of the plurality of samples and a loss function, until a value of the loss function is less than a preset precision value, where the loss function is used to represent precision of the CNN feature extraction model.

The loss function is max(D(a, $C_P$)−D(a, $C_N$)+α, 0)+max (D(a, $C_P$)−D(n, $C_P$)+β, 0). D(a, $C_P$) is a distance between a and $C_P$. $C_N$ is a center feature vector that is of a category corresponding to a different category of samples and that is closest to a. D(a, $C_N$) is a distance between a and $C_N$. n is a feature vector that is of a sample of a different category and that is closest to $C_P$. D(n, $C_P$) is a distance between n and $C_P$. Both α and β are constants.

It should be noted that an objective of training the CNN feature extraction model is to make a sum of a threshold and a distance between a feature vector of a same category of samples and a center feature vector of the category of samples less than a distance between the feature vector and a center feature vector of any other category. Based on this, in a process of determining a category of an object in a body region, distances between a feature vector of the object category in the body region and feature vectors of all objects in the feature library do not need to be calculated, but only a distance between the feature vector of the object in the body region and a center feature vector of each category needs to be calculated. By learning and calculating the center feature vector, storage space occupied by the feature library can be reduced, and recognition efficiency can be improved.

Specifically, after obtaining the plurality of samples, the object recognition apparatus extracts a feature vector of any sample s based on the CNN feature extraction model, then obtains a quadruple (a, $C_P$, $C_N$, n) of the sample s based on the feature vector of the sample s, and determines a value of the loss function of the CNN feature extraction model based on the quadruple of the sample s. If the value of the loss function is greater than or equal to preset precision, a parameter of the CNN feature extraction model is adjusted according to a back propagation algorithm. After the parameter of the CNN feature extraction model is adjusted, a feature vector of any sample s' other than the sample s in the plurality of samples is extracted based on the CNN feature extraction model whose parameter is adjusted, a quadruple of the sample s' is obtained based on the feature vector of the sample s', and then a value of the loss function of the CNN feature extraction model is determined based on the quadruple of the sample s'. If the current value of the loss function is greater than or equal to the preset precision value, the parameter of the CNN feature extraction model continues to be adjusted according to the back propagation algorithm. The foregoing steps are repeated until the value of the loss function is less than the preset precision value.

It should be noted that a smaller value of the loss function of the CNN feature extraction model represents higher precision of the CNN feature extraction model.

Figure 6:
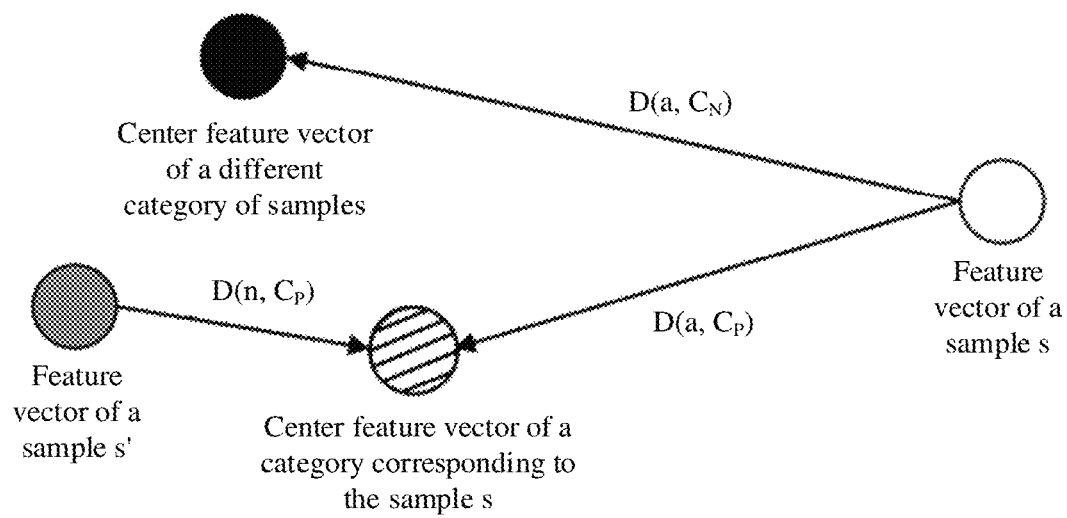
FIG. 6 is a schematic diagram of a quadruple according to an embodiment of this application.

As shown in FIG. 6, a black circle represents the center feature vector $C_N$ that is of the category corresponding to the different category of samples and that is closest to the sample s, a white circle represents the feature vector a of the sample s, a shadow circle represents the center feature vector $C_P$ of the category of the sample s, and a gray circle represents the feature vector n that is of the different category of sample and that is closest to the center feature vector $C_P$.

In a possible embodiment, the object recognition apparatus establishes the feature library. That the object recognition apparatus establishes the feature library includes: The object recognition apparatus obtains M categories of samples and a category of each category of samples, where each category of samples in the M categories of samples includes a plurality of samples, and M is an integer greater than 0; obtains a feature vector of each sample in the $K^{th}$ category of samples in the M categories of samples based on the CNN feature extraction model, where K=1, 2, 3, . . . , or M; and determines a center feature vector of the $K^{th}$ category of samples based on the feature vector of each sample in the $K^{th}$ category of samples, where the $s^{th}$ element in the center feature vector of the $K^{th}$ category of samples is an average value of the $s^{th}$ elements in feature vectors of the samples in the $K^{th}$ category of samples, and the feature library includes the center feature vector of the $K^{th}$ category of samples and the category of the $K^{th}$ category of samples.

Specifically, for example, the $K^{th}$ category of samples in the M categories of samples includes $N^K$ samples, the $N^K$ samples are samples of a same category, and $N^K$ is an integer greater than 1. The object recognition apparatus separately inputs the $N^K$ samples into the CNN feature extraction model, to obtain a feature vector of each of the $N^K$ samples. Then, the object recognition apparatus obtains the center feature vector of the $K^{th}$ category of samples through calculation based on the feature vector of each of the $N^K$ samples, where the $s^{th}$ element in the center feature vector of the $K^{th}$ category of samples is an average value of the $s^{th}$ elements in feature vectors of the $N^K$ samples. Finally, the object recognition apparatus adds the center feature vector of the $K^{th}$ category of samples to the feature library. A formula for calculating the center feature vector is as follows:

$$C_K = \frac{1}{N^K} \sum_i^{N^K} f(x_i^K).$$

Herein, $f$ is a CNN mapping function, $x_i^K$ is the $i^{th}$ sample in the $K^{th}$ category of samples, $f(x_i^K)$ is a feature vector of the $i^{th}$ sample in the $K^{th}$ category of samples, and $C_K$ is the center feature vector of the $K^{th}$ category of samples.

For example, a center feature vector of a dog is (A, B, C), where A is used to represent a feature of an ear, B is used to represent a feature of an eye, and C is used to represent a feature of a nose. The center feature vector (A, B, C) of the dog is obtained based on a feature vector (A1, B1, C1) of Husky, a feature vector (A2, B2, C2) of Bulldog, a feature vector (A3, B3, C3) of Akita dog, and a feature vector (A4, B4, C4) of Chinese rural dog. Herein, A=(A1+A2+A3+A4)/4, B=(B1+B2+B3+B4)/4, and C=(C1+C2+C3+C4)/4.

In a possible embodiment, the object recognition apparatus further receives a sample and a category corresponding to the sample that are sent by a third party, to update the feature library.

Specifically, the object recognition apparatus receives N categories of samples and a category of each category of samples from the third party. Each category of samples in the N categories of samples includes a plurality of samples, and N is an integer greater than 0. Then, the object recognition apparatus determines whether the feature library includes the categories of the N categories of samples.

If the object recognition apparatus determines that the feature library includes a category of the $T^{th}$ category of samples in the N categories of samples, the object recognition apparatus obtains T' feature vectors, or a sum of elements at same locations in the T' feature vectors and the quantity T'. The T' feature vectors are feature vectors of samples used for calculating a center feature vector corresponding to the category of the $T^{th}$ category of samples, and T is an integer greater than 0 and less than or equal to N. The object recognition apparatus obtains a feature vector of each sample in the $T^{th}$ category of samples based on the CNN feature extraction model; determines a center feature vector of the $T^{th}$ category of samples based on the feature vector of each sample in the $T^{th}$ category of samples and the T' feature vectors, where the $s'^{th}$ element in the center feature vector of the $T^{th}$ category of samples is an average value of the $s'^{th}$ elements in feature vectors of all of the $T^{th}$ category of samples and the $s'^{th}$ elements in the T' feature vectors; and updates, to the center feature vector of the $T^{th}$ category of samples, the center feature vector that is in the feature library and that corresponds to the category of the $T^{th}$ category of samples.

If the object recognition apparatus determines that the feature library does not include a category of the $T^{th}$ category of samples in the $N^{th}$ category of samples, the object recognition apparatus obtains a feature vector of each sample in the $T^{th}$ category of samples based on the CNN feature extraction model; then determines a center feature vector of the $T^{th}$ category of samples based on the feature vector of each sample in the $T^{th}$ category of samples, where the $s'^{th}$ element in the center feature vector of the $T^{th}$ category of samples is an average value of the $s'^{th}$ elements in feature vectors of all of the $T^{th}$ category of samples; and finally adds the center feature vector of the $T^{th}$ category of samples and the category of the $T^{th}$ category of samples to the feature library. The feature library is updated based on a sample and a category of an object in the sample that are sent by the third party or an app service provider. This improves object recognition precision and expands an object recognition range.

It should be noted that the feature library may be considered as a table of a correspondence between an object category and a center feature vector.

Figures 7A, 7B:
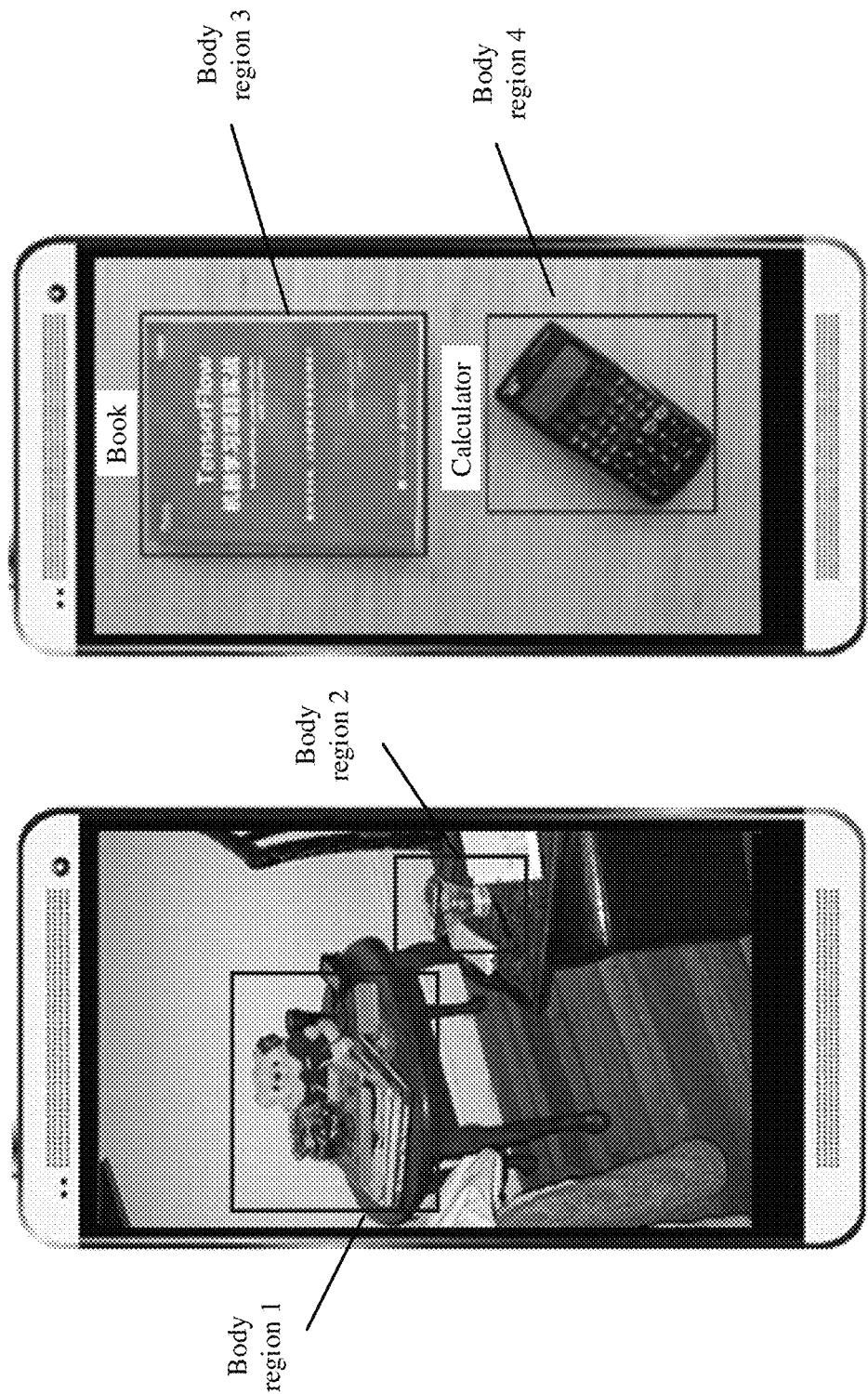
FIG. 7a and FIG. 7b are a schematic diagram of an object recognition result according to an embodiment of this application.

In a possible embodiment, a frame of the body region A, the object in the body region A, and the category of the object are displayed in a superimposed manner after the category of the object in the body region A is determined based on the feature vector of the object in the body region A and the category feature vector in the feature library. As shown in FIG. 7b, there is a body region 3 and a body region 4. A frame of the body region 3 and a category (that is, "book") of an object in the body region 3 are displayed, and a frame of the body region 4 and a category (that is, "calculator") of an object in the body region 4 are displayed.

In a possible embodiment, a frame of the body region A is not displayed if the saliency score of the body region A is less than a display threshold; or the object in the body region A and a frame of the body region A are displayed in a superimposed manner if the saliency score of the body region A is greater than or equal to the display threshold and less than the categorization threshold. As shown in FIG. 7a, there is a body region 1 and a body region 2. Only a frame of the body region 1 and a frame of the body region 2 are displayed, but a category of an object in the body region 1 and a category of an object in the body region 2 are not displayed.

A saliency score of a to-be-recognized body region is obtained based on pixel-by-pixel saliency of an image. A different between the saliency score and that obtained through a common recognition network lies in that the saliency score is not obtained based on a probability that an object in a recognition window belongs to a predefined category, but is obtained by evaluating saliency of the object in the recognition window relative to an object outside the recognition window. An interactive display solution based on the saliency score can be used to guide a user to gradually target a to-be-recognized object, so that recognition accuracy and user experience are improved.

It can be learned that in the solutions in this embodiment of this application, after obtaining the to-be-recognized image, the object recognition apparatus obtains the one or more body regions of the to-be-recognized image; determines the saliency score of each of the one or more body regions; and when the saliency score of the body region A is greater than or equal to the categorization threshold, determines the feature vector of the object in the body region A based on the feature of the object in the body region A, and determines the category of the object in the body region A based on the feature vector of the object in the body region A and the category feature vector in the feature library, where the body region A is any one of the one or more body regions. Compared with the prior art, in this application, recognition for a body region of an image is decoupled from object recognition, so that object categories in the feature library can be increased through the third party. In this way, object recognition precision is improved, and an object recognition range is expanded. In an object recognition process, a feature vector of a to-be-recognized image is compared with a center feature vector in the feature library. This improves an object recognition speed.

Figure 8:
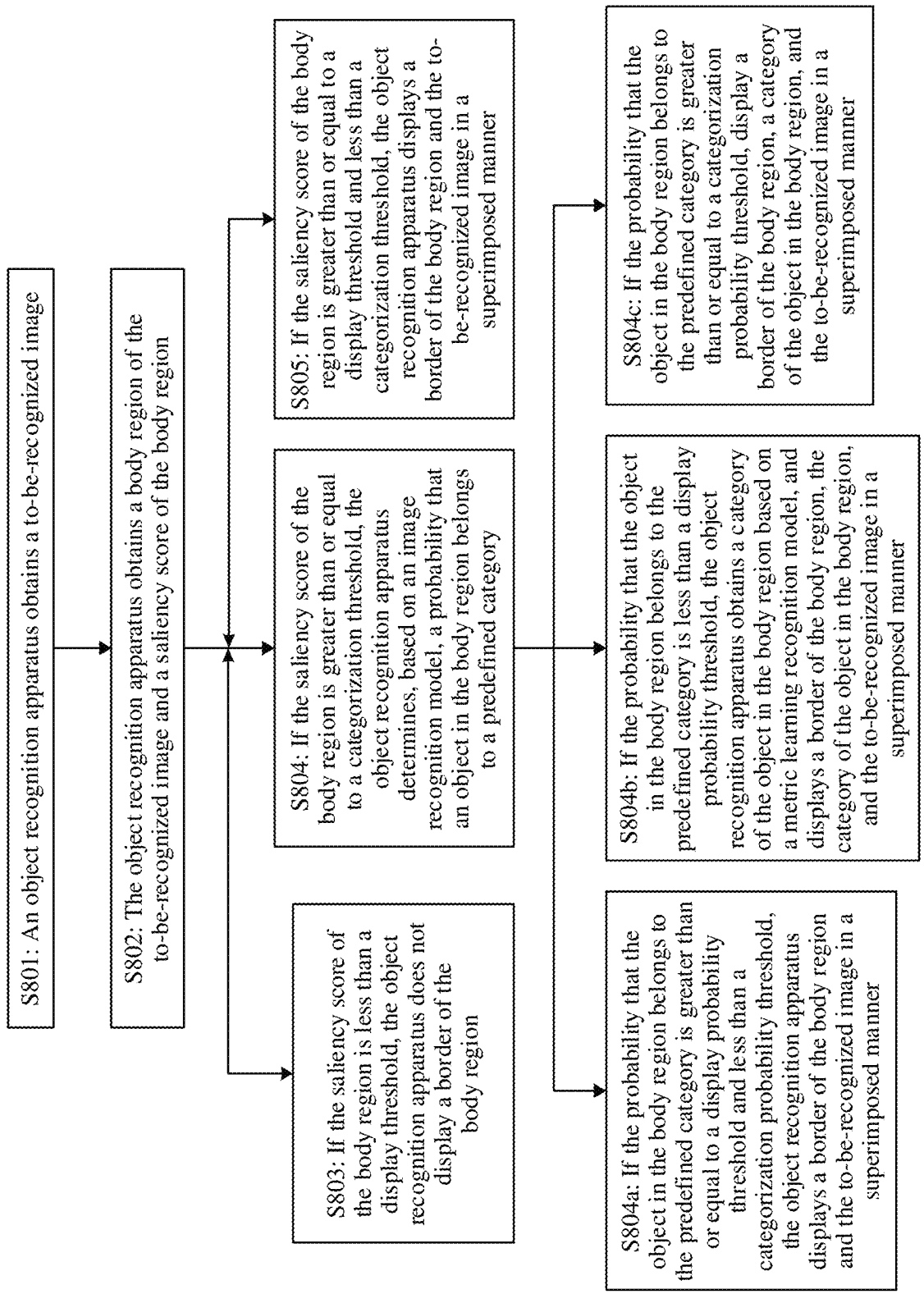
FIG. 8 is a schematic flowchart of another object recognition method according to an embodiment of this application.

FIG. 8 is a schematic flowchart of another object recognition method according to an embodiment of this application. As shown in FIG. 8, the method includes the following steps.

S801: An object recognition apparatus obtains a to-be-recognized image.

Specifically, the object recognition apparatus obtains the to-be-recognized image through a camera of the object recognition apparatus, or locally obtains the to-be-recognized image.

S802: The object recognition apparatus obtains a body region of the to-be-recognized image and a saliency score of the body region.

The saliency score of the body region is used to represent a saliency degree of an object in the body region relative to a background in the to-be-recognized image.

It should be noted herein that, for a process in which the object recognition apparatus obtains the body region of the to-be-recognized image and the saliency score of the body region, refer to related content in step S401 and step S402. Details are not described herein again.

S803: If the saliency score of the body region is less than a display threshold, the object recognition apparatus does not display a border of the body region.

S804: If the saliency score of the body region is greater than or equal to a categorization threshold, the object recognition apparatus determines, based on an image recognition model, a probability that the object in the body region belongs to a predefined category.

Specifically, if the saliency score of the body region is greater than or equal to the categorization threshold, the object recognition apparatus inputs the body region into the image recognition model (for example, a softmax model) for calculation, to determine the probability that the object in the body region belongs to the predefined category.

S804a: If the probability that the object in the body region belongs to the predefined category is greater than or equal to a display probability threshold and less than a categorization threshold, the object recognition apparatus displays a border of the body region and the to-be-recognized image in a superimposed manner.

It should be noted that for the border of the body region, refer to the body regions in FIG. 7a and FIG. 7b.

S804b: If the probability that the object in the body region belongs to the predefined category is less than a display probability threshold, the object recognition apparatus obtains a category of the object in the body region based on a metric learning recognition model, and displays a border of the body region, the category of the object in the body region, and the to-be-recognized image in a superimposed manner.

That the object recognition apparatus obtains the category of the object in the body region based on the metric learning recognition model specifically includes: first obtaining a feature vector of the object in the body region; then calculating a distance between the feature vector of the object in the body region and each center feature vector in a feature library; and determining, as the category of the object in the body region, a category corresponding to a center feature vector closest to the feature vector of the object in the body region.

S804c: If the probability that the object in the body region belongs to the predefined category is greater than or equal to a categorization probability threshold, display a border of the body region, a category of the object in the body region, and the to-be-recognized image in a superimposed manner.

It should be noted that the category that is of the object in the body region and that is displayed by the object recognition apparatus is the foregoing predefined category.

S805: If the saliency score of the body region is greater than or equal to a display threshold and less than a categorization threshold, the object recognition apparatus displays a border of the body region and the to-be-recognized image in a superimposed manner.

In this embodiment, an image saliency-based object detection procedure is combined with a conventional object recognition model, to fully exert an object recognition capability of the object recognition model trained by using a large quantity of samples. In this embodiment, when a strong supervision-based object recognition model cannot recognize an object in an image or a predefined category of the object, a metric learning-based object recognition model may be newly added, and a quantity of categories of recognizable objects can be increased based on the model.

Figure 9:
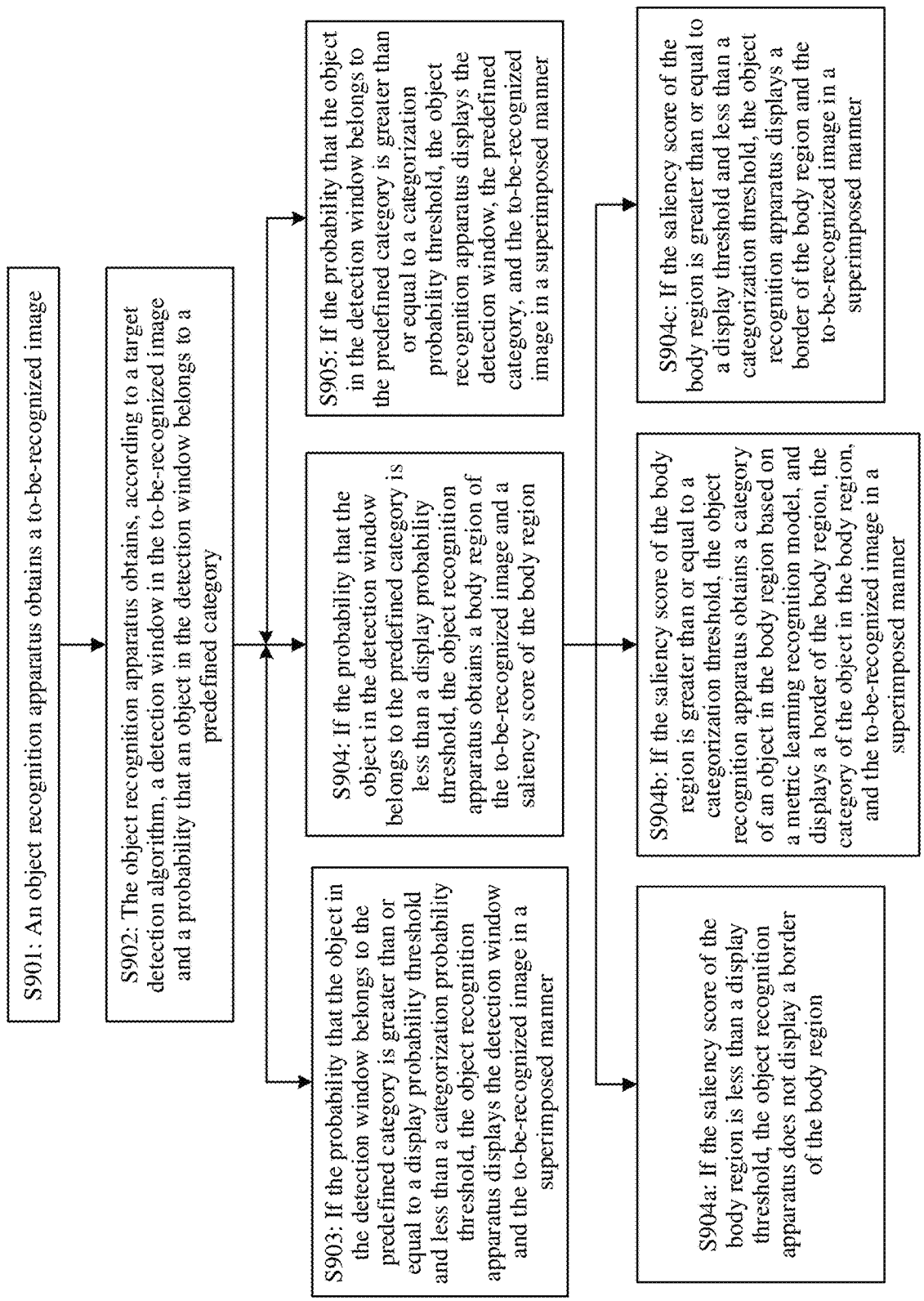
FIG. 9 is a schematic flowchart of another object recognition method according to an embodiment of this application.

FIG. 9 is a schematic flowchart of another object recognition method according to an embodiment of this application. As shown in FIG. 9, the method includes the following steps.

S901: An object recognition apparatus obtains a to-be-recognized image.

Specifically, the object recognition apparatus obtains the to-be-recognized image through a camera of the object recognition apparatus, or locally obtains the to-be-recognized image.

S902: The object recognition apparatus obtains, according to a target detection algorithm, a detection window in the to-be-recognized image and a probability that an object in the detection window belongs to a predefined category.

S903: If the probability that the object in the detection window belongs to the predefined category is greater than or equal to a display probability threshold and less than a categorization probability threshold, the object recognition apparatus displays the detection window and the to-be-recognized image in a superimposed manner.

S904: If the probability that the object in the detection window belongs to the predefined category is less than a display probability threshold, the object recognition apparatus obtains a body region of the to-be-recognized image and a saliency score of the body region.

The saliency score of the body region is used to represent a saliency degree of an object in the body region relative to a background in the to-be-recognized image.

It should be noted herein that, for a process in which the object recognition apparatus obtains the body region of the to-be-recognized image and the saliency score of the body region, refer to related content in step S401 and step S402. Details are not described herein again.

S904a: If the saliency score of the body region is less than a display threshold, the object recognition apparatus does not display a border of the body region.

S904b: If the saliency score of the body region is greater than or equal to a categorization threshold, the object recognition apparatus obtains a category of the object in the body region based on a metric learning recognition model, and displays a border of the body region, the category of the object in the body region, and the to-be-recognized image in a superimposed manner.

S904c: If the saliency score of the body region is greater than or equal to a display threshold and less than a categorization threshold, the object recognition apparatus displays a border of the body region and the to-be-recognized image in a superimposed manner.

S905: If the probability that the object in the detection window belongs to the predefined category is greater than or equal to a categorization probability threshold, the object recognition apparatus displays the detection window, the predefined category, and the to-be-recognized image in a superimposed manner.

It can be learned that a difference between the embodiments and the prior art is as follows: (1) An image body-based object detection capability is provided, to implement semantic-independent body detection. In the embodiments, after no target can be obtained through strong supervision-based target detection, a body detection module and an object recognition module may be invoked to perform secondary detection and recognition. During secondary detection, a main part of an image can be generated and a detection window of the part can be obtained without pre-obtaining a category-related training sample. In this way, a to-be-recognized category is decoupled from generation of the detection window, to provide support for subsequent category expansion. (2) An interactive object detection solution is provided. In a strong supervision-based detection phase, if a detection window can be obtained and a probability corresponding to the detection window is greater than a display probability threshold, the detection window is displayed, and a category of the detection window is finally determined only when the probability is greater than a categorization probability threshold. This solution can be used to guide a user to gradually target a to-be-recognized object, so that recognition accuracy and user experience are improved. In a phase of secondary detection and recognition, interactive object detection is implemented based on a saliency score, to guide the user to gradually target the to-be-recognized object.

Figure 10:
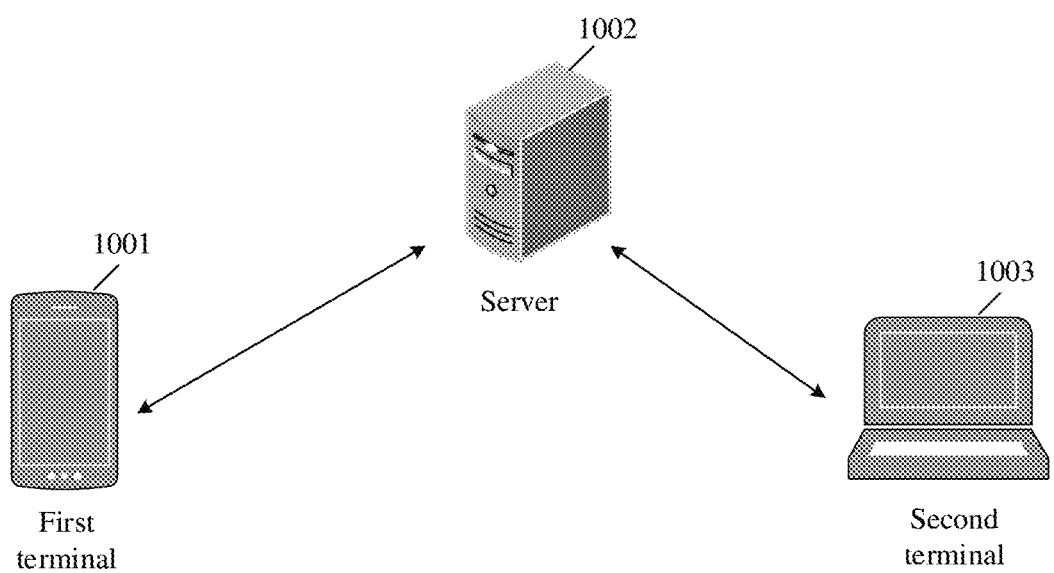
FIG. 10 is a schematic diagram of another object recognition system according to an embodiment of this application.

FIG. 10 is a schematic diagram of a scenario to which an object recognition method is applied according to an embodiment of this application. As shown in FIG. 10, the scenario includes a first terminal 1001, a server 1002, and a second terminal 1003.

After obtaining a to-be-recognized image through a camera of the first terminal 1001 or locally obtaining a to-be-recognized image, the first terminal 1001 performs body region recognition on the to-be-recognized image to obtain one or more body regions. The first terminal device 1001 sends the one or more body regions to the server 1002 for object recognition. For an object in any one of the one or more body regions, the server 1002 obtains a feature vector of the object, then calculates a distance between the feature vector of the object and each center feature vector in a feature library, and determines, as a category of the object, a category corresponding to a center feature vector closest to the feature vector of the object.

When, before, or after the first terminal 1001 performs object recognition, the second terminal 1003 sends, to the server 1002, a feature library update request that carries an image block of an object and a category of the object. The server 1002 updates a center feature vector in a feature based on the image block of the object and the category of the object that are in the feature library update request.

It should be noted that the first terminal 1001 and the second terminal 1003 may be a same terminal.

Figure 11:
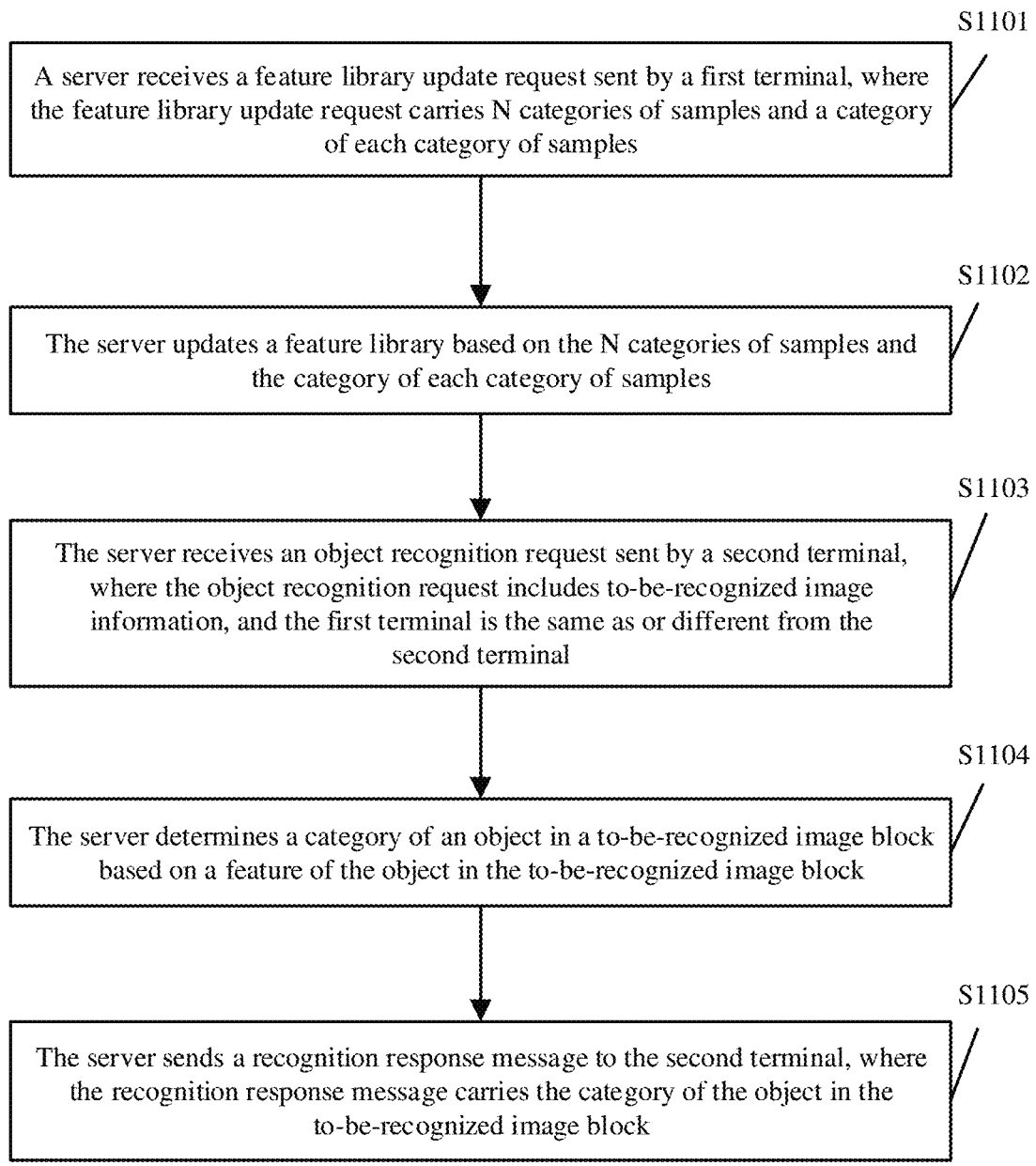
FIG. 11 is a schematic flowchart of another object recognition method according to an embodiment of this application.

FIG. 11 is a schematic flowchart of an object recognition method according to an embodiment of this application. As shown in FIG. 11, the method includes the following steps.

S1101: A server receives a feature library update request sent by a first terminal, where the feature library update request carries N categories of samples and a category of each category of samples.

Each category of samples in the N categories of samples includes one or more samples. For example, a sample whose category is "Husky" includes one or more Husky images. For another example, a sample whose category is "cat" includes one or more cat images.

S1102: The server updates a feature library based on the N categories of samples and the category of each category of samples.

Specifically, the server first determines whether the feature library includes the categories of the N categories of samples. If the server determines that the feature library includes a category of the $T^{th}$ category of samples in the N categories of samples, the server obtains T' feature vectors, or a sum of elements at same locations in the T' feature vectors and the quantity T'. The T' feature vectors are feature vectors of samples used for calculating a center feature vector corresponding to the category of the $T^{th}$ category of samples, and T is an integer greater than 0 and less than or equal to N. The server obtains a feature vector of each sample in the $T^{th}$ category of samples based on a CNN feature extraction model; determines a center feature vector of the $T^{th}$ category of samples based on the feature vector of each sample in the $T^{th}$ category of samples and the T' feature vectors, where the center feature vector of the $T^{th}$ category of samples is an average value of the $s^{th}$ elements in feature vectors of all of the $T^{th}$ category of samples and the $s^{'th}$ elements in the T' feature vectors; and updates, to the center feature vector of the $T^{th}$ category of samples, the center feature vector that is in the feature library and that corresponds to the category of the $T^{th}$ category of samples.

If the server determines that the feature library does not include a category of the $T^{th}$ category of samples in the $N^{th}$ category of samples, the server obtains a feature vector of each sample in the $T^{th}$ category of samples based on a CNN feature extraction model; then determines a center feature vector of the $T^{th}$ category of samples based on the feature vector of each sample in the $T^{th}$ category of samples, where the $s'^{th}$ element in the center feature vector of the $T^{th}$ category of samples is an average value of the $s'^{th}$ elements in feature vectors of all of the $T^{th}$ category of samples; and finally adds the center feature vector of the $T^{th}$ category of samples and the category of the $T^{th}$ category of samples to the feature library.

In a possible embodiment, before updating the feature library based on the N categories of samples and the category of each category of samples, the server further establishes the feature library.

Specifically, the server obtains M categories of samples and a category of each category of samples, where each category of samples in the M categories of samples includes a plurality of samples, and M is an integer greater than 0. The server obtains a feature vector of each sample in the $K^{th}$ category of samples in the M categories of samples based on the CNN feature extraction model, where K=1, 2, 3, . . . , or M. The server determines a center feature vector of the $K^{th}$ category of samples based on the feature vector of each sample in the $K^{th}$ category of samples, where the $s^{th}$ element in the center feature vector of the $K^{th}$ category of samples is an average value of the $s^{th}$ elements in feature vectors of all of the $K^{th}$ category of samples, and the feature library includes the center feature vector of the $K^{th}$ category of samples and the category of the $K^{th}$ category of samples.

For example, it is assumed that the $K^{th}$ category of samples are 110 cat images, and the category of the $K^{th}$ category of samples is "cat". The server obtains a feature vector of each of the 110 cat images based on the CNN feature extraction model, and then accumulates elements at same locations in feature vectors of all of the 110 cat images, to obtain a feature vector sum V of the 110 cat images. The center feature vector of the $K^{th}$ category of samples (that is, "cat") is V/110, indicating that each element in V is divided by 100.

S1103: The server receives an object recognition request sent by a second terminal, where the object recognition request includes to-be-recognized image information, and the first terminal is the same as or different from the second terminal.

In a possible embodiment, the to-be-recognized image information is a to-be-recognized image block, and there is a to-be-recognized object in the to-be-recognized image block.

In a possible embodiment, the to-be-recognized image information is a to-be-recognized image, and the to-be-recognized image includes a to-be-recognized image block. After obtaining the to-be-recognized image, the server obtains one or more body regions based on related content in step S401. The body regions include a to-be-recognized object.

S1104: The server determines a category of the object in the to-be-recognized image block based on a feature of the object in the to-be-recognized image block.

Specifically, the server extracts the feature of the object in the to-be-recognized image block based on the CNN feature extraction model to obtain a feature vector of the object in the to-be-recognized image block; then calculates a distance between the feature vector of the object in the to-be-recognized image block and a center feature vector corresponding to each category in the feature library; and determines, as the category of the object in the to-be-recognized image block, a category corresponding to a center feature vector closest to the feature of the object in the to-be-recognized image block.

In a possible embodiment, before determining the category of the object in the to-be-recognized image block based on the feature of the object in the to-be-recognized image block, the server further trains the CNN feature extraction model based on a plurality of samples.

Specifically, the server obtains, based on the CNN feature extraction model, a quadruple (a, $C_P$, $C_N$, n) corresponding to a sample s in the plurality of samples, where a is a feature vector of the sample s, $C_P$ is a center feature vector corresponding to a category of the sample s, $C_N$ is a center feature vector that is of a different category of samples and that is closest to a, and n is a feature vector that is of a sample of a different category and that is closest to $C_P$.

The server trains the CNN feature extraction model based on quadruples of the plurality of samples and a loss function, until a value of the loss function is less than a preset precision value, where the loss function is used to represent precision of the CNN feature extraction model, and the loss function is:

$$\max(D(a,C_P)-D(a,C_N)+\alpha,0)+\max(D(a,C_P)-D(n,C_P)+\beta,0).$$

Herein, $D(a, C_P)$ is a distance between a and $C_P$, $D(a, C_N)$ is a distance between a and $C_N$, $D(n, C_P)$ is a distance between n and $C_P$, and both $\alpha$ and $\beta$ are constants.

S1105: The server sends a recognition response message to the second terminal, where the recognition response message carries the category of the object in the to-be-recognized image block, and the category of the object in the to-be-recognized image block is one of the categories of the N categories of samples.

It can be learned that updating the feature library based on the samples and the categories in the feature library update request sent by the first terminal helps improve object recognition accuracy and expand an object recognition range. The manner of determining a category of an object by calculating a distance between a center feature vector in the feature library and a feature vector of an object in a body region helps improve object recognition efficiency. In addition, the feature library stores center feature vectors. This avoids storing feature vectors of a large quantity of objects, so that storage overheads are reduced.

Figure 12:
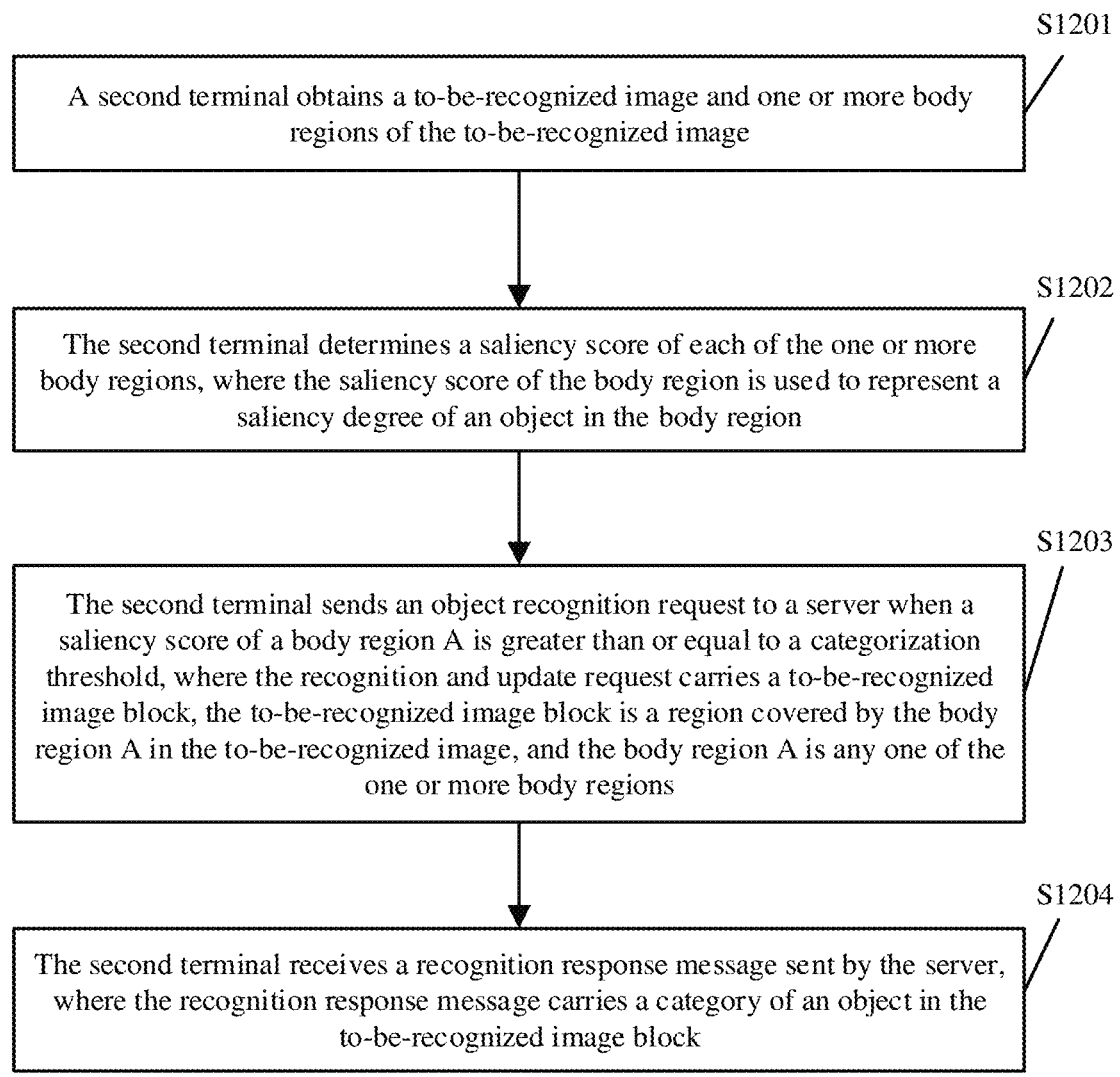
FIG. 12 is a schematic flowchart of another object recognition method according to an embodiment of this application.

FIG. 12 is a schematic flowchart of an object recognition method according to an embodiment of this application. As shown in FIG. 12, the method includes the following steps.

S1201: A second terminal obtains a to-be-recognized image and one or more body regions of the to-be-recognized image.

The body regions include a to-be-recognized object.

Optionally, the second terminal obtains the to-be-recognized image through a camera of the second terminal or the second terminal obtains the to-be-recognized image from a local storage device of the second terminal.

In a possible embodiment, that the second terminal obtains the one or more body regions of the to-be-recognized image includes: inputting the to-be-recognized image into a saliency probability map generation model, to obtain a saliency probability map of the to-be-recognized image, where a size of the saliency probability map is the same as that of the to-be-recognized image; performing binarization processing on the saliency probability map, to obtain a binary saliency probability map; and processing the binary saliency probability map according to a connected region recognition method, to obtain the one or more body regions.

The saliency probability map of the to-be-recognized image is a grayscale map. A pixel value of each pixel in the saliency probability map represents a saliency probability at a corresponding location (that is, a saliency probability of the pixel at the corresponding location) in the to-be-recognized image, and a larger pixel value of a pixel in the saliency probability map indicates a higher saliency probability at a corresponding location in the to-be-recognized image. A value range of the pixel value of the pixel in the saliency probability map is [0, 1]. The size of the to-be-recognized image is consistent with the size of the saliency probability map of the to-be-recognized image.

The saliency probability map generation model is a binary segmentation model, and there are two segmentation categories: a salient object and a background. A plurality of architectures, such as a feature pyramid network (FPN), a pyramid scene parsing network (PSP-Net), and a refinement network (RefineNet), may be used for the saliency probability map generation model.

The second terminal performs binarization processing on the saliency probability map of the to-be-recognized image, to obtain the binary saliency probability map. Specifically, the pixel value of each pixel in the saliency probability map of the to-be-recognized image is compared with a preset threshold. When a pixel value of a pixel P is less than the preset threshold, the pixel value of the pixel P is set to 0. When a pixel value of a pixel P is greater than or equal to the preset threshold, the pixel value of the pixel P is set to 1. The pixel P is any pixel in the saliency probability map of the to-be-recognized image. According to this method, the binary saliency probability map is obtained.

The second terminal processes the binary saliency probability map according to the connected region recognition method, to obtain the one or more body regions. Specifically, considering miss detection and discontinuity of the saliency probability map in terms of an object, the second terminal uses a closed operation algorithm to patch a discontinuous region in the binary saliency probability map, then uses a two-pass algorithm to recognize connected regions in the binary saliency probability map, and marks different connected regions in the binary saliency probability map; screens the connected regions and designs a connected region evaluation rule to select a body connected region; and generates a minimum rectangular frame for the selected connected region, where a region covered by the minimum rectangular frame is a body region. For the to-be-recognized image, the one or more body regions may be obtained in this manner.

S1202: The second terminal determines a saliency score of each of the one or more body regions, where the saliency score of the body region is used to represent a saliency degree of an object in the body region.

In a possible embodiment, that the second terminal determines the saliency score of each of the one or more body regions includes: The second terminal obtains a set $N_A$ of saliency probability values in a body region A and a set $N_{A'}$ of saliency probability values in a non-body region A', where the non-body region A' is a region other than the body region A in the saliency probability map; obtains an average saliency probability value of the body region A and an average saliency probability value of the non-body region A' based on the set $N_A$ of the saliency probability values in the body region A and the set $N_{A'}$ of the saliency probability values in the non-body region A'; and obtains a saliency score of the body region A through calculation based on the average saliency probability value of the body region A and the average saliency probability value of the non-body region A', where the saliency score of the body region A is a ratio of the average saliency probability value of the body region A to the average saliency probability value of the non-body region A', and a saliency score of the one or more body regions includes the saliency score of the body region A.

Specifically, based on the body region A, the second terminal divides the saliency probability map of the to-be-recognized image into the body region A and the non-body region A'. The non-body region A' is the region other than the body region A in the saliency probability map of the to-be-recognized image. The second terminal obtains the set $N_A$ of the saliency probability values in the body region A and the set $N_{A'}$ of the saliency probability values in the non-body region A'. The set $N_A$ of the saliency probability values in the body region A is a set of pixel values of all pixels in the body region A in the saliency probability map of the to-be-recognized image. Likewise, the set $N_{A'}$ of the saliency probability values in the non-body region A' is a set of pixel values of all pixels in the non-body region A' in the saliency probability map of the to-be-recognized image.

The second terminal obtains the average saliency probability value of the body region A' and the average saliency probability value of the non-body region A based on the set $N_A$ of the saliency probability values in the body region A and the set $N_{A'}$ of the saliency probability values in the non-body region A', and then obtains the saliency score of the body region A through calculation based on the average saliency probability value of the body region A and the average saliency probability value of the non-body region A. The saliency score of the one or more body regions includes the saliency score of the body region A. As shown in FIG. 5, a gray part is the body region A, and a white part is the body region A'.

The average saliency probability value of the body region A' is a ratio of a sum of the pixel values of all the pixels in the body region A' to a quantity of all pixels in the body region A'. Likewise, the average saliency probability value of the body region A is a ratio of a sum of the pixel values of all the pixels in the body region A to a quantity of all pixels in the body region A. The saliency score of the body region A is the ratio of the average saliency probability value of the body region A to the average saliency probability value of the non-body region A:

$$S = \frac{\rho_1}{\rho_2} = \frac{\Sigma_{i \in N_A} P_i/|N_A|}{\Sigma_{j \in N_{A'}} P_j/|N_{A'}|}.$$

Herein, S is the saliency score of the body region A. $\rho_1$ is the average saliency probability value of the body region A, namely, $\Sigma_{i \in N_A} P_i/|N_A|$. $\rho_2$ is the average saliency probability value of the body region A', namely, $\Sigma_{j \in N_{A'}} P_j/|N_{A'}|$. $N_A$ is the quantity of pixels in the body region A. $N_{A'}$ is the quantity of pixels in the body region A'. $\Sigma_{i \in N_A} P_i$ is the sum of the pixel values of all the pixels in the body region A. $P_i$ is a pixel value of the $i^{th}$ pixel in the body region A. $\Sigma_{j \in N_{A'}} P_j$ is the sum of the pixel values of all the pixels in the body region A'. $P_j$ is a pixel value of the $j^{th}$ pixel in the body region A'.

S1203: The second terminal sends an object recognition request to a server when the saliency score of the body region A is greater than or equal to a categorization threshold, where the recognition and update request carries a to-be-recognized image block, the to-be-recognized image block is a region covered by the body region A in the to-be-recognized image, and the body region A is any one of the one or more body regions.

S1204: The second terminal receives a recognition response message sent by the server, where the recognition response message carries a category of an object in the to-be-recognized image block.

In a possible embodiment, when there are a plurality of body regions whose saliency scores are greater than the categorization threshold, the object recognition request sent by the second terminal to the server includes a plurality of to-be-recognized image blocks. The plurality of to-be-recognized image blocks are regions respectively covered by the plurality of body regions whose saliency scores are greater than the categorization threshold. In an example, the second terminal receives one recognition response message sent by the server, and the recognition response message carries categories of objects in the plurality of to-be-recognized images.

In a possible embodiment, when there are a plurality of body regions whose saliency scores are greater than the categorization threshold, the second terminal sends a plurality of object recognition requests to the server. Each object recognition request carries a to-be-recognized image block. To-be-recognized image blocks carried in the plurality of object recognition requests are regions respectively covered by the plurality of body regions whose saliency scores are greater than the categorization threshold. In another example, the second terminal receives a plurality of recognition response messages sent by the server, and each recognition response message carries a category of an object in a to-be-recognized image. In other words, one recognition response message corresponds to one object recognition request.

In a possible embodiment, the second terminal further displays a frame of the body region A, the object in the to-be-recognized image block, and the category of the object in a superimposed manner after receiving the recognition response message sent by the server. As shown in FIG. 7b, there is a body region 3 and a body region 4 in the to-be-recognized image. The second terminal displays a frame of the body region 3 and a category (that is, "book") of an object in the body region 3, and displays a frame of the body region 4 and a category (that is, "calculator") of an object in the body region 4.

In a possible embodiment, the second terminal further sends a first feature library update message to the server after displaying the frame of the body region A, the object in the to-be-recognized image block, and the category of the object in the superimposed manner, where the first feature library update message carries the to-be-recognized image block and a target category, the target category is a category determined by a user for the object in the to-be-recognized image block, and the target category is different from the category of the object in the to-be-recognized image block. The to-be-recognized image block is a region covered by the body region A.

Specifically, after the second terminal displays the category that is of the object in the body region A and that is recognized by the server, the user is not satisfied with the result recognized by the server, or the user determines that the result recognized by the server is incorrect. For example, the object in the body region A is actually "Husky", but the result recognized by the server is "wolf"; or the object in the body region A is actually "dog", but the result recognized by the server is "cat". The user sends the first feature library update message to the server through the second terminal. The first feature library update message carries the to-be-recognized image block and the target category, the target category is a category determined by the user for the object in the to-be-recognized image block, and the target category is different from the result recognized by the server. The first feature library update message is used to indicate the server to update a feature library based on the object in the to-be-recognized image block and the target category that are carried in the first feature library update message.

In a possible embodiment, the second terminal does not display a frame of the body region A if the saliency score of the body region A is less than a display threshold; or the second terminal displays the object in the body region A and a frame of the body region A in a superimposed manner if the saliency score of the body region A is greater than or equal to the display threshold and less than the categorization threshold. As shown in FIG. 7a, there is a body region 1 and a body region 2. Only a frame of the body region 1 and a frame of the body region 2 are displayed, but a category of an object in the body region 1 and a category of an object in the body region 2 are not displayed.

In a possible embodiment, the second terminal sends a second feature library update message to the server, where the second feature library update message includes N categories of samples and the categories of the N categories of samples, and the second feature library update message is used to indicate the server to update the feature library based on the N categories of samples and the categories of the N categories of samples.

Each category of samples in a plurality of categories of samples includes one or more samples.

It can be learned that, according to the solutions in this application, body region detection is decoupled from object recognition. This provides a possibility of subsequently adding a category and a center feature vector to the feature library, and scalability is high. In addition, after the object is recognized, recognizable categories are redefined and specifically categorized, so that a subsequent object recognition result is more accurate.

Figure 13:
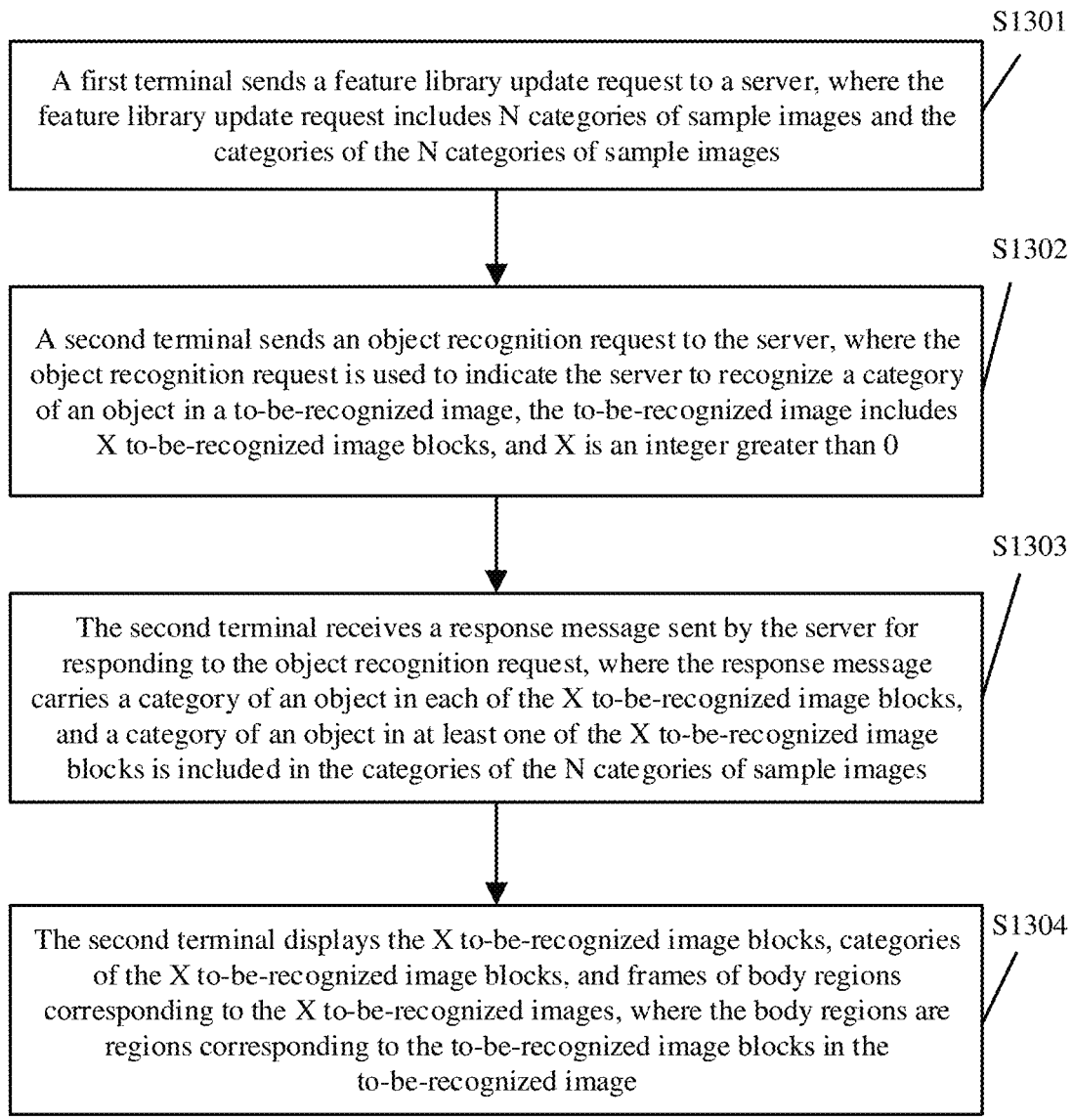
FIG. 13 is a schematic flowchart of another object recognition method according to an embodiment of this application.

FIG. 13 is a schematic flowchart of another object recognition method according to an embodiment of this application. As shown in FIG. 13, the method includes the following steps.

S1301: A first terminal sends a feature library update request to a server, where the feature library update request includes N categories of sample images and the categories of the N categories of sample images.

Each category of sample images in the N categories of sample images include one or more sample images, and N is an integer greater than or equal to 1.

In a possible embodiment, after receiving a category addition command of a user, the first terminal sends the feature library update request to the server.

Optionally, the category addition command may be a touch command, a voice command, a gesture command, or another command.

In a possible embodiment, the user may update a feature library based on a requirement of the user. For example, if the user needs to recognize "Shenzhou spaceship" from a plurality of images, before image recognition is performed, after receiving the category addition command of the user, the first terminal obtains a plurality of images including "Shenzhou spaceship", and then sends, to the server, a feature library update request that carries the plurality of images including "Shenzhou spaceship" and the category "Shenzhou spaceship" of the plurality of images, so that the server updates the feature library based on the plurality of images including "Shenzhou spaceship" and the category "Shenzhou spaceship" of the plurality of images.

In another possible embodiment, the user does not perform object recognition, but only wants to update the feature library. After receiving the category addition command of the user, the first terminal obtains a plurality of images including "object A", and then sends, to the server, a feature library update request that carries the plurality of images including "object A" and the category "object A" of the plurality of images, so that the server updates the feature library based on the plurality of images including "object A" and the category "object A" of the plurality of images.

S1302: A second terminal sends an object recognition request to the server, where the object recognition request is used to indicate the server to recognize a category of an object in a to-be-recognized image, the to-be-recognized image includes X to-be-recognized image blocks, and X is an integer greater than 0.

In a possible embodiment, the second terminal sends the object recognition request to the server after receiving a command of the user for recognizing the category of the object in the to-be-recognized image.

Optionally, the command for recognizing the category of the object in the to-be-recognized image block may be a touch command, a voice command, a gesture command, or another command.

In a possible embodiment, before sending the object recognition request to the server, the second terminal further obtains the to-be-recognized image; inputs the to-be-recognized image into a saliency probability map generation model, to obtain a saliency probability map of the to-be-recognized image, where a size of the saliency probability map of the to-be-recognized image is the same as that of the to-be-recognized image; then inputs the saliency probability map of the to-be-recognized image into a body region generation model, to obtain Y body regions, where Y is an integer greater than or equal to X; and performs calculation for each of the Y body regions based on a saliency scoring model, to obtain a saliency score of each body region, where the saliency score of the body region is used to represent a saliency degree of an object in the body region, the Y to-be-recognized image blocks are regions covered by Y body regions in the to-be-recognized image, and the X body regions are body regions whose saliency scores are greater than or equal to a display threshold in the Y body regions.

In a possible embodiment, that the second terminal inputs the saliency probability map of the to-be-recognized image into the body region generation model for calculation, to obtain the Y body regions includes: performing binarization processing on the saliency probability map of the to-be-recognized image, to obtain a binary saliency probability map; and then processing the binary saliency probability map according to a connected region recognition method, to obtain the Y body regions.

Specifically, after obtaining the to-be-recognized image, the second terminal inputs the to-be-recognized image into the saliency probability map generation model for processing, to obtain the saliency probability map of the to-be-recognized image. The saliency probability map of the to-be-recognized image is a grayscale map. A pixel value of each pixel in the saliency probability map represents a saliency probability at a corresponding location (that is, a saliency probability of the pixel at the corresponding location) in the to-be-recognized image, and a larger pixel value of a pixel in the saliency probability map indicates a higher saliency probability at a corresponding location in the to-be-recognized image. A value range of the pixel value of the pixel in the saliency probability map of the to-be-recognized image is [0, 1], and the size of the saliency probability map of the to-be-recognized image is the same as that of the to-be-recognized image. The saliency probability map generation model is a binary segmentation model, and there are two segmentation categories: a salient object and a background. A plurality of architectures, such as an FPN, a PSP-Net, and a RefineNet, may be used for the saliency probability map generation model.

That the second terminal then inputs the saliency probability map of the to-be-recognized image into the body region generation model for processing, to obtain the Y body regions specifically includes: The second terminal performs binarization processing on the saliency probability map of the to-be-recognized image based on the body region generation model, to obtain the binary saliency probability map of the to-be-recognized image, and then processes the binary saliency probability map according to the connected region recognition method, to obtain the Y body regions. That the second terminal performs binarization processing on the saliency probability map of the to-be-recognized image based on the body region generation model, to obtain the binary saliency probability map includes: The second terminal compares the pixel value of each pixel in the saliency probability map of the to-be-recognized image with a preset threshold; and when a pixel value of a pixel P is less than the preset threshold, sets the pixel value of the pixel P to 0; or when a pixel value of a pixel P is greater than or equal to the preset threshold, sets the pixel value of the pixel P to 1. The pixel P is any pixel in the saliency probability map of the to-be-recognized image. According to this method, the binary saliency probability map is obtained. That the second terminal processes the binary saliency probability map according to the connected region recognition method, to obtain the Y body regions includes: Considering miss detection and discontinuity of the saliency probability map in terms of an object, the second terminal uses a closed operation algorithm to patch a discontinuous region in the binary saliency probability map, then uses a two-pass algorithm to recognize connected regions in the binary saliency probability map, and marks different connected regions in the binary saliency probability map; screens the connected regions and designs a connected region evaluation rule to select a body connected region; and generates a minimum rectangular frame for the selected connected region, where a region covered by the minimum rectangular frame is a body region. For the to-be-recognized image, the Y body regions may be obtained in this manner.

In a possible embodiment, that the second terminal performs calculation for the Y body regions based on the saliency scoring model, to obtain saliency scores of the Y body regions includes: The second terminal obtains a set $N_B$ of saliency probability values in a body region B and a set $N_{B'}$ of saliency probability values in a non-body region B', where the non-body region B' is a region other than the body region B in the saliency probability map of the to-be-recognized image; obtains an average saliency probability value of the body region B and an average saliency probability value of the non-body region B' based on the set $N_B$ of the saliency probability values in the body region B and the set $N_{B'}$ of the saliency probability values in the non-body region B'; and obtains a saliency score of the body region B through calculation based on the average saliency probability value of the body region B and the average saliency probability value of the non-body region B', where the saliency score of the body region B is a ratio of the average saliency probability value of the body region A to the average saliency probability value of the non-body region B', and the saliency scores of the Y body regions include the saliency score of the body region B. The second terminal selects the X body regions from the Y body regions, where a saliency score of each of the X body regions is greater than or equal to the display threshold.

S1303: The second terminal receives a response message sent by the server for responding to the object recognition request, where the response message carries a category of an object in each of the X to-be-recognized image blocks, and a category of an object in at least one of the X to-be-recognized image blocks is included in the categories of the N categories of sample images.

S1304: The second terminal displays the X to-be-recognized image blocks, categories of the X to-be-recognized image blocks, and frames of body regions corresponding to the X to-be-recognized images, where the body regions are regions corresponding to the to-be-recognized image blocks in the to-be-recognized image.

Figure 14:
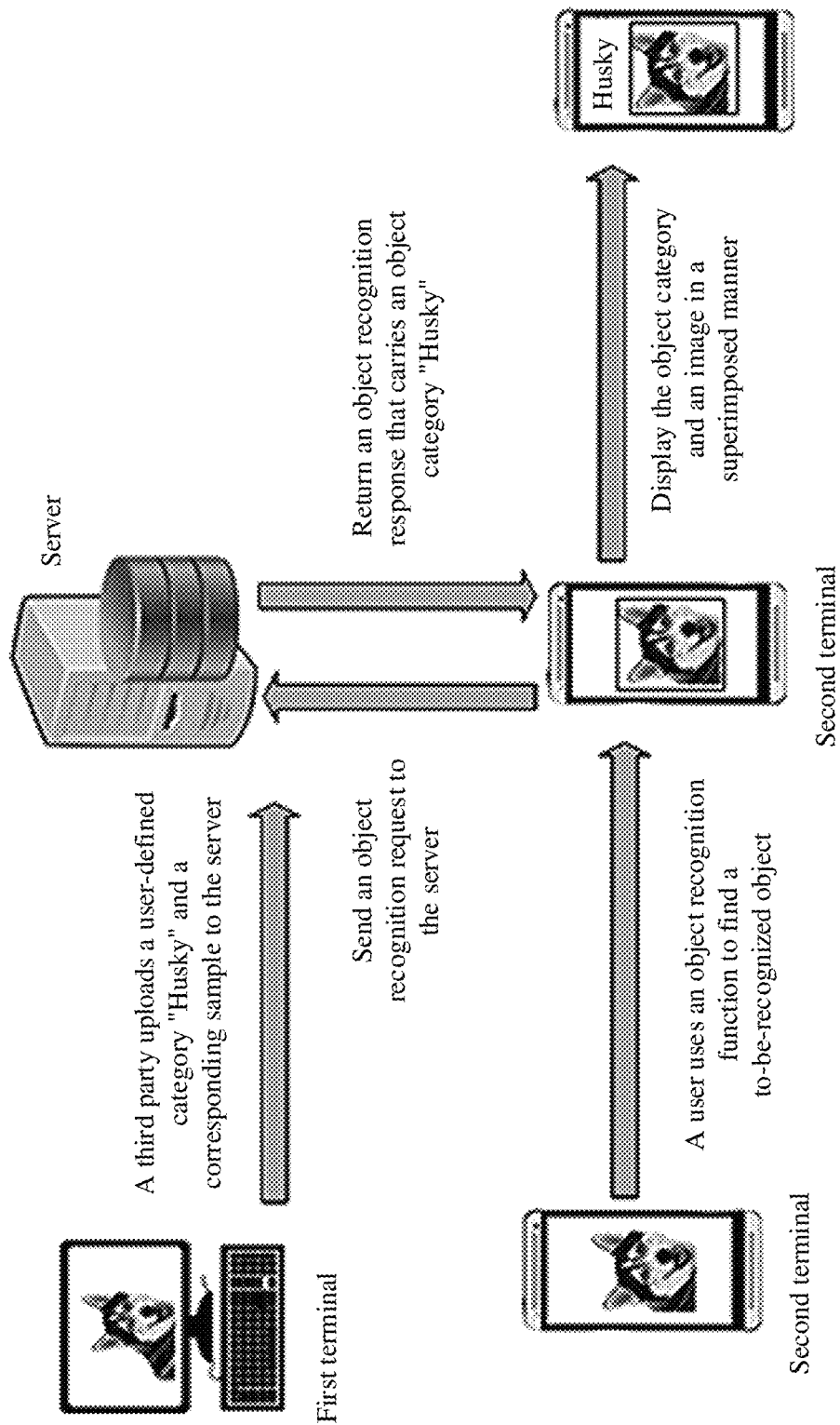
FIG. 14 is a schematic diagram of an object recognition process according to an embodiment of this application.

For example, as shown in FIG. 14, the first terminal sends a user-defined category "Husky" of a third party and a corresponding sample (that is, an image of Husky) to the server. The server updates the feature library based on the user-defined category "Husky" and the corresponding sample (that is, newly adds the category "Husky" and a corresponding center feature vector to the feature library, or updates a center feature vector corresponding to an existing category "Husky" in the feature library). When the user uses an object recognition function of the second terminal, the second terminal obtains a to-be-recognized image, and obtains a body region, where an object in the body region is a to-be-recognized object. Then, the second terminal sends an object recognition request to the server, where the object recognition request carries a to-be-recognized image block, and the to-be-recognized image block is a region covered by the body region in the to-be-recognized image. After receiving the object recognition request, the server obtains a feature vector of an object in the to-be-recognized image block, and compares the feature vector with each center feature vector in the feature library. If the server determines that the center feature vector corresponding to the category "Husky" is closest to the feature vector of the object in the to-be-recognized image block, the server determines that a category of the object in the to-be-recognized image block is "Husky". The server sends, to the second terminal, an object recognition response that carries the object category "Husky". After receiving the object recognition response, the second terminal displays the to-be-recognized image block, a frame of the body region, and the object category "Husky" in a superimposed manner. The frame of the body region is a black rectangular frame in FIG. 14.

Figure 15:
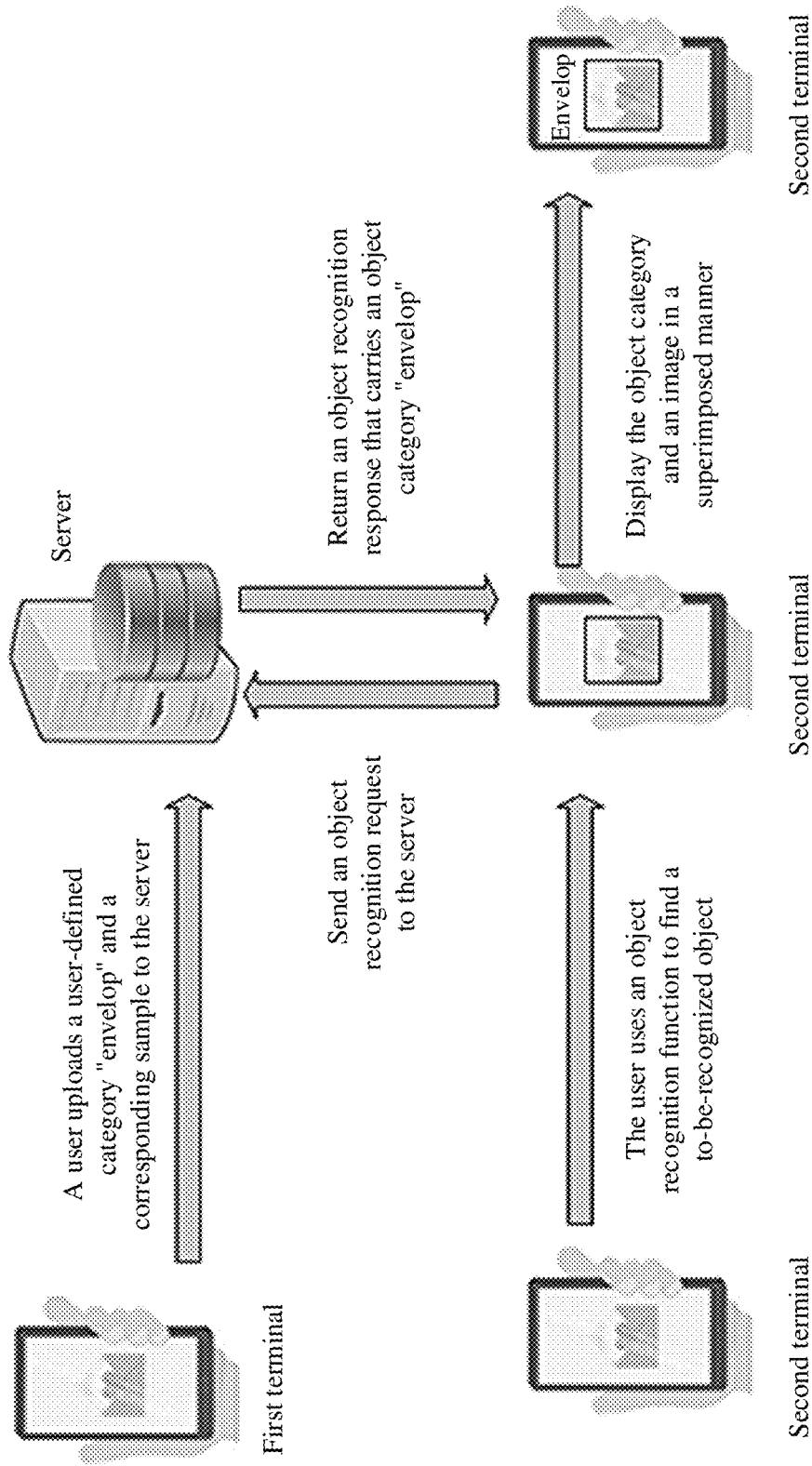
FIG. 15 is a schematic diagram of another object recognition process according to an embodiment of this application.

For another example, as shown in FIG. 15, the user sends a user-defined category "envelope" and a corresponding sample to the server through the second terminal. After receiving the user-defined category "envelope" and the corresponding sample, the server updates the feature library based on the user-defined category "envelope" and the corresponding sample (that is, newly adds the category "envelope" and a corresponding center feature vector to the feature library, or updates a center feature vector corresponding to an existing category "envelope" in the feature library). When the user uses an object recognition function of the second terminal, the second terminal obtains a to-be-recognized image, and obtains a body region, where an object in the body region is a to-be-recognized object. Then, the second terminal sends an object recognition request to the server, where the object recognition request carries a to-be-recognized image block, and the to-be-recognized image block is a region covered by the body region in the to-be-recognized image. After receiving the object recognition request, the server obtains a feature vector of an object in the to-be-recognized image block, and compares the feature vector with each center feature vector in the feature library. If the server determines that the center feature vector corresponding to the category "envelope" is closest to the feature vector of the object in the to-be-recognized image block, the server determines that a category of the object in the to-be-recognized image block is "envelope". The server sends, to the second terminal, an object recognition response that carries the object category "envelope". After receiving the object recognition response, the second terminal displays the to-be-recognized image block, a frame of the body region, and the object category "envelope" in a superimposed manner. The frame of the body region is a black rectangular frame in FIG. 15.

In a possible embodiment, the second terminal sends an object recognition request to the server, and the object recognition request carries a to-be-recognized image or one or more to-be-recognized image blocks in the to-be-recognized image block. After the server receives the object recognition request, if the object recognition request carries the to-be-recognized image, the server obtains one or more to-be-recognized image blocks from the to-be-recognized image, and then recognizes categories of objects in the one or more to-be-recognized image blocks in the to-be-recognized image block, to obtain a category of an object in each to-be-recognized image block; or if the object recognition request carries the one or more to-be-recognized image blocks, the server directly recognizes categories in the one or more to-be-recognized image blocks, to obtain a category of an object in each of the one or more to-be-recognized image blocks. The server sends, to the second terminal, a response message carrying the category of the object in each to-be-recognized image block.

The to-be-recognized image block is a part of the to-be-recognized image.

In another possible embodiment, the second terminal sends, to the server, an object recognition request carrying a to-be-recognized image block, and receives a response message that is sent by the server and that carries a first category. The first category is a result obtained by the server by recognizing a category of an object in the to-be-recognized image block. After receiving the response message, the second terminal displays the first category of the object in the to-be-recognized image block for the user to view. If the user determines that the displayed first category of the object in the to-be-recognized image block is incorrect (for example, the object in the to-be-recognized image block is "Husky", but the recognition result of the server is "wolf"), the second terminal sends, to the server according to a command of the user, a feature library update request that carries the to-be-recognized image block and a second category, so that the server updates the feature library based on the to-be-recognized image block and the second category. The second category is a category that is of the object in the to-be-recognized image block and that is determined by the user.

It can be learned that, according to the solutions in this application, body region detection is decoupled from object recognition. This provides a possibility of subsequently adding a category and a center feature vector to the feature library, and scalability is high. In addition, after the object is recognized, recognizable categories are redefined and specifically categorized, so that a subsequent object recognition result is more accurate.

Figure 16:
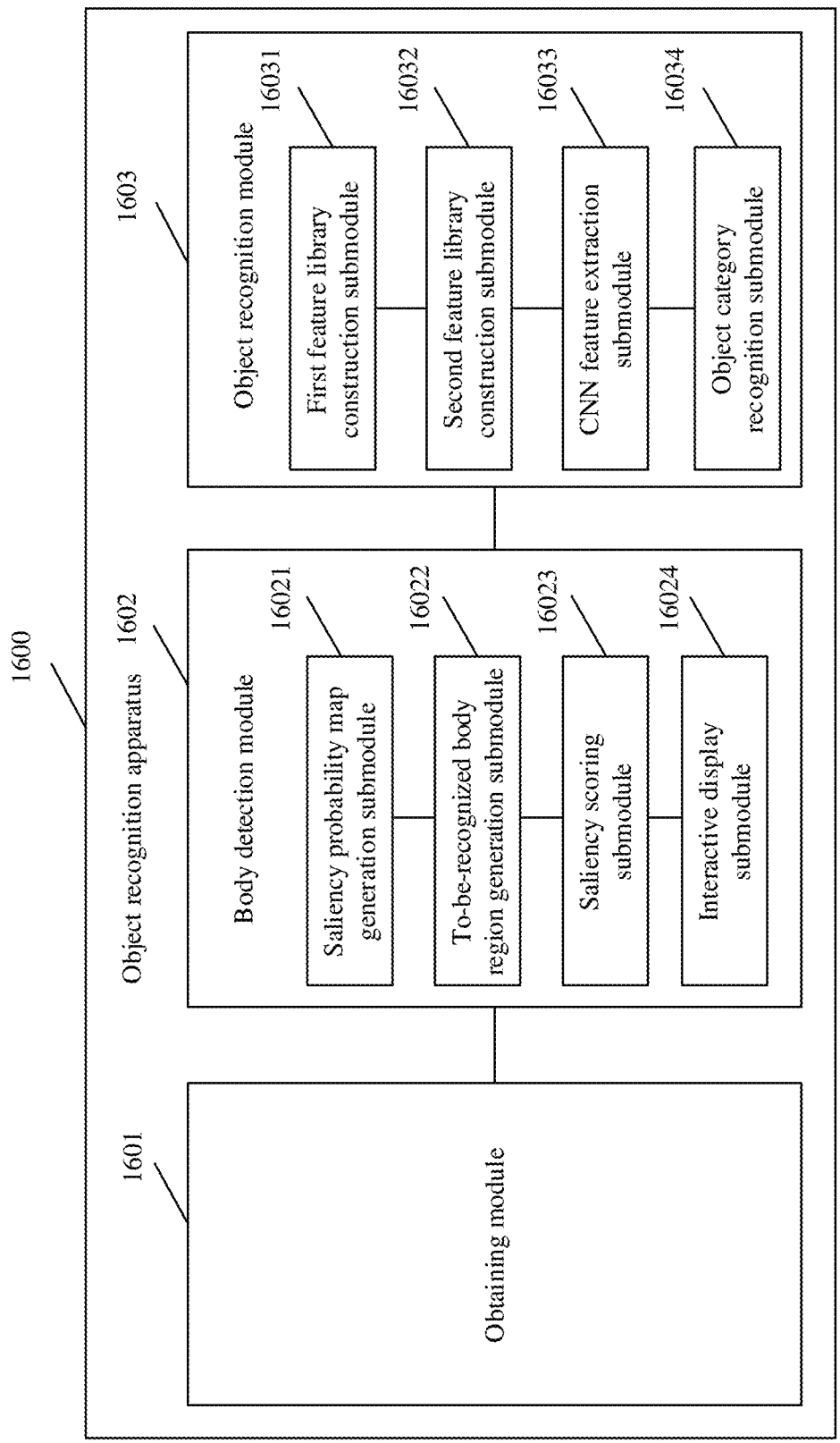
FIG. 16 is a schematic structural diagram of an object recognition apparatus according to an embodiment of this application.

FIG. 16 is a schematic structural diagram of an object recognition apparatus according to an embodiment of this application. As shown in FIG. 16, the object recognition apparatus 1600 includes: an obtaining module 1601, configured to obtain a to-be-recognized image; a body detection module 1602, configured to obtain one or more body regions of the to-be-recognized image, where the body regions include a to-be-recognized object, where the body detection module 1602 is further configured to determine a saliency score of each of the one or more body regions, where the saliency score of the body region is used to represent a saliency degree of an object in the body region; and an object recognition module 1603, configured to: when a saliency score of a body region A is greater than or equal to a categorization threshold, determine a feature vector of an object in the body region A based on a feature of the object in the body region A, and determine a category of the object in the body region A based on the feature vector of the object in the body region A and a category feature vector in a feature library, where the body region A is any one of the one or more body regions, and the category feature vector is used to represent a common feature of objects of a same category or a feature of one category of objects.

In a feasible embodiment, the body detection module 1602 includes: a saliency probability map generation submodule 16021, configured to input the to-be-recognized image into a saliency probability map generation model, to obtain a saliency probability map of the to-be-recognized image, where a size of the saliency probability map is the same as that of the to-be-recognized image; and a to-be-recognized body region generation submodule 16022, configured to: perform binarization processing on the saliency probability map to obtain a binary saliency probability map, and process the binary saliency probability map according to a connected region recognition method to obtain the one or more body regions.

In a feasible embodiment, the body detection module 1602 further includes a saliency scoring submodule 16023, and the saliency scoring submodule 16023 is specifically configured to: obtain a set $N_A$ of saliency probability values in the body region A and a set $N_{A'}$ of saliency probability values in a non-body region A', where the non-body region A' is a region other than the body region A in the saliency probability map; obtain an average saliency probability value of the body region A' and an average saliency probability value of the non-body region A' based on the set $N_A$ of the saliency probability values in the body region A and the set $N_{A'}$ of the saliency probability values in the non-body region A'; and obtain the saliency score of the body region A through calculation based on the average saliency probability value of the body region A and the average saliency probability value of the non-body region A'.

The saliency score of the body region A is a ratio of the average saliency probability value of the body region A to the average saliency probability value of the non-body region A', and saliency scores of the one or more body regions include the saliency score of the body region A.

In a feasible embodiment, the category feature vector in the feature library is a center feature vector, the center feature vector is used to represent a common feature of objects of a same category, and the object recognition module 1603 includes: a convolutional neural network CNN feature extraction submodule 16031, configured to extract the feature of the object in the body region A based on a CNN feature extraction model, to obtain the feature vector of the object in the body region A; and an object category generation submodule 16032, specifically configured to: calculate a distance between the feature vector of the object in the body region A and a center feature vector corresponding to each category in the feature library; and determine a category corresponding to a target center feature vector as the category of the object in the body region A, where the target center feature vector is a center feature vector that is in the feature library and that is closest to the feature vector of the object in the body region A.

In a feasible embodiment, the CNN feature extraction submodule 16031 is further configured to: train the CNN feature extraction model based on a plurality of samples before obtaining the feature vector of the object in the body region A based on the convolutional neural network CNN feature extraction model, where the training the CNN feature extraction model based on a plurality of samples includes: obtaining, based on the CNN feature extraction model, a quadruple (a, $C_P$, $C_N$, n) corresponding to a sample s in the plurality of samples, where a is a feature vector of the sample s, $C_P$ is a center feature vector corresponding to a category of the sample s, $C_N$ is a center feature vector that is of a different category of samples and that is closest to a, and n is a feature vector that is of a sample of a different category and that is closest to $C_P$; and training the CNN feature extraction model based on quadruples of the plurality of samples and a loss function, until a value of the loss function is less than preset precision, where the loss function is used to represent precision of the CNN feature extraction model, and the loss function is:

$\max(D(a, C_P)-D(a, C_N)+\alpha, 0)+\max(D(a, C_P)-D(n, C_P)+\beta, 0)$, where $D(a, C_P)$ is a distance between a and $C_P$, $D(a, C_N)$ is a distance between a and $C_N$, $D(n, C_P)$ is a distance between n and $C_P$, and both $\alpha$ and $\beta$ are constants.

In a feasible embodiment, the object recognition module 1603 further includes: a first feature library construction submodule 16033, configured to establish the feature library, where the establishing the feature library specifically includes: obtaining M categories of samples and a category of each category of samples, where each category of samples in the M categories of samples includes a plurality of samples, and M is an integer greater than 0; obtaining a feature vector of each sample in the $K^{th}$ category of samples in the M categories of samples based on the CNN feature extraction model, where K=1, 2, 3, . . . , or M; and determining a center feature vector of the $K^{th}$ category of samples based on the feature vector of each sample in the $K^{th}$ category of samples, where the $s^{th}$ element in the center feature vector of the $K^{th}$ category of samples is an average value of the $s^{th}$ elements in feature vectors of all of the $K^{th}$ category of samples, and the feature library includes the center feature vector of the $K^{th}$ category of samples and the category of the $K^{th}$ category of samples.

In a feasible embodiment, the object recognition module 1603 further includes a second feature library construction submodule 16034, and the second feature library construction submodule 16034 is specifically configured to: receive N categories of samples and a category of each category of samples from a third party, where each category of samples in the N categories of samples includes a plurality of samples, and N is an integer greater than 0; obtain T' feature vectors if the feature library includes a category of the $T^{th}$ category of samples in the N categories of samples, where the T' feature vectors are feature vectors of samples used for calculating a center feature vector corresponding to the category of the $T^{th}$ category of samples; obtain a feature vector of each sample in the $T^{th}$ category of samples based on the CNN feature extraction model, where T is greater than 0 and less than or equal to N; determine a center feature vector of the $T^{th}$ category of samples based on the feature vector of each sample in the $T^{th}$ category of samples and the T' feature vectors, where the $s'^{th}$ element in the center feature vector of the $T^{th}$ category of samples is an average value of the $s^{ith}$ elements in feature vectors of all of the $T^{th}$ category of samples and the $s^{ith}$ elements in the T' feature vectors; and update, to the center feature vector of the $T^{th}$ category of samples, the center feature vector that is in the feature library and that corresponds to the category of the $T^{th}$ category of samples.

In a feasible embodiment, the second feature library construction submodule 16034 is further configured to: obtain the feature vector of each sample in the $T^{th}$ category of samples based on the CNN feature extraction model if the feature library does not include the category of each category of samples in the $T^{th}$ category of samples; determine a center feature vector of the $T^{th}$ category of samples based on the feature vector of each sample in the $T^{th}$ category of samples, where the $s^{ith}$ element in the center feature vector of the T, category of samples is an average value of the $s^{ith}$ elements in feature vectors of all of the $T^{th}$ category of samples; and add the center feature vector of the $T^{th}$ category of samples and the category of the $T^{th}$ category of samples to the feature library.

In a feasible embodiment, the body detection module 1602 further includes: an interactive display submodule 16024, configured to display a frame of the body region A, the object in the body region A, and the category of the object in a superimposed manner after the category of the object in the body region A is determined based on the feature vector of the object in the body region A and the category feature vector in the feature library.

In a feasible embodiment, the interactive display submodule 16024 is further configured to: skip displaying the frame of the body region A if the saliency score of the body region A is less than a display threshold; or display an object in the body region A and the frame of the body region A in a superimposed manner if the saliency score of the body region A is greater than or equal to the display threshold and less than the categorization threshold.

It should be noted that the foregoing modules (the obtaining module 1601, the body detection module 1602, and the object recognition module 1603) are configured to perform related content of the method shown in the foregoing steps S301 to S303. Specifically, the obtaining module 1601 is configured to perform related content in steps S301, S701, and S801, the body detection module 1602 is configured to perform related content in steps S302, S702, S703, S705, S704a, S704c, S802, S803, S805, S804a, and S804c, and the object recognition module 1603 is configured to perform related content in steps S303, S704, S704b, S804, and S804b.

In this embodiment, the object recognition apparatus 1600 is presented in a form of modules. The "module" herein may refer to an application-specific integrated circuit (ASIC), a processor and a memory for executing one or more software or firmware programs, an integrated logic circuit, and/or another component that can provide the foregoing functions. In addition, the obtaining module 1601, the body detection module 1602, and the object recognition module 1603 may be implemented by using a processor 2001 of an object recognition apparatus shown in FIG. 20.

Figure 17:
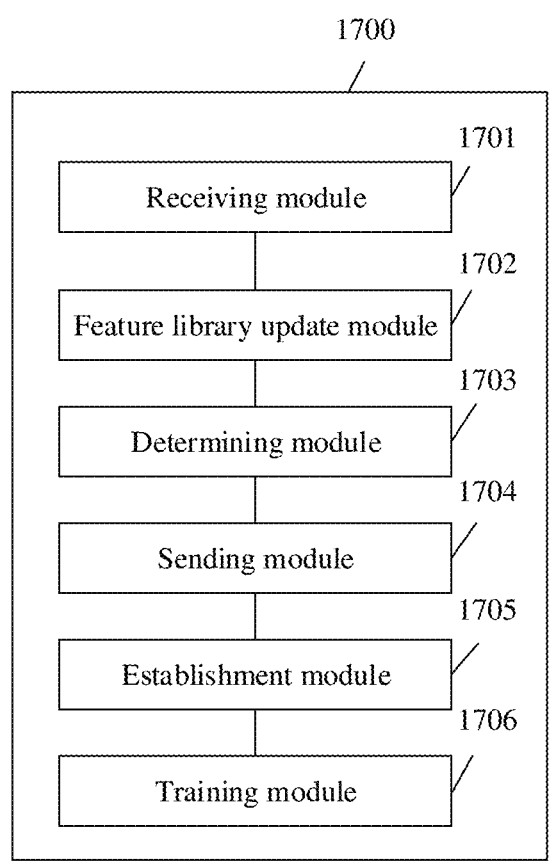
FIG. 17 is a schematic structural diagram of a server according to an embodiment of this application.

FIG. 17 is a schematic structural diagram of a server according to an embodiment of this application. As shown in FIG. 17, the server 1700 includes: a receiving module 1701, configured to receive a feature library update request sent by a first terminal, where the feature library update request carries N categories of samples and a category of each category of samples; a feature library update module 1702, configured to update a feature library based on the N categories of samples and the category of each category of samples, where the receiving module 1701 is further configured to receive an object recognition request sent by a second terminal, where the object recognition request includes a to-be-recognized image block, and the first terminal is the same as or different from the second terminal; a determining module 1703, configured to determine a category of an object in the to-be-recognized image block based on a feature of the object in the to-be-recognized image block; and a sending module 1704, configured to send a recognition response message to the second terminal, where the recognition response message carries the category of the object in the to-be-recognized image block, and the category of the object in the to-be-recognized image block is one of the categories of the N categories of samples.

In a feasible embodiment, the feature library includes a plurality of center feature vectors and categories corresponding to the center feature vectors, the center feature vectors each are used to represent a common feature of objects of a same category, and the feature library update module 1702 is specifically configured to: obtain T' feature vectors if the feature library includes a category of the $T^{th}$ category of samples in the N categories of samples, where the T' feature vectors are feature vectors of samples used for calculating a center feature vector corresponding to the category of the $T^{th}$ category of samples; obtain a feature vector of each sample in the $T^{th}$ category of samples based on a convolutional neural network CNN feature extraction model, where T is an integer greater than 0 and less than or equal to N; determine a center feature vector of the $T^{th}$ category of samples based on the feature vector of each sample in the $T^{th}$ category of samples and the T' feature vectors, where the $s^{ith}$ element in the center feature vector of the $T^{th}$ category of samples is an average value of the $s^{ith}$ elements in feature vectors of all of the $T^{th}$ category of samples and the $s^{ith}$ elements in the T' feature vectors; and update, to the center feature vector of the $T^{th}$ category of samples, the center feature vector that is in the feature library and that corresponds to the category of the T, category of samples.

In a feasible embodiment, the feature library update module 1702 is further specifically configured to: obtain the feature vector of each sample in the $T^{th}$ category of samples based on the CNN feature extraction model if the feature library does not include the category of each category of samples in the N categories of samples; determine a center feature vector of the $T^{th}$ category of samples based on the feature vector of each sample in the $T^{th}$ category of samples, where the $s^{ith}$ element in the center feature vector of the T, category of samples is an average value of the $s^{ith}$ elements in feature vectors of all of the $T^{th}$ category of samples; and add the center feature vector of the $T^{th}$ category of samples and the category of the $T^{th}$ category of samples to the feature library.

In a feasible embodiment, the server 1700 further includes: an establishment module 1705, configured to establish the feature library before the feature library is updated based on the N categories of samples and the categories of the N categories of samples, where the establishing the feature library includes: obtaining M categories of samples and a category of each category of samples, where each category of samples in the M categories of samples includes a plurality of samples, and M is an integer greater than 0; obtaining a feature vector of each sample in the $K^{th}$ category of samples in the M categories of samples based on the CNN feature extraction model, where K=1, 2, 3, . . . , or M; and determining a center feature vector of the $K^{th}$ category of samples based on the feature vector of each sample in the $K^{th}$ category of samples, where the $s^{th}$ element in the center feature vector of the $K^{th}$ category of samples is an average value of the $s^{th}$ elements in feature vectors of all of the $K^{th}$ category of samples, and the feature library includes the center feature vector of the $K^{th}$ category of samples and the category of the $K^{th}$ category of samples.

In a feasible embodiment, the determining module 1703 is specifically configured to: extract the feature of the object in the to-be-recognized image block based on the CNN feature extraction model, to obtain a feature vector of the object in the to-be-recognized image block, where the feature vector is used to represent the feature of the object in the to-be-recognized image block; calculate a distance between the feature vector of the object in the to-be-recognized image block and a center feature vector corresponding to each category in the feature library; and determine a category corresponding to a target center feature vector as the category of the object in the to-be-recognized image block, where the target center feature vector is a center feature vector that is in the feature library and that is closest to the feature vector of the object in the to-be-recognized image block.

In a feasible embodiment, the server 1700 further includes: a training module 1706, configured to train the CNN feature extraction model based on a plurality of samples before the feature library update request sent by the first terminal is received, where the training the CNN feature extraction model based on a plurality of samples includes: obtaining, based on the CNN feature extraction model, a quadruple (a, $C_P$, $C_N$, n) corresponding to a sample s in the plurality of samples, where a is a feature vector of the sample s, $C_P$ is a center feature vector corresponding to a category of the sample s, $C_N$ is a center feature vector that is of a different category of samples and that is closest to a, and n is a feature vector that is of a sample of a different category and that is closest to $C_P$; and training the CNN feature extraction model based on quadruples of the plurality of samples and a loss function, until a value of the loss function is less than preset precision, where the loss function is used to represent precision of the CNN feature extraction model, and the loss function is:

$$\max(D(a,C_P)-D(a,C_N)+\alpha,0)+\max(D(a,C_P)-D(n,C_P)+\beta,0).$$

Herein, $D(a, C_P)$ is a distance between a and $C_P$, $D(a, C_N)$ is a distance between a and $C_N$, $D(n, C_P)$ is a distance between n and $C_P$, and both $\alpha$ and $\beta$ are constants.

It should be noted that the foregoing modules (the receiving module 1701, the feature library update module 1702, the determining module 1703, the sending module 1704, the establishment module 1705, and the training module 1706) are configured to perform related content of the method shown in the foregoing steps S301 to S303. Specifically, the receiving module 1701 is configured to perform related content in steps S1101 and S1103. The feature library update module 1702 is configured to perform related content in step S1102. The determining module 1703 is configured to perform related content in step S1104. The sending module 1704 and the training module 1706 are configured to perform related content in step S1105. The establishment module 1705 is configured to perform related content for establishing the feature library in step S1102. The training module 1706 is configured to perform related content for training the CNN feature extraction model in step S1104.

In this embodiment, the server 1700 is presented in a form of modules. The "module" herein may be an ASIC, a processor and a memory for executing one or more software or firmware programs, an integrated logic circuit, and/or another component that can provide the foregoing functions. In addition, the receiving module 1701, the feature library update module 1702, the determining module 1703, the sending module 1704, the establishment module 1705, and the training module 1706 may be implemented by using a processor 2101 of a server shown in FIG. 21.

Figure 18:
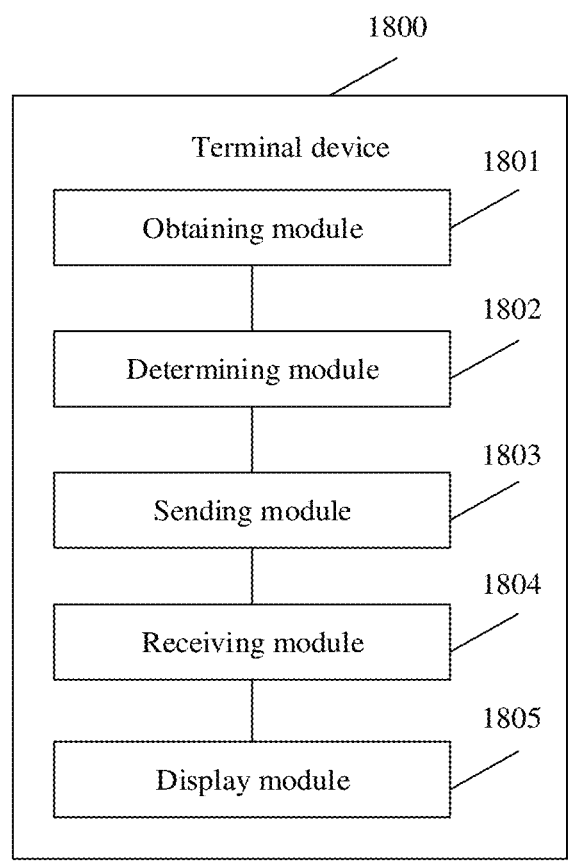
FIG. 18 is a schematic structural diagram of a terminal device according to an embodiment of this application.

FIG. 18 is a schematic structural diagram of a terminal device according to an embodiment of this application. As shown in FIG. 18, the terminal device 1800 includes: an obtaining module 1801, configured to obtain a to-be-recognized image and one or more body regions of the to-be-recognized image; a determining module 1802, configured to determine a saliency score of each of the one or more body regions, where the saliency score of the body region is used to represent a saliency degree of an object in the body region; a sending module 1803, configured to send an object recognition request to a server when a saliency score of a body region A is greater than or equal to a categorization threshold, where the recognition and update request carries a to-be-recognized image block, the to-be-recognized image block is a region covered by the body region A in the to-be-recognized image, and the body region A is any one of the one or more body regions; and a receiving module 1804, configured to receive a recognition response message sent by the server, where the recognition response message carries a category of an object in the to-be-recognized image block.

In a feasible embodiment, the obtaining module 1801 is specifically configured to: input the to-be-recognized image into a saliency probability map generation model, to obtain a saliency probability map of the to-be-recognized image, where a size of the saliency probability map is the same as that of the to-be-recognized image; perform binarization processing on the saliency probability map, to obtain a binary saliency probability map; and process the binary saliency probability map according to a connected region recognition method, to obtain the one or more body regions.

In a feasible embodiment, the determining module 1802 is specifically configured to: obtain a set $N_A$ of saliency probability values in the body region A and a set $N_{A'}$ of saliency probability values in a non-body region A', where the non-body region A' is a region other than the body region A in the saliency probability map; obtain an average saliency probability value of the body region A and an average saliency probability value of the non-body region A' based on the set $N_A$ of the saliency probability values in the body region A and the set $N_{A'}$ of the saliency probability values in the non-body region A'; and obtain the saliency score of the body region A through calculation based on the average saliency probability value of the body region A and the average saliency probability value of the non-body region A'.

The saliency score of the body region A is a ratio of the average saliency probability value of the body region A to the average saliency probability value of the non-body region A', and saliency scores of the one or more body regions include the saliency score of the body region A.

In a feasible embodiment, the terminal device 1800 further includes: a display module 1805, configured to display a frame of the body region A, the object in the to-be-recognized image block, and the category of the object in a superimposed manner after the recognition response message sent by the server is received.

In a feasible embodiment, the sending module 1803 is further configured to: send a first feature library update message to the server after the frame of the body region A, the object in the to-be-recognized image block, and the category of the object are displayed in the superimposed manner, where the first feature library update message carries the to-be-recognized image block and a target category, the target category is a category determined by a user for the object in the to-be-recognized image block, and the target category is different from the category of the object in the to-be-recognized image block.

In a feasible embodiment, the display module 1805 is further configured to: skip displaying the frame of the body region A if the saliency score of the body region A is less than a display threshold; or display an object in the body region A and the frame of the body region A in a superimposed manner if the saliency score of the body region A is greater than or equal to the display threshold and less than the categorization threshold.

In a feasible embodiment, the sending module 1803 is further configured to: send a second feature library update message to the server, where the second feature library update message includes N categories of samples and the categories of the N categories of samples, and the second feature library update message is used to indicate the server to update a feature library based on the N categories of samples and the categories of the N categories of samples.

It should be noted that the foregoing modules (the obtaining module 1801, the determining module 1802, the sending module 1803, the receiving module 1804, and the display module 1805) are configured to perform related content of the method shown in the foregoing steps S1201 to S1204. Specifically, the obtaining module 1801 is configured to perform related content in step S1201, the determining module 1802 is configured to perform related content in step S1202, the sending module 1803 is configured to perform related content in step S1203, and the receiving module 1804 and the display module 1805 are configured to perform related content in step S1204.

In this embodiment, the terminal device 1800 is presented in a form of modules. The "module" herein may be an ASIC, a processor and a memory for executing one or more software or firmware programs, an integrated logic circuit, and/or another component that can provide the foregoing functions. In addition, the obtaining module 18oi, the determining module 1802, the sending module 1803, the receiving module 1804, and the display module 1805 may be implemented by using a processor 2201 of an object recognition apparatus shown in FIG. 22.

Figure 19:
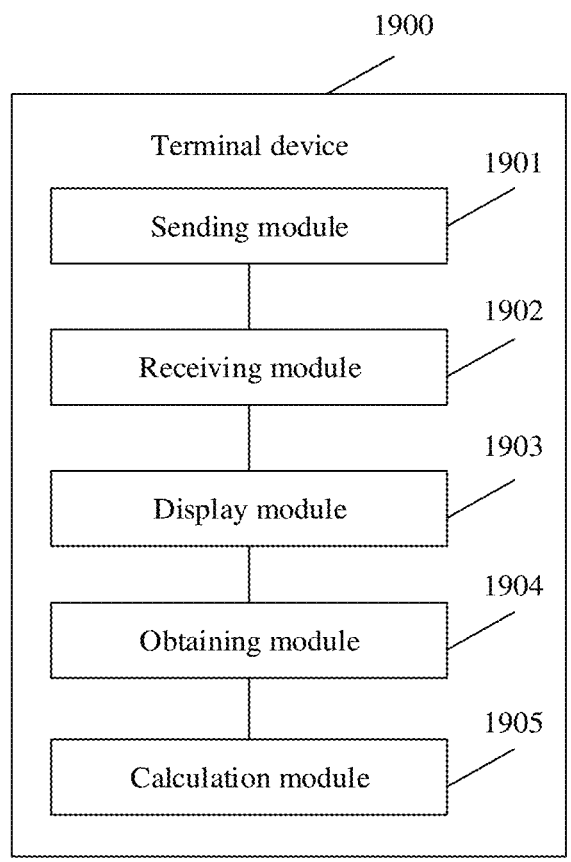
FIG. 19 is a schematic structural diagram of another terminal device according to an embodiment of this application.

FIG. 19 is a schematic structural diagram of another terminal device according to an embodiment of this application. As shown in FIG. 19, the terminal device 1900 includes: a sending module 1901, configured to send a feature library update request to a server, where the feature library update request includes N categories of sample images and the categories of the N categories of sample images, where the sending module 1901 is further configured to send an object recognition request to the server, where the object recognition request is used to indicate the server to recognize an object in the to-be-recognized image, the to-be-recognized image includes X to-be-recognized image blocks, and X is an integer greater than 0; a receiving module 1902, configured to receive a response message sent by the server for responding to the object recognition request, where the response message carries a category of an object in each of the X to-be-recognized image blocks, and a category of an object in at least one of the X to-be-recognized image blocks is included in the categories of the N categories of sample images; and a display module 1903, configured to display the X to-be-recognized image blocks, categories of the X to-be-recognized image blocks, and frames of body regions corresponding to the X to-be-recognized images, where the body regions are regions corresponding to the to-be-recognized image blocks in the to-be-recognized image.

In a possible embodiment, the sending module 1901 sends the feature library update request to the server after a category addition command of a user is received.

In a possible embodiment, the sending module 1901 sends the object recognition request to the server after a command of the user for recognizing a category of the object in the to-be-recognized image is received.

In a feasible embodiment, the terminal device 1900 further includes: an obtaining module 1904, configured to obtain the to-be-recognized image before the object recognition request is sent to the server; and a calculation module 1905, configured to input the to-be-recognized image into a saliency probability map generation model for calculation, to obtain a saliency probability map of the to-be-recognized image, where a size of the saliency probability map is the same as that of the to-be-recognized image.

The calculation module 1905 is further configured to input the saliency probability map of the to-be-recognized image into a body region generation model for calculation, to obtain Y body regions, where Y is an integer greater than or equal to X.

The calculation module 1905 is further configured to perform calculation for each of the Y body regions based on a saliency scoring model, to obtain a saliency score of each body region, where the saliency score of the body region is used to represent a saliency degree of an object in the body region.

The X to-be-recognized image blocks are regions covered by X body regions in the to-be-recognized image, and the X body regions are body regions whose saliency scores are greater than or equal to a display threshold in the Y body regions.

In a feasible embodiment, in the operation of inputting the saliency probability map of the to-be-recognized image into the body region generation model for calculation, to obtain the Y body regions, the calculation module 1905 is specifically configured to: perform binarization processing on the saliency probability map, to obtain a binary saliency probability map; and process the binary saliency probability map according to a connected region recognition method, to obtain the Y body regions.

In a feasible embodiment, in the operation of performing calculation for the Y body regions based on the saliency scoring model, to obtain saliency scores of the Y body regions, the calculation module 1905 is specifically configured to: obtain a set $N_A$ of saliency probability values in a body region A and a set $N_{A'}$ of saliency probability values in a non-body region A', where the non-body region A' is a region other than the body region A in the saliency probability map; obtain an average saliency probability value of the body region A and an average saliency probability value of the non-body region A' based on the set $N_A$ of the saliency probability values in the body region A and the set $N_{A'}$ of the saliency probability values in the non-body region A'; and obtain a saliency score of the body region A through calculation based on the average saliency probability value of the body region A and the average saliency probability value of the non-body region A'.

The saliency score of the body region A is a ratio of the average saliency probability value of the body region A to the average saliency probability value of the non-body region A', and the saliency scores of the Y body regions include the saliency score of the body region A.

It should be noted that the foregoing modules (the sending module 1901, the receiving module 1902, the display module 1903, the obtaining module 1904, and the calculation module 1905) are configured to perform related content of the method shown in the foregoing steps S1301 to S1304. The sending module 1901 and the obtaining module 1904 are configured to perform related content in step S1301, the receiving module 1902 and the calculation module 1905 are configured to perform related content in steps S1302 and S1303, and the display module 1903 is configured to perform related content in step S1304.

In this embodiment, the terminal device 1900 is presented in a form of modules. The "module" herein may refer to an application-specific integrated circuit (ASIC), a processor and a memory for executing one or more software or firmware programs, an integrated logic circuit, and/or another component that can provide the foregoing functions. In addition, the sending module 1901, the receiving module 1902, the display module 1903, the obtaining module 1904, and the calculation module 1905 may be implemented by using a processor 2301 of a recommendation apparatus shown in FIG. 23.

Figure 20:
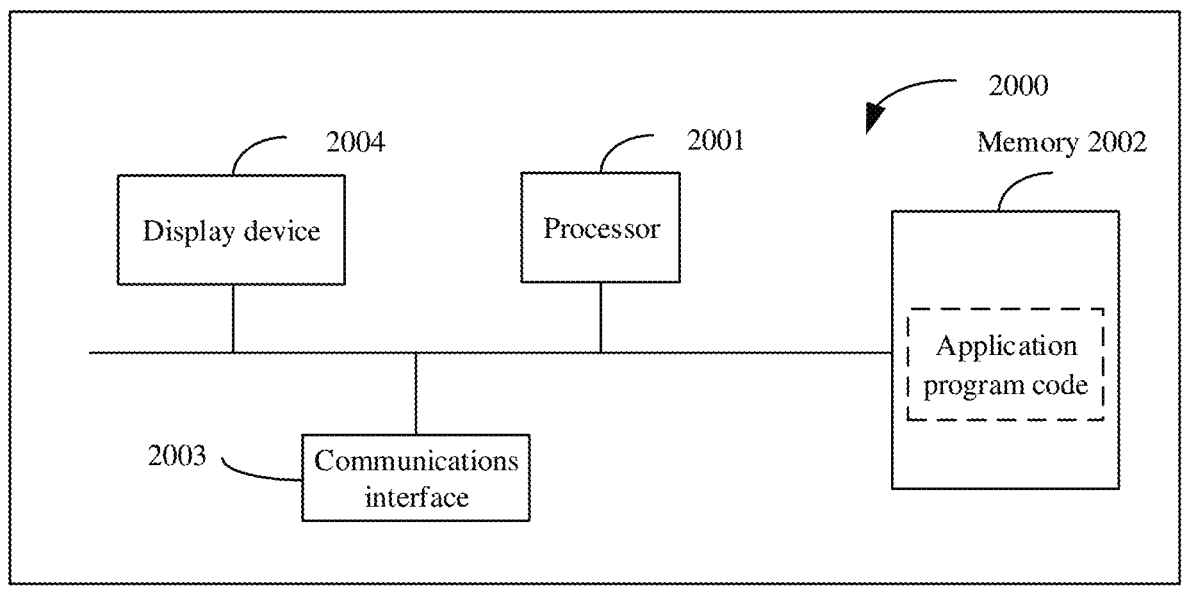
FIG. 20 is a schematic structural diagram of another object recognition apparatus according to an embodiment of this application.

An object recognition apparatus shown in FIG. 20 may be implemented by using a structure in FIG. 20. The object recognition apparatus 2000 includes at least one processor 2001, at least one memory 2002, at least one communications interface 2003, and at least one display device 2004. The processor 2001, the memory 2002, the display device 2004, and the communications interface 2003 are connected and communicate with each other through a communications bus.

The communications interface 2003 is configured to communicate with another device or a communications network, for example, an Ethernet network, a radio access network (RAN), or a wireless local area network (wireless local area networks, WLAN).

The memory 2002 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through the bus. The memory may alternatively be integrated with the processor.

The memory 2002 is configured to store application program code for executing the foregoing solution, and the processor 2001 controls execution of the application program code. The processor 2001 is configured to execute the application program code stored in the memory 2002.

The code stored in the memory 2002 may be used to perform the object recognition method provided above.

The display device 2004 is configured to display a to-be-recognized image, a frame of a body detection region, and a category of an object in a body region.

The processor 2001 may further use one or more integrated circuits to execute a related program, so as to implement the object recognition method or the model training method in the embodiments of this application.

Alternatively, the processor 2001 may be an integrated circuit chip, and has a signal processing capability. In an implementation process, the steps of the recommendation method in this application may be completed by using a hardware integrated logic circuit or an instruction in a form of software in the processor 2001. In an implementation process, the steps of the method for training the status generation model and the selection policy in this application may be completed by using a hardware integrated logic circuit or an instruction in a form of software in the processor 2001. Alternatively, the processor 2001 may be a general-purpose processor, a digital signal processor (DSP), an ASIC, a field programmable gate array (FPGA) or another programmable logic device, a discrete gate or a transistor logic device, or a discrete hardware component. The processor 2001 can implement or perform the methods, steps, and module block diagrams that are disclosed in the embodiments of this application. The general-purpose processor may be a microprocessor, or may be any conventional processor or the like. The steps of the methods disclosed with reference to the embodiments of this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 2002. The processor 2001 reads information in the memory 2002, and completes the object recognition method or the model training method in the embodiments of this application in combination with hardware of the processor 2001.

The communications interface 2003 uses a transceiver apparatus, such as but not limited to a transceiver, to implement communication between the recommendation apparatus or the training apparatus and another device or a communications network. For example, recommendation-related data (a historical recommended object and user behavior for each historical recommended object) or training data may be obtained through the communications interface 2003.

The bus may include a path for transmitting information between the components (for example, the memory 2002, the processor 2001, the communications interface 2003, and the display device 2004) of the apparatus. In a possible embodiment, the processor 2001 specifically performs the following steps: obtaining a to-be-recognized image and one or more body regions of the to-be-recognized image, where the body regions include a to-be-recognized image; determining a saliency score of each of the one or more body regions, where the saliency score of the body region is used to represent a saliency degree of an object in the body region; and when a saliency score of a body region A is greater than or equal to a categorization threshold, determining a feature vector of an object in the body region A based on a feature of the object in the body region A, and determining a category of the object in the body region A based on the feature vector of the object in the body region A and a category feature vector in a feature library, where the body region A is any one of the one or more body regions, and the category feature vector is used to represent a common feature of objects of a same category or a feature of one category of objects.

In a possible embodiment, when performing the step of obtaining one or more body regions of the to-be-recognized image, the processor 2001 specifically performs the following steps: inputting the to-be-recognized image into a saliency probability map generation model, to obtain a saliency probability map of the to-be-recognized image, where a size of the saliency probability map is the same as that of the to-be-recognized image; performing binarization processing on the saliency probability map, to obtain a binary saliency probability map; and processing the binary saliency probability map according to a connected region recognition method, to obtain the one or more body regions.

In a possible embodiment, when determining the saliency score of each of the one or more body regions, the processor 2001 specifically performs the following steps: obtaining a set $N_A$ of saliency probability values in the body region A and a set $N_{A'}$ of saliency probability values in a non-body region A', where the non-body region A' is a region other than the body region A in the saliency probability map; obtaining an average saliency probability value of the body region A and an average saliency probability value of the non-body region A' based on the set $N_A$ of the saliency probability values in the body region A and the set $N_{A'}$ of the saliency probability values in the non-body region A'; and obtaining the saliency score of the body region A through calculation based on the average saliency probability value of the body region A and the average saliency probability value of the non-body region A', where the saliency score of the body region A is a ratio of the average saliency probability value of the body region A to the average saliency probability value of the non-body region A', and saliency scores of the one or more body regions include the saliency score of the body region A.

In a possible embodiment, the category feature vector in the feature library is a center feature vector, the center feature vector is used to represent a common feature of objects of a same category, and when determining the feature vector of the object in the body region A based on the feature of the object in the body region A, and determining the category of the object in the body region A based on the feature vector of the object in the body region A and the category feature vector in the feature library, the processor 2001 specifically performs the following steps: extracting the feature of the object in the body region A based on a convolutional neural network CNN feature extraction model, to obtain the feature vector of the object in the body region A; calculating a distance between the feature vector of the object in the body region A and a center feature vector corresponding to each category in the feature library; and determining a category corresponding to a target center feature vector as the category of the object in the body region A, where the target center feature vector is a center feature vector that is in the feature library and that is closest to the feature vector of the object in the body region A.

In a possible embodiment, before obtaining the feature vector of the object in the body region A based on the CNN feature extraction model, the processor 2001 specifically performs the following step: training the CNN feature extraction model based on a plurality of samples, where the training the CNN feature extraction model based on a plurality of samples includes: obtaining, based on the CNN feature extraction model, a quadruple (a, $C_P$, $C_N$, n) corresponding to a sample s in the plurality of samples, where a is a feature vector of the sample s, $C_P$ is a center feature vector corresponding to a category of the sample s, $C_N$ is a center feature vector that is of a different category of samples and that is closest to a, and n is a feature vector that is of a sample of a different category and that is closest to $C_P$; and training the CNN feature extraction model based on quadruples of the plurality of samples and a loss function, until a value of the loss function is less than preset precision, where the loss function is used to represent precision of the CNN feature extraction model, and the loss function is:

$\max(D(a, C_P)-D(a, C_N)+\alpha, 0)+\max(D(a, C_P)-D(n, C_P)+\beta, 0)$, where $D(a, C_P)$ is a distance between a and $C_P$, $D(a, C_N)$ is a distance between a and $C_N$, $D(n, C_P)$ is a distance between n and $C_P$, and both $\alpha$ and $\beta$ are constants.

In a possible embodiment, the processor 2001 further specifically performs the following step: establishing the feature library, where the establishing the feature library includes: obtaining M categories of samples and a category of each category of samples, where each category of samples in the M categories of samples includes a plurality of samples, and M is an integer greater than 0; obtaining a feature vector of each sample in the $K^{th}$ category of samples in the M categories of samples based on the CNN feature extraction model, where K=1, 2, 3, . . . , or M; and determining a center feature vector of the $K^{th}$ category of samples based on the feature vector of each sample in the $K^{th}$ category of samples, where the $s^{th}$ element in the center feature vector of the $K^{th}$ category of samples is an average value of the $s^{th}$ elements in feature vectors of all of the $K^{th}$ category of samples, and the feature library includes the center feature vector of the $K^{th}$ category of samples and the category of the $K^{th}$ category of samples.

In a possible embodiment, the processor 2001 further specifically performs the following steps: receiving N categories of samples and a category of each category of samples from a third party, where each category of samples in the N categories of samples includes a plurality of samples, and N is an integer greater than 0; obtaining T' feature vectors if the feature library includes a category of the $T^{th}$ category of samples in the N categories of samples, where the T' feature vectors are feature vectors of samples used for calculating a center feature vector corresponding to the category of the T, category of samples; obtaining a feature vector of each sample in the $T^{th}$ category of samples based on the CNN feature extraction model, where T is greater than 0 and less than or equal to N; determining a center feature vector of the $T^{th}$ category of samples based on the feature vector of each sample in the $T^{th}$ category of samples and the T' feature vectors, where the $s'^{th}$ element in the center feature vector of the T, category of samples is an average value of the $s'^{th}$ elements in feature vectors of all of the $T^{th}$ category of samples and the $s'^{th}$ elements in the T' feature vectors; and updating, to the center feature vector of the $T^{th}$ category of samples, the center feature vector that is in the feature library and that corresponds to the category of the $T^{th}$ category of samples.

In a possible embodiment, the processor 2001 further specifically performs the following steps: obtaining the feature vector of each sample in the T, category of samples based on the CNN feature extraction model if the feature library does not include the category of each category of samples in the $T^{th}$ category of samples; determining a center feature vector of the $T^{th}$ category of samples based on the feature vector of each sample in the $T^{th}$ category of samples, where the $s'^{th}$ element in the center feature vector of the $T^{th}$ category of samples is an average value of the $s'^{th}$ elements in feature vectors of all of the $T^{th}$ category of samples; and adding the center feature vector of the $T^{th}$ category of samples and the category of the $T^{th}$ category of samples to the feature library.

In a possible embodiment, after the processor 2001 determines the category of the object in the body region A based on the feature vector of the object in the body region A and the category feature vector in the feature library, the display device 2004 specifically performs the following step: displaying a frame of the body region A, the object in the body region A, and the category of the object in a superimposed manner.

In a possible embodiment, the display device 2004 further specifically performs the following step: skipping displaying a frame of the body region A if the saliency score of the body region A is less than a display threshold; or displaying the object in the body region A and a frame of the body region A in a superimposed manner if the saliency score of the body region A is greater than or equal to the display threshold and less than the categorization threshold.

Figure 21:
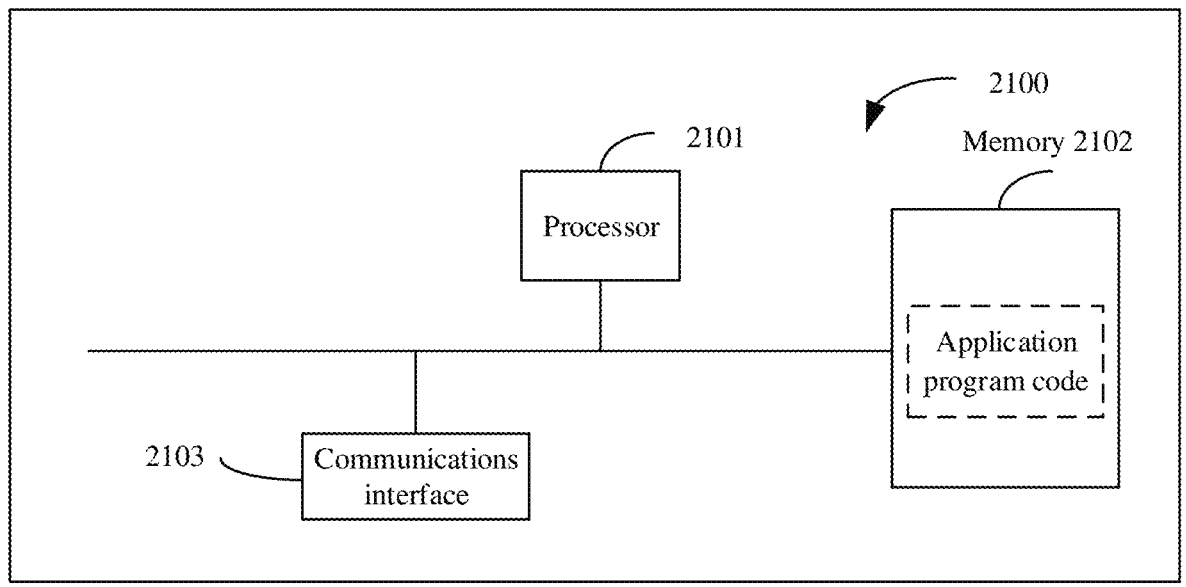
FIG. 21 is a schematic structural diagram of another server according to an embodiment of this application.

A server shown in FIG. 21 may be implemented by using a structure in FIG. 21. The server 2110 includes at least one processor 2101, at least one memory 2102, and at least one communications interface 2103. The processor 2101, the memory 2102, and the communications interface 2103 are connected and communicate with each other through a communications bus.

The communications interface 2103 is configured to communicate with another device or a communications network such as an Ethernet network, a RAN, or a WLAN.

The memory 2102 may be a ROM or another type of static storage device capable of storing static information and instructions, or a RAM or another type of dynamic storage device capable of storing information and instructions, or may be an EEPROM, a CD-ROM or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through the bus. The memory may alternatively be integrated with the processor.

The memory 2102 is configured to store application program code for executing the foregoing solution, and the processor 2101 controls execution of the application program code. The processor 2101 is configured to execute the application program code stored in the memory 2102.

The code stored in the memory 2102 may be used to perform the object recognition method provided above.

The processor 2101 may further use one or more integrated circuits to execute a related program, so as to implement the object recognition method or the model training method in the embodiments of this application.

Alternatively, the processor 2101 may be an integrated circuit chip, and has a signal processing capability. In an implementation process, the steps of the recommendation method in this application may be completed by using a hardware integrated logic circuit or an instruction in a form of software in the processor 2101. In an implementation process, the steps of the method for training the status generation model and the selection policy in this application may be completed by using a hardware integrated logic circuit or an instruction in a form of software in the processor 2101. Alternatively, the processor 2001 may be a general-purpose processor, a DSP, an ASIC, an FPGA or another programmable logic device, a discrete gate or a transistor logic device, or a discrete hardware component. The processor 2101 can implement or perform the methods, steps, and module block diagrams that are disclosed in the embodiments of this application. The general-purpose processor may be a microprocessor, or may be any conventional processor or the like. The steps of the methods disclosed with reference to the embodiments of this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 2102. The processor 2101 reads information in the memory 2102, and completes the object recognition method or the model training method in the embodiments of this application in combination with hardware of the processor 2101.

The communications interface 2103 uses a transceiver apparatus, such as but not limited to a transceiver, to implement communication between the recommendation apparatus or the training apparatus and another device or a communications network. For example, recommendation-related data (a historical recommended object and user behavior for each historical recommended object) or training data may be obtained through the communications interface 2103.

The bus may include a path for transmitting information between the components (for example, the memory 2102, the processor 2101, and the communications interface 2103) of the apparatus. In a possible embodiment, the processor 2101 specifically performs the following steps: receiving a feature library update request sent by a first terminal, where the feature library update request carries N categories of samples and a category of each category of samples; updating a feature library based on the N categories of samples and the category of each category of samples; receiving an object recognition request sent by a second terminal, where the object recognition request includes a to-be-recognized image block, and the first terminal is the same as or different from the second terminal; determining a category of an object in the to-be-recognized image block based on a feature of the object in the to-be-recognized image block; and sending a recognition response message to the second terminal, where the recognition response message carries the category of the object in the to-be-recognized image block.

In a feasible embodiment, the feature library includes a plurality of center feature vectors and categories corresponding to the center feature vectors, the center feature vectors each are used to represent a common feature of objects of a same category, and when updating the feature library based on the N categories of samples and the categories of the N categories of samples, the processor 2101 specifically performs the following steps: obtaining T' feature vectors if the feature library includes a category of the $T^{th}$ category of samples in the N categories of samples, where the T' feature vectors are feature vectors of samples used for calculating a center feature vector corresponding to the category of the $T^{th}$ category of samples; obtaining a feature vector of each sample in the $T^{th}$ category of samples based on a convolutional neural network CNN feature extraction model, where T is an integer greater than 0 and less than or equal to N; determining a center feature vector of the $T^{th}$ category of samples based on the feature vector of each sample in the $T^{th}$ category of samples and the T' feature vectors, where the $s'^{th}$ element in the center feature vector of the $T^{th}$ category of samples is an average value of the $s'^{th}$ elements in feature vectors of all of the $T^{th}$ category of samples and the $s'^{th}$ elements in the T' feature vectors; and updating, to the center feature vector of the $T^{th}$ category of samples, the center feature vector that is in the feature library and that corresponds to the category of the $T^{th}$ category of samples.

In a feasible embodiment, when updating the feature library based on the N categories of samples and the categories of the N categories of samples, the processor 2101 specifically performs the following steps: obtaining the feature vector of each sample in the $T_i$ category of samples based on the CNN feature extraction model if the feature library does not include the category of each category of samples in the N categories of samples; determining a center feature vector of the $T^{th}$ category of samples based on the feature vector of each sample in the $T^{th}$ category of samples, where the $s'^{th}$ element in the center feature vector of the $T^{th}$ category of samples is an average value of the $s'^{th}$ elements in feature vectors of all of the $T^{th}$ category of samples; and adding the center feature vector of the $T^{th}$ category of samples and the category of the $T^{th}$ category of samples to the feature library.

In a feasible embodiment, before updating the feature library based on the N categories of samples and the categories of the N categories of samples, the processor 2101 further specifically performs the following steps: establishing the feature library, where the establishing the feature library includes: obtaining M categories of samples and a category of each category of samples, where each category of samples in the M categories of samples includes a plurality of samples, and M is an integer greater than 0; obtaining a feature vector of each sample in the $K^{th}$ category of samples in the M categories of samples based on the CNN feature extraction model, where K=1, 2, 3, ..., or M; and determining a center feature vector of the $K^{th}$ category of samples based on the feature vector of each sample in the $K^{th}$ category of samples, where the $s'^{th}$ element in the center feature vector of the $K^{th}$ category of samples is an average value of the $s'^{th}$ elements in feature vectors of all of the $K^{th}$ category of samples, and the feature library includes the center feature vector of the $K^{th}$ category of samples and the category of the $K^{th}$ category of samples.

In a feasible embodiment, when determining the category of the object in the to-be-recognized image block based on the feature of the object in the to-be-recognized image block, the processor 2101 specifically performs the following steps: extracting the feature of the object in the to-be-recognized image block based on the CNN feature extraction model, to obtain a feature vector of the object in the to-be-recognized image block, where the feature vector is used to represent the feature of the object in the to-be-recognized image block; calculating a distance between the feature vector of the object in the to-be-recognized image block and a center feature vector corresponding to each category in the feature library; and determining a category corresponding to a target center feature vector as the category of the object in the to-be-recognized image block, where the target center feature vector is a center feature vector that is in the feature library and that is closest to the feature vector of the object in the to-be-recognized image block.

In a feasible embodiment, before receiving the feature library update request sent by the first terminal, the processor 2101 specifically performs the following step: training the CNN feature extraction model based on a plurality of samples, where the training the CNN feature extraction model based on a plurality of samples includes: obtaining, based on the CNN feature extraction model, a quadruple (a, $C_P$, $C_N$, n) corresponding to a sample s in the plurality of samples, where a is a feature vector of the sample s, $C_P$ is a center feature vector corresponding to a category of the sample s, $C_N$ is a center feature vector that is of a different category of samples and that is closest to a, and n is a feature vector that is of a sample of a different category and that is closest to $C_P$; and training the CNN feature extraction model based on quadruples of the plurality of samples and a loss function, until a value of the loss function is less than preset precision, where the loss function is used to represent precision of the CNN feature extraction model, and the loss function is:

$$\max(D(a,C_P)-D(a,C_N)+\alpha,0)+\max(D(a,C_P)-D(n,C_P)+\beta,0).$$

Herein, $D(a, C_P)$ is a distance between a and $C_P$, $D(a, C_N)$ is a distance between a and $C_N$, $D(n, C_P)$ is a distance between n and $C_P$, and both $\alpha$ and $\beta$ are constants.

Figure 22:
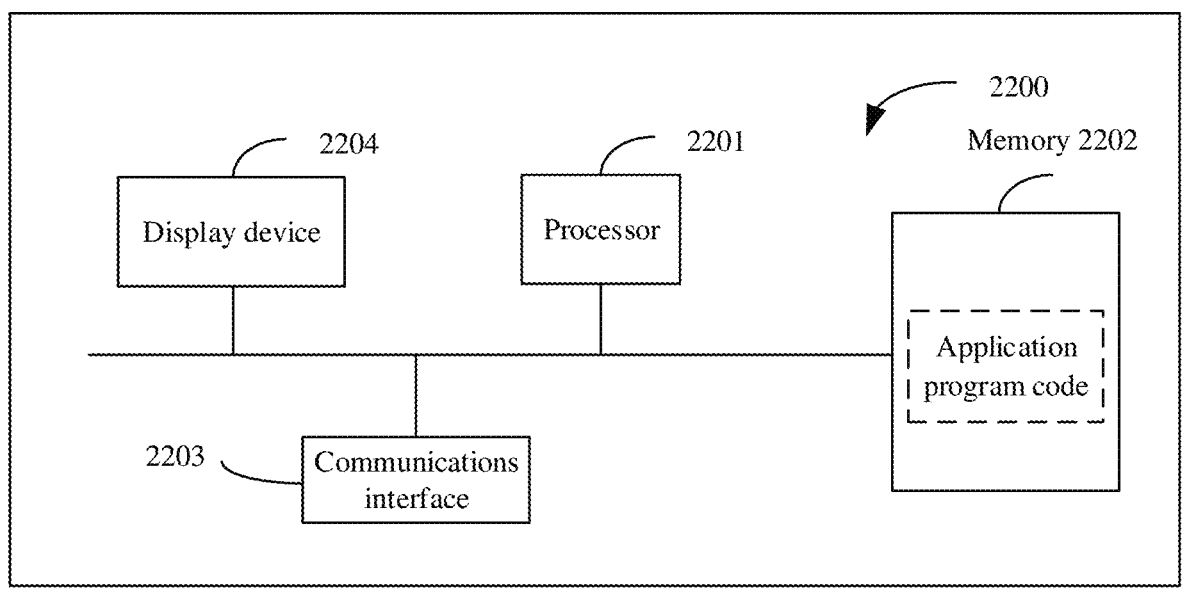
FIG. 22 is a schematic structural diagram of another terminal device according to an embodiment of this application.

A terminal device shown in FIG. 22 may be implemented by using a structure in FIG. 22. The terminal device 2210 includes at least one processor 2201, at least one memory 2202, at least one communications interface 2203, and at least one display device 2204. The processor 2201, the memory 2202, the display device 2204, and the communications interface 2203 are connected and communicate with each other through a communications bus.

The communications interface 2203 is configured to communicate with another device or a communications network such as an Ethernet network, a RAN, or a WLAN.

The memory 2202 may be a ROM or another type of static storage device capable of storing static information and instructions, or a RAM or another type of dynamic storage device capable of storing information and instructions, or may be an EEPROM, a CD-ROM or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through the bus. The memory may alternatively be integrated with the processor.

The memory 2202 is configured to store application program code for executing the foregoing solution, and the processor 2201 controls execution of the application program code. The processor 2201 is configured to execute the application program code stored in the memory 2202.

The code stored in the memory 2202 may be used to perform the object recognition method provided above.

The display device 2204 is configured to display a to-be-recognized image, a frame of a body detection region, and a category of an object in a body region.

The processor 2201 may further use one or more integrated circuits to execute a related program, so as to implement the object recognition method in the embodiments of this application.

Alternatively, the processor 2201 may be an integrated circuit chip, and has a signal processing capability. In an implementation process, the steps of the recommendation method in this application may be completed by using a hardware integrated logic circuit or an instruction in a form of software in the processor 2201. In an implementation process, the steps of the method for training the status generation model and the selection policy in this application may be completed by using a hardware integrated logic circuit or an instruction in a form of software in the processor 2201. Alternatively, the processor 2001 may be a general-purpose processor, a DSP, an ASIC, an FPGA or another programmable logic device, a discrete gate or a transistor logic device, or a discrete hardware component. The processor 2201 can implement or perform the methods, steps, and module block diagrams that are disclosed in the embodiments of this application. The general-purpose processor may be a microprocessor, or may be any conventional processor or the like. The steps of the methods disclosed with reference to the embodiments of this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 2202. The processor 2201 reads information in the memory 2202, and completes the object recognition method or the model training method in the embodiments of this application in combination with hardware of the processor 2201.

The communications interface 2203 uses a transceiver apparatus, such as but not limited to a transceiver, to implement communication between the recommendation apparatus or the training apparatus and another device or a communications network. For example, recommendation-related data (a historical recommended object and user behavior for each historical recommended object) or training data may be obtained through the communications interface 2203.

The bus may include a path for transmitting information between the components (for example, the memory 2202, the processor 2201, the communications interface 2203, and the display device 2204) of the apparatus. In a possible embodiment, the processor 2201 specifically performs the following steps: obtaining a to-be-recognized image and one or more body regions of the to-be-recognized image; determining a saliency score of each of the one or more body regions, where the saliency score of the body region is used to represent a saliency degree of an object in the body region; sending an object recognition request to a server when a saliency score of a body region A is greater than or equal to a categorization threshold, where the recognition and update request carries a to-be-recognized image block, the to-be-recognized image block is a region covered by the body region A in the to-be-recognized image, and the body region A is any one of the one or more body regions; and receiving a recognition response message sent by the server, where the recognition response message carries a category of an object in the to-be-recognized image block.

In a feasible embodiment, when obtaining the one or more body regions of the to-be-recognized image, the processor 2201 specifically performs the following steps: inputting the to-be-recognized image into a saliency probability map generation model, to obtain a saliency probability map of the to-be-recognized image, where a size of the saliency probability map is the same as that of the to-be-recognized image; performing binarization processing on the saliency probability map, to obtain a binary saliency probability map; and processing the binary saliency probability map according to a connected region recognition method, to obtain the one or more body regions.

In a feasible embodiment, when determining the saliency score of each of the one or more body regions, the processor 2201 specifically performs the following steps: obtaining a set $N_A$ of saliency probability values in the body region A and a set $N_{A'}$ of saliency probability values in a non-body region A', where the non-body region A' is a region other than the body region A in the saliency probability map; obtaining an average saliency probability value of the body region A and an average saliency probability value of the non-body region A' based on the set $N_A$ of the saliency probability values in the body region A and the set $N_{A'}$ of the saliency probability values in the non-body region A'; and obtaining the saliency score of the body region A through calculation based on the average saliency probability value of the body region A and the average saliency probability value of the non-body region A', where the saliency score of the body region A is a ratio of the average saliency probability value of the body region A to the average saliency probability value of the non-body region A', and saliency scores of the one or more body regions include the saliency score of the body region A.

In a feasible embodiment, after receiving the recognition response message sent by the server, the display device 2004 specifically performs the following step: displaying a frame of the body region A, the object in the to-be-recognized image block, and the category of the object in a superimposed manner.

In a feasible embodiment, after displaying the frame of the body region A, the object in the to-be-recognized image block, and the category of the object in the superimposed manner, the processor 2201 specifically performs the following step: sending a first feature library update message to the server, where the first feature library update message carries the to-be-recognized image block and a target category, the target category is a category determined by a user for the object in the to-be-recognized image block, and the target category is different from the category of the object in the to-be-recognized image block.

In a feasible embodiment, the processor 2201 further specifically performs the following step: skipping displaying the frame of the body region A if the saliency score of the body region A is less than a display threshold; or displaying an object in the body region A and the frame of the body region A in a superimposed manner if the saliency score of the body region A is greater than or equal to the display threshold and less than the categorization threshold.

In a feasible embodiment, the object recognition method further includes: sending a second feature library update message to the server, where the second feature library update message includes N categories of samples and the categories of the N categories of samples, and the second feature library update message is used to indicate the server to update a feature library based on the N categories of samples and the categories of the N categories of samples.

Figure 23:
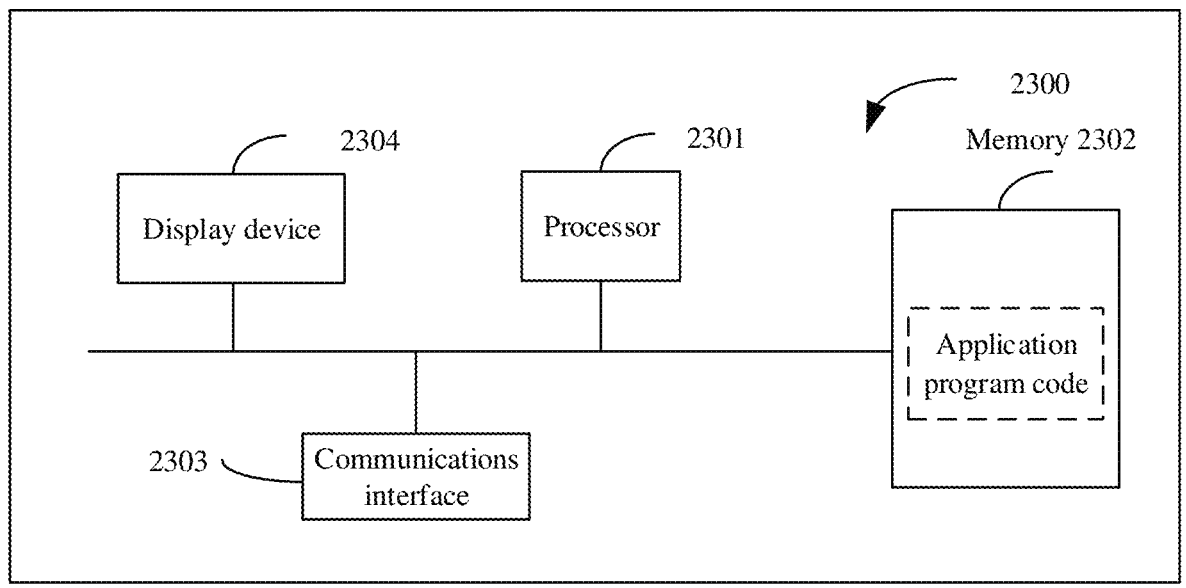
FIG. 23 is a schematic structural diagram of another terminal device according to an embodiment of this application.

A terminal device shown in FIG. 23 may be implemented by using a structure in FIG. 23. The terminal device 2300 includes at least one processor 2301, at least one memory 2302, at least one communications interface 2303, and at least one display device 2304. The processor 2301, the memory 2302, the display device 2304, and the communications interface 2303 are connected and communicate with each other through a communications bus.

The communications interface 2303 is configured to communicate with another device or a communications network such as an Ethernet network, a RAN, or a WLAN.

The memory 2302 may be a ROM or another type of static storage device capable of storing static information and instructions, or a RAM or another type of dynamic storage device capable of storing information and instructions, or may be an EEPROM, a CD-ROM or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through the bus. The memory may alternatively be integrated with the processor.

The memory 2302 is configured to store application program code for executing the foregoing solution, and the processor 2301 controls execution of the application program code. The processor 2301 is configured to execute the application program code stored in the memory 2302.

The code stored in the memory 2302 may be used to perform the object recognition method provided above.

The display device 2304 is configured to display a to-be-recognized image, a frame of a body detection region, and a category of an object in a body region.

The processor 2301 may further use one or more integrated circuits to execute a related program, so as to implement the object recognition method in the embodiments of this application.

Alternatively, the processor 2301 may be an integrated circuit chip, and has a signal processing capability. In an implementation process, the steps of the recommendation method in this application may be completed by using a hardware integrated logic circuit or an instruction in a form of software in the processor 2301. In an implementation process, the steps of the method for training the status generation model and the selection policy in this application may be completed by using a hardware integrated logic circuit or an instruction in a form of software in the processor 2301. Alternatively, the processor 2001 may be a general-purpose processor, a DSP, an ASIC, an FPGA or another programmable logic device, a discrete gate or a transistor logic device, or a discrete hardware component. The processor 2301 can implement or perform the methods, steps, and module block diagrams that are disclosed in the embodiments of this application. The general-purpose processor may be a microprocessor, or may be any conventional processor or the like. The steps of the methods disclosed with reference to the embodiments of this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 2302. The processor 2301 reads information in the memory 2302, and completes the object recognition method or the model training method in the embodiments of this application in combination with hardware of the processor 2301.

The communications interface 2303 uses a transceiver apparatus, such as but not limited to a transceiver, to implement communication between the recommendation apparatus or the training apparatus and another device or a communications network. For example, recommendation-related data (a historical recommended object and user behavior for each historical recommended object) or training data may be obtained through the communications interface 2303.

The bus may include a path for transmitting information between the components (for example, the memory 2302, the processor 2301, the communications interface 2303, and the display device 2204) of the apparatus.

In a possible embodiment, the processor 2301 specifically performs the following steps: sending a feature library update request to a server after receiving a category addition command from a user, where the feature library update request includes N categories of sample images and the categories of the N categories of sample images; sending an object recognition request to the server after receiving a command of the user for recognizing an object in a to-be-recognized image, where the object recognition request is used to indicate the server to recognize the object in the to-be-recognized image, the to-be-recognized image includes X to-be-recognized image blocks, and X is an integer greater than 0; receiving a response message sent by the server for responding to the object recognition request, where the response message carries a category of an object in each of the X to-be-recognized image blocks, and a category of an object in at least one of the X to-be-recognized image blocks is included in the categories of the N categories of sample images; and displaying the X to-be-recognized image blocks, categories of the X to-be-recognized image blocks, and frames of body regions corresponding to the X to-be-recognized images, where the body regions are regions corresponding to the to-be-recognized image blocks in the to-be-recognized image.

Optionally, the processor 2301 sends the feature library update request to the server after receiving the category addition command from the user.

Optionally, the processor 2301 sends the object recognition request to the server after receiving the command of the user for recognizing the object in the to-be-recognized image.

In a feasible embodiment, before sending the object recognition request to the server, the processor 2301 specifically performs the following steps: obtaining the to-be-recognized image; inputting the to-be-recognized image into a saliency probability map generation model, to obtain a saliency probability map of the to-be-recognized image, where a size of the saliency probability map is the same as that of the to-be-recognized image; inputting the saliency probability map of the to-be-recognized image into a body region generation model, to obtain Y body regions, where Y is an integer greater than or equal to X; and performing calculation for each of the Y body regions based on a saliency scoring model, to obtain a saliency score of each body region, where the saliency score of the body region is used to represent a saliency degree of an object in the body region, the X to-be-recognized image blocks are regions covered by X body regions in the to-be-recognized image, and the X body regions are body regions whose saliency scores are greater than or equal to a display threshold in the Y body regions.

In a feasible embodiment, when inputting the saliency probability map of the to-be-recognized image into the body region generation model, to obtain the Y body regions, the processor 2301 specifically performs the following steps: performing binarization processing on the saliency probability map, to obtain a binary saliency probability map; and processing the binary saliency probability map according to a connected region recognition method, to obtain the Y body regions.

In a feasible embodiment, when performing calculation for the Y body regions based on the saliency scoring model, to obtain saliency scores of the Y body regions, the processor 2301 specifically performs the following steps: obtaining a set $N_A$ of saliency probability values in a body region A and a set $N_{A'}$ of saliency probability values in a non-body region A', where the non-body region A' is a region other than the body region A in the saliency probability map; obtaining an average saliency probability value of the body region A and an average saliency probability value of the non-body region A' based on the set $N_A$ of the saliency probability values in the body region A and the set $N_{A'}$ of the saliency probability values in the non-body region A'; and obtaining a saliency score of the body region A through calculation based on the average saliency probability value of the body region A and the average saliency probability value of the non-body region A', where the saliency score of the body region A is a ratio of the average saliency probability value of the body region A to the average saliency probability value of the non-body region A', and the saliency scores of the Y body regions include the saliency score of the body region A.

This application provides a computer-readable medium. The computer-readable medium stores program code to be executed by a device, and the program code is used to perform related content of the object recognition method in the embodiment shown in FIG. 3, FIG. 7a and FIG. 7b, FIG. 8, FIG. 10, FIG. 11, or FIG. 12.

This application provides a computer program product including an instruction. When the computer program product is run on a computer, the computer is enabled to perform related content of the object recognition method in the embodiment shown in FIG. 3, FIG. 7a and FIG. 7b, FIG. 8, FIG. 10, FIG. 11, or FIG. 12.

This application provides a chip. The chip includes a processor and a data interface. The processor reads, through the data interface, an instruction stored in a memory, to perform related content of the object recognition method in the embodiment shown in FIG. 3, FIG. 7a and FIG. 7b, FIG. 8, FIG. 10, FIG. 11, or FIG. 12.

Optionally, in an implementation, the chip may further include the memory. The memory stores the instruction, and the processor is configured to execute the instruction stored in the memory. When the instruction is executed, the processor is configured to perform the related content of the object recognition method in the embodiment shown in FIG. 3, FIG. 7a and FIG. 7b, FIG. 8, FIG. 10, FIG. 11, or FIG. 12.

It should be noted that, to make the description brief, the method embodiments are expressed as a series of actions. However, a person skilled in the art should know that the present application is not limited to the described action sequence, because according to the present application, some steps may be performed in other sequences or performed simultaneously. In addition, a person skilled in the art should also know that all the embodiments described in the specification are used as examples, and the related actions and modules are not necessarily mandatory to the present application.

In the foregoing embodiments, the descriptions of the embodiments have respective focuses. For a part that is not described in detail in an embodiment, refer to related descriptions in other embodiments.

In the several embodiments provided in this application, it should be understood that the disclosed apparatuses may be implemented in another manner. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electric or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable memory. Based on such an understanding, the technical solutions of the present application essentially, or the part contributing to a prior art, or all or some of the technical solutions may be implemented in the form of a software product. The computer software product is stored in a memory and includes several instructions for instructing a computer device (which may be a personal computer, a server, or a network device) to perform all or some of the steps of the methods described in the embodiments of the present application. The foregoing memory includes any medium that can store program code, such as a USB flash drive, a ROM, a RAM, a removable hard disk, a magnetic disk, or an optical disc.

A person of ordinary skill in the art may understand that all or some of the steps of the methods in the embodiments may be implemented by a program instructing relevant hardware. The program may be stored in a computer-readable memory. The memory may include a flash memory, a ROM, a RAM, a magnetic disk, an optical disc, or the like.

The embodiments of this application are described in detail above. The principle and implementation of this application are described herein through specific examples. The description about the embodiments is merely provided to help understand the method and core ideas of this application. In addition, a person of ordinary skill in the art can make variations and modifications to this application in terms of the specific implementations and application scopes based on the ideas of the present application. Therefore, the content of this specification shall not be construed as a limit to the present application.

What is claimed is:

1. A method, comprising:
   obtaining, by a device, a to-be-recognized image and one or more body regions of the to-be-recognized image, wherein the one or more body regions comprise a to-be-recognized object;
   determining, by the device, a saliency score of each body region of the one or more body regions, wherein the respective saliency score of each respective body region represents a saliency degree of an object in the respective body region;
   in response to a saliency score of a body region A being greater than or equal to a categorization threshold, determining, by the device, a feature vector of an object in the body region A based on a feature of the object in the body region A, and determining a category of the object in the body region A based on the feature vector of the object in the body region A and a category feature vector in a feature library, wherein the body region A is comprised in one of the one or more body regions, and the category feature vector represents a common feature of objects of a same category or a feature of one category of objects; wherein the category feature vector in the feature library is a center feature vector, the center feature vector represents the common feature of objects of the same category, and determining the category of the object in the body region A based on the feature vector of the object in the body region A and the category feature vector in the feature library comprises:

extracting the feature of the object in the body region A using a convolutional neural network (CNN), to obtain the feature vector of the object in the body region A, wherein the CNN comprises an input layer configured to receive a portion of the to-be-recognized image corresponding to the body region A, a convolutional layer coupled to the input layer, and a neural network layer coupled to the convolutional layer, the neural network layer comprising at least one hidden layer and an output layer coupled to the at least one hidden layer;

calculating a distance between the feature vector of the object in the body region A and a center feature vector corresponding to each category in the feature library; and determining a category corresponding to a target center feature vector to be the category of the object in the body region A, wherein the target center feature vector is a center feature vector in the feature library that is closest to the feature vector of the object in the body region A.

2. The method according to claim 1, wherein obtaining the one or more body regions of the to-be-recognized image comprises:

inputting the to-be-recognized image into a saliency probability map generation model, to obtain a saliency probability map of the to-be-recognized image, wherein a size of the saliency probability map is the same as a size of the to-be-recognized image;

performing binarization processing on the saliency probability map, to obtain a binary saliency probability map; and processing the binary saliency probability map according to a connected region recognition method, to obtain the one or more body regions.

3. The method according to claim 2, wherein determining the saliency score of each body region of the one or more body regions comprises:

obtaining a set $N_A$ of saliency probability values corresponding to the body region A and a set $N_A'$ of saliency probability values corresponding to a non-body region A', wherein the non-body region A' is a region other than the body region A in the saliency probability map;

obtaining an average saliency probability value of the body region A' and an average saliency probability value of the non-body region A' based on the set $N_A$ of the saliency probability values in the body region A and the set $N_A'$ of the saliency probability values in the non-body region A'; and obtaining the saliency score of the body region A through calculation based on the average saliency probability value of the body region A and the average saliency probability value of the non-body region A'; and wherein the saliency score of the body region A is a ratio of the average saliency probability value of the body region A to the average saliency probability value of the non-body region A', and saliency scores of the one or more body regions comprise the saliency score of the body region A.

4. The method according to claim 1, further comprising:

before the feature vector of the object in the body region A is obtained based on the CNN, training the CNN based on a plurality of samples, wherein the training the CNN based on the plurality of samples comprises:

obtaining, based on the CNN, a quadruple (a, $C_P$, $C_N$, n) corresponding to a sample s in the plurality of samples, wherein a is a feature vector of the sample s, $C_P$ is a center feature vector corresponding to a category of the sample s, $C_N$ is a center feature vector that is of a different category of samples and that is closest to a, and n is a feature vector that is of a sample of a different category and that is closest to $C_P$; and training the CNN based on quadruples of the plurality of samples and a loss function, until a value of the loss function is less than a preset precision, wherein the loss function represents a precision of the CNN, and the loss function is:

max (D (a, $C_P$)−D(a, $C_N$)+α, 0)+max (D (a, $C_P$)−D (n, $C_P$)+β, 0), wherein D(a, $C_P$) is a distance between a and $C_P$, D(a, $C_N$) is a distance between a and $C_N$, D(n, $C_P$) is a distance between n and $C_P$, and both α and β are constants.

5. The method according to claim 1, further comprising establishing the feature library, wherein establishing the feature library comprises:

obtaining M categories of samples, and obtaining a category of each category of samples of the M categories of samples, wherein each category of samples in the M categories of samples comprises a respective plurality of samples, and M is an integer greater than 0; and for each integer value of K from 1 to M, performing the following:

obtaining a feature vector of each sample in the $K^{th}$ category of samples in the M categories of samples based on the CNN, and wherein K=1, 2, 3, . . . , or M; and determining a center feature vector of the $K^{th}$ category of samples based on the feature vector of each sample in the $K^{th}$ category of samples, wherein an $s^{th}$ element in the center feature vector of the $K^{th}$ category of samples is an average value of the $s^{th}$ elements in feature vectors of all of the $K^{th}$ category of samples, and the feature library comprises the center feature vector of the $K^{th}$ category of samples and the category of the $K^{th}$ category of samples.

6. The method according to claim 1, further comprising:

receiving, from a third party, N categories of samples, and receiving a category of each category of samples of the N categories of samples, wherein each category of samples of the N categories of samples comprises a respective plurality of samples, and N is an integer greater than o;

obtaining T' feature vectors when the feature library comprises a category of the $T^{th}$ category of samples in the N categories of samples, wherein the T' feature vectors are feature vectors of samples used for calculating a center feature vector corresponding to the category of the $T^{th}$ category of samples;

obtaining a feature vector of each sample in the $T^{th}$ category of samples based on the CNN, wherein T is greater than 0 and less than or equal to N;

determining a center feature vector of the $T^{th}$ category of samples based on the feature vector of each sample in the $T^{th}$ category of samples and the T' feature vectors, wherein an $s'^{th}$ element in the center feature vector of the $T^{th}$ category of samples is an average value of the $s'^{th}$ elements in feature vectors of all of the $T^{th}$ category of samples and the $s'^{th}$ elements in the T' feature vectors; and updating, to the center feature vector of the $T^{th}$ category of samples, the center feature vector that is in the feature library and that corresponds to the category of the $T^{th}$ category of samples.

7. An object recognition apparatus, comprising:
a processor; and
a memory with instructions stored thereon, wherein the instructions, when executed by the processor enable the object recognition apparatus to perform the method according to claim 1.

8. An apparatus, comprising:
a convolutional neural network (CNN);
a processor; and
a memory with instructions stored thereon, wherein the instructions, when executed by the processor enable the apparatus to perform the following steps:
obtaining a to-be-recognized image and one or more body regions of the to-be-recognized image, wherein the one or more body regions comprise a to-be-recognized object,
determining a saliency score of each body region of the one or more body regions, wherein the respective saliency score of each respective body region represents a saliency degree of an object in the respective body region, and
in response to a saliency score of a body region A being greater than or equal to a categorization threshold, determining a feature vector of an object in the body region A based on a feature of the object in the body region A, and determining a category of the object in the body region A based on the feature vector of the object in the body region A and a category feature vector in a feature library, wherein the body region A is comprised in one of the one or more body regions, and the category feature vector represents a common feature of objects of a same category or a feature of one category of objects; wherein the category feature vector in the feature library is a center feature vector, the center feature vector represents the common feature of objects of the same category, and determining the category of the object in the body region A based on the feature vector of the object in the body region A and the category feature vector in the feature library comprises:
extracting the feature of the object in the body region A using the CNN, to obtain the feature vector of the object in the body region A, wherein the CNN comprises an input layer configured to receive a portion of the to-be-recognized image corresponding to the body region A, a convolutional layer coupled to the input layer, and a neural network layer coupled to the convolutional layer, the neural network layer comprising at least one hidden layer and an output layer coupled to the at least one hidden layer, calculating a distance between the feature vector of the object in the body region A and a center feature vector corresponding to each category in the feature library, and
determining a category corresponding to a target center feature vector to be the category of the object in the body region A, wherein the target center feature vector is a center feature vector in the feature library that is closest to the feature vector of the object in the body region A.

9. The apparatus according to claim 8, wherein obtaining the one or more body regions of the to-be-recognized image comprises:
inputting the to-be-recognized image into a saliency probability map generation model, to obtain a saliency probability map of the to-be-recognized image, wherein a size of the saliency probability map is the same as a size of the to-be-recognized image;
performing binarization processing on the saliency probability map, to obtain a binary saliency probability map; and
processing the binary saliency probability map according to a connected region recognition method, to obtain the one or more body regions.

10. The apparatus according to claim 9, wherein determining the saliency score of each body region of the one or more body regions comprises:
obtaining a set $N_A$ of saliency probability values corresponding to the body region A and a set $N_{A'}$ of saliency probability values corresponding to a non-body region A', wherein the non-body region A' is a region other than the body region A in the saliency probability map;
obtaining an average saliency probability value of a body region A' and an average saliency probability value of the non-body region A' based on the set $N_A$ of the saliency probability values in the body region A and the set $N_{A'}$ of the saliency probability values in the non-body region A'; and
obtaining the saliency score of the body region A through calculation based on the average saliency probability value of the body region A and the average saliency probability value of the non-body region A'; and
wherein the saliency score of the body region A is a ratio of the average saliency probability value of the body region A to the average saliency probability value of the non-body region A', and saliency scores of the one or more body regions comprise the saliency score of the body region A.

11. The apparatus according to claim 8, wherein the instructions, when executed by the processor, further enable the apparatus to perform the following steps:
before the feature vector of the object in the body region A is obtained based on the CNN, training the CNN based on a plurality of samples, wherein the training the CNN based on the plurality of samples comprises:
obtaining, based on the CNN, quadruple (a, $C_P$, $C_N$, n) corresponding to a sample s in the plurality of samples, wherein a is a feature vector of the sample s, $C_P$ is a center feature vector corresponding to a category of the sample s, $C_N$ is a center feature vector that is of a different category of samples and that is closest to a, and n is a feature vector that is of a sample of a different category and that is closest to $C_P$; and
training the CNN based on quadruples of the plurality of samples and a loss function, until a value of the loss function is less than a preset precision, wherein the loss function represents a precision of the CNN, and the loss function is:

max (D (a, $C_P$)−D(a, $C_N$)+α, 0)+max (D (a, $C_P$)−D (n, $C_P$)+β, 0), wherein D (a, $C_P$) is a distance between a and $C_P$, D(a, $C_N$) is a distance between a and $C_N$, D (n, $C_P$) is a distance between n and $C_P$, and both α and β are constants.

12. The apparatus according to claim 8, wherein the instructions, when executed by the processor, further enable the apparatus to perform establishing the feature library, wherein establishing the feature library comprises:

obtaining M categories of samples, and obtaining a category of each category of samples of the M categories of samples, wherein each category of samples in the M categories of samples comprises a respective plurality of samples, and M is an integer greater than 0; and for each integer value of K from 1 to M, performing the following:

obtaining a feature vector of each sample in the $K^{th}$ category of samples in the M categories of samples based on the CNN, and wherein K=1, 2, 3, . . . , or M; and determining a center feature vector of the $K^{th}$ category of samples based on the feature vector of each sample in the $K^{th}$ category of samples, wherein an $s^{th}$ element in the center feature vector of the $K^{th}$ category of samples is an average value of the $s^{th}$ elements in feature vectors of all of the $K^{th}$ category of samples, and the feature library comprises the center feature vector of the $K^{th}$ category of samples and the category of the $K^{th}$ category of samples.

13. The apparatus according to claim 8, wherein the instructions, when executed by the processor, further enable the apparatus to perform:

receiving, from a third party, N categories of samples, and receiving a category of each category of samples of the N categories of samples, wherein each category of samples of the N categories of samples comprises a respective plurality of samples, and N is an integer greater than 0;

obtaining T' feature vectors when the feature library comprises a category of the $T^{th}$ category of samples in the N categories of samples, wherein the T' feature vectors are feature vectors of samples used for calculating a center feature vector corresponding to the category of the $T^{th}$ category of samples;

obtaining a feature vector of each sample in the $T^{th}$ category of samples based on the CNN, wherein T is greater than 0 and less than or equal to N;

determining a center feature vector of the $T^{th}$ category of samples based on the feature vector of each sample in the $T^{th}$ category of samples and the T' feature vectors, wherein an $s^{'th}$ element in the center feature vector of the $T^{th}$ category of samples is an average value of the $s^{'th}$ elements in feature vectors of all of the $T^{th}$ category of samples and the $s^{'th}$ elements in the T' feature vectors; and updating, to the center feature vector of the $T^{th}$ category of samples, the center feature vector that is in the feature library and that corresponds to the category of the $T^{th}$ category of samples.

14. The apparatus of claim 8, wherein the CNN comprises:

a bus interface coupled to an external memory;
a direct memory access (DMA) controller coupled to the bus interface;
a weight memory coupled to the DMA controller; and
an operation circuit coupled to the weight memory.

15. A non-transitory computer readable medium with instructions stored thereon, wherein the instructions, when executed by a processor enable the processor to perform the following steps:

obtaining a to-be-recognized image and one or more body regions of the to-be-recognized image, wherein the one or more body regions comprise a to-be-recognized object, determining a saliency score of each body region of the one or more body regions, wherein the respective saliency score of each respective body region represents a saliency degree of an object in the respective body region, and in response to a saliency score of a body region A being greater than or equal to a categorization threshold, determining a feature vector of an object in the body region A based on a feature of the object in the body region A, and determining a category of the object in the body region A based on the feature vector of the object in the body region A and a category feature vector in a feature library, wherein the body region A is comprised in one of the one or more body regions, and the category feature vector represents a common feature of objects of a same category or a feature of one category of objects; wherein the category feature vector in the feature library is a center feature vector, the center feature vector represents the common feature of objects of the same category, and determining the category of the object in the body region A based on the feature vector of the object in the body region A and the category feature vector in the feature library comprises:

extracting the feature of the object in the body region A using a convolutional neural network (CNN), to obtain the feature vector of the object in the body region A, wherein the CNN comprises an input layer configured to receive a portion of the to-be-recognized image corresponding to the body region A, a convolutional layer coupled to the input layer, and a neural network layer coupled to the convolutional layer, the neural network layer comprising at least one hidden layer and an output layer coupled to the at least one hidden layer, calculating a distance between the feature vector of the object in the body region A and a center feature vector corresponding to each category in the feature library, and determining a category corresponding to a target center feature vector to be the category of the object in the body region A, wherein the target center feature vector is a center feature vector in the feature library that is closest to the feature vector of the object in the body region A.

16. The non-transitory computer readable medium according to claim 15, wherein obtaining the one or more body regions of the to-be-recognized image comprises:

inputting the to-be-recognized image into a saliency probability map generation model, to obtain a saliency probability map of the to-be-recognized image, wherein a size of the saliency probability map is the same as a size of the to-be-recognized image;

performing binarization processing on the saliency probability map, to obtain a binary saliency probability map; and processing the binary saliency probability map according to a connected region recognition method, to obtain the one or more body regions.

17. The non-transitory computer readable medium according to claim 16, wherein determining the saliency score of each body region of the one or more body regions comprises:
obtaining a set $N_A$ of saliency probability values corresponding to the body region A and a set $N_A'$ of saliency probability values corresponding to a non-body region A', wherein the non-body region A' is a region other than the body region A in the saliency probability map;
obtaining an average saliency probability value of a body region A' and an average saliency probability value of the non-body region A' based on the set $N_A$ of the saliency probability values in the body region A and the set $N_A'$ of the saliency probability values in the non-body region A'; and
obtaining the saliency score of the body region A through calculation based on the average saliency probability value of the body region A and the average saliency probability value of the non-body region A'; and
wherein the saliency score of the body region A is a ratio of the average saliency probability value of the body region A to the average saliency probability value of the non-body region A', and saliency scores of the one or more body regions comprise the saliency score of the body region A.

18. The non-transitory computer readable medium according to claim 15, wherein the instructions, when executed by the processor, further enable the processor to perform the following steps:
before the feature vector of the object in the body region A is obtained based on the CNN, training the CNN based on a plurality of samples, wherein the training the CNN based on the plurality of samples comprises:
obtaining, based on the CNN, quadruple (a, $C_P$, $C_N$, n) corresponding to a sample s in the plurality of samples, wherein a is a feature vector of the sample s, $C_P$ is a center feature vector corresponding to a category of the sample s, $C_N$ is a center feature vector that is of a different category of samples and that is closest to a, and n is a feature vector that is of a sample of a different category and that is closest to $C_P$; and
training the CNN based on quadruples of the plurality of samples and a loss function, until a value of the loss function is less than a preset precision, wherein the loss function represents a precision of the CNN, and the loss function is:
max (D (a,$C_P$)–D (a,$C_N$)+α, 0)+max (D (a, $C_P$)–D (n, $C_P$)+β, 0), wherein D(a, $C_P$) is a distance between a and $C_P$, D(a, $C_N$) is a distance between a and $C_N$, D (n, $C_P$) is a distance between n and $C_P$, and both α and β are constants.

19. The non-transitory computer readable medium according to claim 15, wherein the instructions, when executed by the processor, further enable the processor to perform establishing the feature library, wherein establishing the feature library comprises:
obtaining M categories of samples, and obtaining a category of each category of samples of the M categories of samples, wherein each category of samples in the M categories of samples comprises a respective plurality of samples, and M is an integer greater than 0; and
for each integer value of K from 1 to M, performing the following:
obtaining a feature vector of each sample in the $K^{th}$ category of samples in the M categories of samples based on the CNN, and wherein K=1, 2, 3, . . . , or M; and
determining a center feature vector of the $K^{th}$ category of samples based on the feature vector of each sample in the $K^{th}$ category of samples, wherein an $s^{th}$ element in the center feature vector of the $K^{th}$ category of samples is an average value of the $s^{th}$ elements in feature vectors of all of the $K^{th}$ category of samples, and the feature library comprises the center feature vector of the $K^{th}$ category of samples and the category of the $K^{th}$ category of samples.

20. The non-transitory computer readable medium according to claim 15, wherein the instructions, when executed by the processor, further enable the processor to perform:
receiving, from a third party, N categories of samples, and receiving a category of each category of samples of the N categories of samples, wherein each category of samples of the N categories of samples comprises a respective plurality of samples, and N is an integer greater than 0;
obtaining T' feature vectors when the feature library comprises a category of the $T^{th}$ category of samples in the N categories of samples, wherein the T' feature vectors are feature vectors of samples used for calculating a center feature vector corresponding to the category of the $T^{th}$ category of samples;
obtaining a feature vector of each sample in the $T^{th}$ category of samples based on the CNN, wherein T is greater than 0 and less than or equal to N;
determining a center feature vector of the $T^{th}$ category of samples based on the feature vector of each sample in the $T^{th}$ category of samples and the T' feature vectors, wherein an $s'^{th}$ element in the center feature vector of the $T^{th}$ category of samples is an average value of the $s'^{th}$ elements in feature vectors of all of the $T^{th}$ category of samples and the $s'^{th}$ elements in the T' feature vectors; and
updating, to the center feature vector of the $T^{th}$ category of samples, the center feature vector that is in the feature library and that corresponds to the category of the $T^{th}$ category of samples.

* * * * *

UNITED STATES PATENT AND TRADEMARK OFFICE
CERTIFICATE OF CORRECTION

PATENT NO. : 12,314,342 B2  
APPLICATION NO. : 17/484545  
DATED : May 27, 2025  
INVENTOR(S) : Yue et al.

Page 1 of 1

It is certified that error appears in the above-identified patent and that said Letters Patent is hereby corrected as shown below:

In the Claims

In Column 63, in Claim 3, Line 56, delete "$N_A$'" and insert -- $N_{A'}$ --.

In Column 63, in Claim 3, Line 64, delete "$N_A$'" and insert -- $N_{A'}$ --.

In Column 64, in Claim 6, Line 61, delete "than o;" and insert -- than 0; --.

In Column 65, in Claim 6, Line 3, delete "than o" and insert -- than 0 --.

In Column 66, in Claim 10, Line 38, delete "$N_A$'" and insert -- $N_{A'}$ --.

In Column 67, in Claim 12, Line 17, delete "than o;" and insert -- than 0; --.

In Column 67, in Claim 13, Line 50, delete "than o" and insert -- than 0 --.

In Column 69, in Claim 17, Line 6, delete "$N_A$'" and insert -- $N_{A'}$ --.

In Column 69, in Claim 17, Line 14, delete "$N_A$'" and insert -- $N_{A'}$ --.

In Column 69, in Claim 18, Line 48, delete "(D (a,$C_P$)–D (a,$C_N$)" and insert -- (D (a, $C_P$)–D (a, $C_N$) --.

In Column 70, in Claim 19, Line 7, delete "than o;" and insert -- than 0; --.

In Column 70, in Claim 20, Line 42, delete "than o" and insert -- than 0 --.

Signed and Sealed this  
Nineteenth Day of August, 2025

Coke Morgan Stewart  
*Acting Director of the United States Patent and Trademark Office*